United States Patent
Waldern et al.

(10) Patent No.: US 11,726,261 B2
(45) Date of Patent: Aug. 15, 2023

(54) HOLOGRAPHIC WAVEGUIDES INCORPORATING BIREFRINGENCE CONTROL AND METHODS FOR THEIR FABRICATION

(71) Applicant: DigiLens Inc., Sunnyvale, CA (US)

(72) Inventors: Jonathan David Waldern, Los Altos Hills, CA (US); Milan Momcilo Popovich, Leicester (GB); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 17/451,223

(22) Filed: Oct. 18, 2021

(65) Prior Publication Data
US 2022/0137294 A1    May 5, 2022

Related U.S. Application Data

(63) Continuation of application No. 16/906,872, filed on Jun. 19, 2020, now Pat. No. 11,150,408, which is a
(Continued)

(51) Int. Cl.
*G02B 6/126* (2006.01)
*G02B 6/34* (2006.01)
(Continued)

(52) U.S. Cl.
CPC .............. *G02B 6/126* (2013.01); *G02B 6/274* (2013.01); *G02B 6/34* (2013.01); *G02B 6/1221* (2013.01);
(Continued)

(58) Field of Classification Search
None
See application file for complete search history.

(56) References Cited

U.S. PATENT DOCUMENTS

| 1,043,938 A | 11/1912 | Huttenlocher |
| 3,482,498 A | 12/1969 | Becker |

(Continued)

FOREIGN PATENT DOCUMENTS

| BR | PI 0720469 A2 | 1/2014 |
| CA | 2889727 A1 | 6/2014 |

(Continued)

OTHER PUBLICATIONS

International Preliminary Report on Patentability for International Application PCT/GB2009/051676, dated Jun. 14, 2011, dated Jun. 23, 2011, 6 pgs.
(Continued)

*Primary Examiner* — Jerry Rahll

(57) ABSTRACT

Many embodiments in accordance with the invention are directed towards waveguides implementing birefringence control. In some embodiments, the waveguide includes a birefringent grating layer and a birefringence control layer. In further embodiments, the birefringence control layer is compact and efficient. Such structures can be utilized for various applications, including but not limited to: compensating for polarization related losses in holographic waveguides; providing three-dimensional LC director alignment in waveguides based on Bragg gratings; and spatially varying angular/spectral bandwidth for homogenizing the output from a waveguide. In some embodiments, a polarization-maintaining, wide-angle, and high-reflection waveguide cladding with polarization compensation is implemented for grating birefringence. In several embodiments, a thin polarization control layer is implemented for providing either quarter wave or half wave retardation.

24 Claims, 23 Drawing Sheets

Related U.S. Application Data continuation of application No. 16/357,233, filed on Mar. 18, 2019, now Pat. No. 10,690,851.

(60) Provisional application No. 62/643,977, filed on Mar. 16, 2018.

(51) Int. Cl.
  *G02B 6/27* (2006.01)
  *G02B 6/13* (2006.01)
  *G02B 6/12* (2006.01)
  *G02B 6/122* (2006.01)

(52) U.S. Cl.
  CPC ...... *G02B 6/13* (2013.01); *G02B 2006/12116* (2013.01)

(56) References Cited

U.S. PATENT DOCUMENTS

| | | |
|---|---|---|
| 3,741,716 A | 6/1973 | Johne et al. |
| 3,843,231 A | 10/1974 | Borel et al. |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,248,093 A | 2/1981 | Andersson et al. |
| 4,251,137 A | 2/1981 | Knop et al. |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,688,900 A | 8/1987 | Doane et al. |
| 4,711,512 A | 12/1987 | Upatnieks |
| 4,728,547 A | 3/1988 | Vaz et al. |
| 4,729,640 A | 3/1988 | Sakata et al. |
| 4,765,703 A | 8/1988 | Suzuki et al. |
| 4,791,788 A | 12/1988 | Simmonds et al. |
| 4,792,850 A | 12/1988 | Liptoh et al. |
| 4,811,414 A | 3/1989 | Fishbine et al. |
| 4,848,093 A | 7/1989 | Simmonds et al. |
| 4,884,876 A | 12/1989 | Lipton et al. |
| 4,890,902 A | 1/1990 | Doane et al. |
| 4,933,976 A | 6/1990 | Fishbine et al. |
| 4,938,568 A | 7/1990 | Margerum et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,009,483 A | 4/1991 | Rockwell et al. |
| 5,033,814 A | 7/1991 | Brown et al. |
| 5,053,834 A | 10/1991 | Simmonds |
| 5,063,441 A | 11/1991 | Lipton et al. |
| 5,096,282 A | 3/1992 | Margerum et al. |
| 5,099,343 A | 3/1992 | Margerum et al. |
| 5,110,034 A | 5/1992 | Simmonds et al. |
| 5,117,302 A | 5/1992 | Lipton |
| 5,119,454 A | 6/1992 | McMahon et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,181,133 A | 1/1993 | Lipton |
| 5,193,000 A | 3/1993 | Lipton et al. |
| 5,198,912 A | 3/1993 | Ingwall et al. |
| 5,200,861 A | 4/1993 | Moskovich et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,295,208 A | 3/1994 | Caulfield et al. |
| 5,296,967 A | 3/1994 | Moskovich et al. |
| 5,299,289 A | 3/1994 | Omae et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,327,269 A | 7/1994 | Tilton et al. |
| 5,329,363 A | 7/1994 | Moskovich et al. |
| 5,343,147 A | 8/1994 | Sager et al. |
| 5,368,770 A | 11/1994 | Saupe et al. |
| 5,371,626 A | 12/1994 | Betensky |
| 5,416,510 A | 5/1995 | Lipton et al. |
| 5,418,871 A | 5/1995 | Revelli et al. |
| 5,428,480 A | 6/1995 | Betensky et al. |
| 5,437,811 A | 8/1995 | Doane et al. |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,499,140 A | 3/1996 | Betensky |
| 5,500,769 A | 3/1996 | Betensky |
| 5,515,184 A | 5/1996 | Caulfield et al. |
| 5,516,455 A | 5/1996 | Jacobine et al. |
| 5,530,566 A | 6/1996 | Kumar |
| 5,532,875 A | 7/1996 | Betemsky |
| RE35,310 E | 8/1996 | Moskovich |
| 5,543,950 A | 8/1996 | Lavrentovich et al. |
| 5,559,637 A | 9/1996 | Moskovich et al. |
| 5,572,250 A | 11/1996 | Lipton et al. |
| 5,576,888 A | 11/1996 | Betensky |
| 5,585,035 A | 12/1996 | Nerad et al. |
| 5,593,615 A | 1/1997 | Nerad et al. |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,668,614 A | 9/1997 | Chien et al. |
| 5,677,797 A | 10/1997 | Betensky et al. |
| 5,680,231 A | 10/1997 | Grinberg et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,695,682 A | 12/1997 | Doane et al. |
| 5,706,136 A | 1/1998 | Okuyama et al. |
| 5,710,645 A | 1/1998 | Phillips et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,790,314 A | 8/1998 | Duck et al. |
| 5,798,641 A | 8/1998 | Spagna et al. |
| 5,808,804 A | 9/1998 | Moskovich |
| 5,822,089 A | 10/1998 | Phillips et al. |
| 5,825,448 A | 10/1998 | Bos et al. |
| 5,831,700 A | 11/1998 | Li et al. |
| 5,835,661 A | 11/1998 | Tai et al. |

(56) References Cited

U.S. PATENT DOCUMENTS

| | | |
|---|---|---|
| 5,841,587 A | 11/1998 | Moskovich et al. |
| 5,856,842 A | 1/1999 | Tedesco |
| 5,867,238 A | 2/1999 | Miller et al. |
| 5,870,228 A | 2/1999 | Kreitzer et al. |
| 5,875,012 A | 2/1999 | Crawford et al. |
| 5,877,826 A | 3/1999 | Yang et al. |
| 5,892,599 A | 4/1999 | Bahuguna |
| 5,900,987 A | 5/1999 | Kreitzer et al. |
| 5,900,989 A | 5/1999 | Kreitzer |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,949,508 A | 9/1999 | Kumar et al. |
| 5,956,113 A | 9/1999 | Crawford |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,986,746 A | 11/1999 | Metz et al. |
| 5,999,089 A | 12/1999 | Carlson et al. |
| 5,999,282 A | 12/1999 | Suzuki et al. |
| 6,014,187 A | 1/2000 | Taketomi et al. |
| 6,023,375 A | 2/2000 | Kreitzer |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,094,311 A | 7/2000 | Moskovich |
| 6,097,551 A | 8/2000 | Kreitzer |
| 6,104,448 A | 8/2000 | Doane et al. |
| 6,115,152 A | 9/2000 | Popovich et al. |
| 6,128,058 A | 10/2000 | Walton et al. |
| 6,133,971 A | 10/2000 | Silverstein et al. |
| 6,133,975 A | 10/2000 | Li et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,188,462 B1 | 2/2001 | Lavrentovich et al. |
| 6,191,887 B1 | 2/2001 | Michaloski et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,228 B2 | 11/2001 | Popovich et al. |
| 6,320,563 B1 | 11/2001 | Yang et al. |
| 6,324,014 B1 | 11/2001 | Moskovich et al. |
| 6,330,109 B1 | 12/2001 | Ishii et al. |
| 6,366,281 B1 | 4/2002 | Lipton et al. |
| 6,377,238 B1 | 4/2002 | McPheters |
| 6,377,321 B1 | 4/2002 | Khan et al. |
| 6,388,797 B1 | 5/2002 | Lipton et al. |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,476,974 B1 | 11/2002 | Kreitzer et al. |
| 6,483,303 B2 | 11/2002 | Simmonds et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,529,336 B1 | 3/2003 | Kreitzer et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,600,590 B2 | 7/2003 | Roddy et al. |
| 6,618,104 B1 | 9/2003 | Date et al. |
| 6,625,381 B2 | 9/2003 | Roddy et al. |
| 6,646,772 B1 | 11/2003 | Popovich et al. |
| 6,667,134 B1 | 12/2003 | Sutherland et al. |
| 6,677,086 B1 | 1/2004 | Sutehrland et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,747,781 B2 | 6/2004 | Trisnadi et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,847,488 B2 | 1/2005 | Travis |
| 6,850,210 B1 | 2/2005 | Lipton et al. |
| 6,853,493 B2 | 2/2005 | Kreitzer et al. |
| 6,867,888 B2 | 3/2005 | Sutherland et al. |
| 6,878,494 B2 | 4/2005 | Sutehrland et al. |
| 6,927,570 B2 | 8/2005 | Simmonds et al. |
| 6,927,694 B1 | 8/2005 | Smith et al. |
| 6,950,173 B1 | 9/2005 | Sutherland et al. |
| 6,952,435 B2 | 10/2005 | Lai et al. |
| 6,958,868 B1 | 10/2005 | Pender |
| 6,963,454 B1 | 11/2005 | Martins et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,019,793 B2 | 3/2006 | Moskovich et al. |
| 7,021,777 B2 | 4/2006 | Amitai |
| 7,026,892 B2 | 4/2006 | Kajiya |
| 7,054,045 B2 | 5/2006 | McPheters et al. |
| 7,068,405 B2 | 6/2006 | Sutherland et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,099,080 B2 | 8/2006 | Lipton et al. |
| 7,108,383 B1 | 9/2006 | Mitchell et al. |
| 7,119,965 B1 | 10/2006 | Rolland et al. |
| 7,123,421 B1 | 10/2006 | Moskovich et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,167,286 B2 | 1/2007 | Anderson et al. |
| 7,175,780 B1 | 2/2007 | Sutherland et al. |

(56) References Cited

U.S. PATENT DOCUMENTS

| | | |
|---|---|---|
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,198,737 B2 | 4/2007 | Natarajan et al. |
| 7,206,107 B2 | 4/2007 | Levola |
| 7,230,770 B2 | 6/2007 | Kreitzer et al. |
| 7,256,915 B2 | 8/2007 | Sutherland et al. |
| 7,265,882 B2 | 9/2007 | Sutherland et al. |
| 7,265,903 B2 | 9/2007 | Sutherland et al. |
| RE39,911 E | 11/2007 | Moskovich |
| 7,301,601 B2 | 11/2007 | Lin et al. |
| 7,312,906 B2 | 12/2007 | Sutherland et al. |
| 7,333,685 B2 | 2/2008 | Stone et al. |
| 7,359,597 B1 | 4/2008 | Iazikov et al. |
| 7,375,886 B2 | 5/2008 | Lipton et al. |
| 7,391,573 B2 | 6/2008 | Amitai |
| 7,413,678 B1 | 8/2008 | Natarajan et al. |
| 7,413,679 B1 | 8/2008 | Sutherland et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,453,612 B2 | 11/2008 | Mukawa |
| 7,454,103 B2 | 11/2008 | Parriaux |
| 7,457,040 B2 | 11/2008 | Amitai |
| 7,477,206 B2 | 1/2009 | Cowan et al. |
| 7,499,217 B2 | 3/2009 | Cakmakci et al. |
| 7,511,891 B2 | 3/2009 | Messerschmidt |
| 7,522,344 B1 | 4/2009 | Curatu et al. |
| 7,570,322 B1 | 8/2009 | Sutherland et al. |
| 7,570,405 B1 | 8/2009 | Sutherland et al. |
| 7,577,326 B2 | 8/2009 | Amitai |
| 7,583,423 B2 | 9/2009 | Sutherland et al. |
| 7,589,901 B2 | 9/2009 | DeJong et al. |
| 7,605,882 B1 | 10/2009 | Sutherland et al. |
| 7,619,739 B1 | 11/2009 | Sutherland et al. |
| 7,639,208 B1 | 12/2009 | Ha et al. |
| 7,643,214 B2 | 1/2010 | Amitai |
| 7,672,055 B2 | 3/2010 | Amitai |
| 7,672,549 B2 | 3/2010 | Ghosh et al. |
| 7,710,622 B2 | 5/2010 | Takabayashi et al. |
| 7,724,443 B2 | 5/2010 | Amitai |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,843,642 B2 | 11/2010 | Shaoulov et al. |
| 7,866,869 B2 | 1/2011 | Karakawa |
| 7,872,707 B1 | 1/2011 | Sutherland et al. |
| 7,884,593 B2 | 2/2011 | Simmonds et al. |
| 7,884,985 B2 | 2/2011 | Amitai et al. |
| 7,907,342 B2 | 3/2011 | Simmonds et al. |
| 7,936,519 B2 | 5/2011 | Mukawa et al. |
| 7,944,616 B2 | 5/2011 | Mukawa |
| 7,949,214 B2 | 5/2011 | DeJong et al. |
| 7,969,657 B2 | 6/2011 | Cakmakci et al. |
| 8,000,020 B2 | 8/2011 | Amitai et al. |
| 8,014,050 B2 | 9/2011 | McGrew |
| 8,016,475 B2 | 9/2011 | Travis |
| 8,018,579 B1 | 9/2011 | Krah |
| 8,023,783 B2 | 9/2011 | Mukawa et al. |
| 8,073,296 B2 | 12/2011 | Mukawa et al. |
| 8,077,274 B2 | 12/2011 | Sutherland et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,134,434 B2 | 3/2012 | Diederichs et al. |
| 8,142,016 B2 | 3/2012 | Legerton et al. |
| 8,155,489 B2 | 4/2012 | Saarikko et al. |
| 8,160,411 B2 | 4/2012 | Levola et al. |
| 8,167,173 B1 | 5/2012 | Simmonds et al. |
| 8,194,325 B2 | 6/2012 | Levola et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,294,749 B2 | 10/2012 | Cable |
| 8,310,327 B2 | 11/2012 | Willers et al. |
| 8,314,993 B2 | 11/2012 | Levola et al. |
| 8,320,032 B2 | 11/2012 | Levola |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,396,339 B2 | 3/2013 | Mukawa et al. |
| 8,422,840 B2 | 4/2013 | Large |
| 8,432,614 B2 | 4/2013 | Amitai |
| 8,441,731 B2 | 5/2013 | Sprague |
| 8,466,953 B2 | 6/2013 | Levola |
| 8,472,120 B2 | 6/2013 | Border et al. |
| 8,481,130 B2 | 7/2013 | Harding et al. |
| 8,482,858 B2 | 7/2013 | Sprague |
| 8,488,246 B2 | 7/2013 | Border et al. |
| 8,491,136 B2 | 7/2013 | Travis et al. |
| 8,493,662 B2 | 7/2013 | Noui |
| 8,494,229 B2 | 7/2013 | Jarvenpaa et al. |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,582,206 B2 | 11/2013 | Travis |
| 8,593,734 B2 | 11/2013 | Laakkonen |
| 8,611,014 B2 | 12/2013 | Valera et al. |
| 8,634,120 B2 | 1/2014 | Popovich et al. |
| 8,639,072 B2 | 1/2014 | Popovich et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,698,705 B2 | 4/2014 | Burke |
| 8,731,350 B1 | 5/2014 | Lin et al. |
| 8,736,963 B2 | 5/2014 | Robbins et al. |
| 8,746,008 B1 | 6/2014 | Mauritsen et al. |
| 8,786,923 B2 | 7/2014 | Chuang et al. |
| 8,810,913 B2 | 8/2014 | Simmonds et al. |
| 8,810,914 B2 | 8/2014 | Amitai |
| 8,817,350 B1 | 8/2014 | Robbins et al. |
| 8,824,836 B2 | 9/2014 | Sugiyama |
| 8,830,584 B2 | 9/2014 | Saarikko et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,865 B1 | 12/2014 | Bennett |
| 8,917,453 B2 | 12/2014 | Bohn |
| 8,937,771 B2 | 1/2015 | Robbins et al. |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,069,228 B2 | 6/2015 | Han et al. |
| 9,075,184 B2 | 7/2015 | Popovich et al. |
| 9,081,178 B2 | 7/2015 | Simmonds et al. |

(56) References Cited

U.S. PATENT DOCUMENTS

| | | |
|---|---|---|
| 9,128,226 B2 | 9/2015 | Fattal et al. |
| 9,129,295 B2 | 9/2015 | Border et al. |
| 9,164,290 B2 | 10/2015 | Robbins et al. |
| 9,201,270 B2 | 12/2015 | Fattal et al. |
| 9,215,293 B2 | 12/2015 | Miller |
| 9,269,854 B2 | 2/2016 | Jain |
| 9,274,338 B2 | 3/2016 | Robbins et al. |
| 9,310,566 B2 | 4/2016 | Valera et al. |
| 9,329,325 B2 | 5/2016 | Simmonds et al. |
| 9,341,846 B2 | 5/2016 | Popovich et al. |
| 9,354,366 B2 | 5/2016 | Jain |
| 9,366,862 B2 | 6/2016 | Haddick et al. |
| 9,372,347 B1 | 6/2016 | Levola et al. |
| 9,377,623 B2 | 6/2016 | Robbins et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,431,794 B2 | 8/2016 | Jain |
| 9,459,451 B2 | 10/2016 | Saarikko et al. |
| 9,465,213 B2 | 10/2016 | Simmonds |
| 9,494,799 B2 | 11/2016 | Robbins et al. |
| 9,541,383 B2 | 1/2017 | Abovitz et al. |
| 9,547,174 B2 | 1/2017 | Gao et al. |
| 9,551,874 B2 | 1/2017 | Amitai |
| 9,551,880 B2 | 1/2017 | Amitai |
| 9,612,403 B2 | 4/2017 | Abovitz et al. |
| 9,632,226 B2 | 4/2017 | Waldern et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,727,772 B2 | 8/2017 | Popovich et al. |
| 9,746,688 B2 | 8/2017 | Popovich et al. |
| 10,569,449 B1 | 2/2020 | Curts et al. |
| 10,578,876 B1 | 3/2020 | Lam et al. |
| 10,598,938 B1 | 3/2020 | Huang et al. |
| 10,613,268 B1 | 4/2020 | Colburn et al. |
| 10,649,119 B2 | 5/2020 | Mohanty et al. |
| 10,690,831 B2 | 6/2020 | Calafiore |
| 10,690,851 B2 | 6/2020 | Waldern et al. |
| 10,732,351 B2 | 8/2020 | Colburn et al. |
| 10,823,887 B1 | 11/2020 | Calafiore et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,150,408 B2 | 10/2021 | Waldern et al. |
| 11,243,333 B1 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0036825 A1 | 3/2002 | Lipton et al. |
| 2002/0047837 A1* | 4/2002 | Suyama ............... H04N 13/398 348/E13.032 |
| 2002/0110077 A1 | 8/2002 | Drobot et al. |
| 2002/0126332 A1* | 9/2002 | Popovich ............ G02F 1/13342 359/15 |
| 2002/0196332 A1 | 12/2002 | Lipton et al. |
| 2003/0007070 A1 | 1/2003 | Lipton et al. |
| 2003/0038912 A1 | 2/2003 | Broer et al. |
| 2003/0067685 A1* | 4/2003 | Niv ................... G02B 27/0081 359/566 |
| 2003/0086670 A1 | 5/2003 | Moridaira et al. |
| 2003/0107809 A1 | 6/2003 | Chen et al. |
| 2003/0197157 A1 | 10/2003 | Sutherland et al. |
| 2003/0202247 A1* | 10/2003 | Niv ..................... G02B 5/1847 359/569 |
| 2004/0004767 A1* | 1/2004 | Song ................ G02B 27/0081 359/566 |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0141217 A1 | 7/2004 | Endo et al. |
| 2004/0175627 A1 | 9/2004 | Sutherland et al. |
| 2004/0179764 A1 | 9/2004 | Melikechi et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0141066 A1 | 6/2005 | Ouchi |
| 2005/0180687 A1 | 8/2005 | Amitai |
| 2005/0195276 A1 | 9/2005 | Lipton et al. |
| 2005/0232530 A1 | 10/2005 | Kekas |
| 2005/0265585 A1 | 12/2005 | Rowe |
| 2005/0271258 A1 | 12/2005 | Rowe |
| 2005/0286133 A1 | 12/2005 | Lipton |
| 2006/0012878 A1 | 1/2006 | Lipton et al. |
| 2006/0043938 A1 | 3/2006 | O'Gorman et al. |
| 2006/0119837 A1 | 6/2006 | Raguin et al. |
| 2006/0132914 A1 | 6/2006 | Weiss et al. |
| 2006/0146422 A1 | 7/2006 | Koike |
| 2006/0171647 A1 | 8/2006 | Ye et al. |
| 2006/0191293 A1 | 8/2006 | Kuczma |
| 2006/0215244 A1 | 9/2006 | Yosha et al. |
| 2006/0228073 A1* | 10/2006 | Mukawa ................. G02B 5/18 385/31 |
| 2006/0268104 A1 | 11/2006 | Cowan et al. |
| 2006/0268412 A1 | 11/2006 | Downing et al. |
| 2006/0284974 A1 | 12/2006 | Lipton et al. |
| 2006/0285205 A1 | 12/2006 | Lipton et al. |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0041684 A1 | 2/2007 | Popovich et al. |
| 2007/0070476 A1 | 3/2007 | Yamada et al. |
| 2007/0097502 A1 | 5/2007 | Lipton et al. |
| 2007/0109401 A1 | 5/2007 | Lipton et al. |
| 2007/0133089 A1 | 6/2007 | Lipton et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0183650 A1 | 8/2007 | Lipton et al. |
| 2007/0188602 A1 | 8/2007 | Cowan et al. |
| 2007/0206155 A1 | 9/2007 | Lipton |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0186573 A1 | 8/2008 | Lipton |
| 2008/0186574 A1 | 8/2008 | Robinson et al. |
| 2008/0197518 A1 | 8/2008 | Aylward et al. |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0285137 A1 | 11/2008 | Simmonds et al. |
| 2008/0297731 A1 | 12/2008 | Powell et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |

(56) References Cited

U.S. PATENT DOCUMENTS

| | | |
|---|---|---|
| 2008/0304111 A1 | 12/2008 | Queenan et al. |
| 2008/0316303 A1 | 12/2008 | Chiu et al. |
| 2008/0316375 A1 | 12/2008 | Lipton et al. |
| 2009/0052047 A1 | 2/2009 | Amitai |
| 2009/0074356 A1 | 3/2009 | Sanchez et al. |
| 2009/0128495 A1 | 5/2009 | Kong et al. |
| 2009/0128911 A1 | 5/2009 | Itzkovitch et al. |
| 2009/0141324 A1 | 6/2009 | Mukawa |
| 2009/0190222 A1 | 7/2009 | Simmonds et al. |
| 2009/0242021 A1 | 10/2009 | Petkie et al. |
| 2009/0296218 A1 | 12/2009 | Ryytty |
| 2009/0303599 A1 | 12/2009 | Levola |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0079865 A1 | 4/2010 | Saarikko et al. |
| 2010/0086256 A1 | 4/2010 | Ben Bakir et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0149073 A1 | 6/2010 | Chaum et al. |
| 2010/0220293 A1 | 9/2010 | Mizushima et al. |
| 2010/0231532 A1 | 9/2010 | Nho et al. |
| 2010/0246003 A1 | 9/2010 | Simmonds et al. |
| 2010/0246004 A1 | 9/2010 | Simmonds |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0321781 A1 | 12/2010 | Levola et al. |
| 2011/0019874 A1 | 1/2011 | Jarvenpaa et al. |
| 2011/0026128 A1 | 2/2011 | Baker et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0063604 A1 | 3/2011 | Hamre et al. |
| 2011/0102711 A1 | 5/2011 | Sutherland et al. |
| 2011/0109880 A1 | 5/2011 | Nummela |
| 2011/0187293 A1 | 8/2011 | Travis et al. |
| 2011/0235179 A1 | 9/2011 | Simmonds |
| 2011/0236803 A1 | 9/2011 | Weiser et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0120493 A1 | 5/2012 | Simmonds et al. |
| 2012/0162549 A1 | 6/2012 | Gao et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0235886 A1 | 9/2012 | Border et al. |
| 2012/0290973 A1 | 11/2012 | Robertson et al. |
| 2012/0300311 A1 | 11/2012 | Simmonds et al. |
| 2013/0016324 A1 | 1/2013 | Travis |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077040 A1 | 3/2013 | Escuti et al. |
| 2013/0077049 A1 | 3/2013 | Bohn |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0143336 A1 | 6/2013 | Jain |
| 2013/0163089 A1 | 6/2013 | Bohn |
| 2013/0176704 A1 | 7/2013 | Lanman et al. |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0322810 A1 | 12/2013 | Robbins |
| 2013/0342525 A1 | 12/2013 | Benko et al. |
| 2014/0003762 A1 | 1/2014 | Macnamara |
| 2014/0024159 A1 | 1/2014 | Jain |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0160576 A1 | 6/2014 | Robbins et al. |
| 2014/0168735 A1 | 6/2014 | Yuan et al. |
| 2014/0168783 A1 | 6/2014 | Luebke et al. |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0125109 A1 | 5/2015 | Robbins et al. |
| 2015/0148728 A1 | 5/2015 | Sallum et al. |
| 2015/0185475 A1 | 7/2015 | Saarikko et al. |
| 2015/0235447 A1 | 8/2015 | Abovitz et al. |
| 2015/0235448 A1 | 8/2015 | Schowengerdt et al. |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0288129 A1 | 10/2015 | Jain |
| 2015/0346490 A1 | 12/2015 | Tekolste et al. |
| 2015/0346495 A1 | 12/2015 | Welch et al. |

(56) References Cited

U.S. PATENT DOCUMENTS

| | | |
|---|---|---|
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033698 A1* | 2/2016 | Escuti .............. G02B 5/1833 349/194 |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0195664 A1 | 7/2016 | Fattal et al. |
| 2016/0209648 A1 | 7/2016 | Haddick et al. |
| 2016/0231568 A1 | 8/2016 | Saarikko et al. |
| 2016/0266398 A1 | 9/2016 | Poon et al. |
| 2016/0274362 A1 | 9/2016 | Tinch et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0341964 A1 | 11/2016 | Amitai |
| 2017/0003505 A1 | 1/2017 | Vallius et al. |
| 2017/0010488 A1 | 1/2017 | Klug et al. |
| 2017/0030550 A1 | 2/2017 | Popovich et al. |
| 2017/0031171 A1 | 2/2017 | Vallius et al. |
| 2017/0034435 A1 | 2/2017 | Vallius |
| 2017/0038579 A1 | 2/2017 | Yeoh et al. |
| 2017/0052376 A1 | 2/2017 | Amitai et al. |
| 2017/0059759 A1 | 3/2017 | Ayres et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1* | 5/2017 | Wall .............. G02B 6/001 |
| 2017/0131546 A1 | 5/2017 | Woltman et al. |
| 2017/0131551 A1 | 5/2017 | Robbins et al. |
| 2017/0180404 A1 | 6/2017 | Bersch et al. |
| 2017/0180408 A1 | 6/2017 | Yu et al. |
| 2017/0219841 A1 | 8/2017 | Popovich et al. |
| 2017/0276940 A1 | 9/2017 | Popovich et al. |
| 2017/0299860 A1 | 10/2017 | Wall et al. |
| 2018/0011324 A1 | 1/2018 | Popovich et al. |
| 2018/0059305 A1 | 3/2018 | Popovich et al. |
| 2018/0246354 A1 | 8/2018 | Popovich et al. |
| 2019/0285796 A1 | 9/2019 | Waldern et al. |
| 2020/0247016 A1 | 8/2020 | Calafiore |
| 2020/0249568 A1 | 8/2020 | Rao et al. |
| 2020/0319404 A1 | 10/2020 | Waldern et al. |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0238374 A1 | 8/2021 | Ye et al. |
| 2022/0019015 A1 | 1/2022 | Calafiore et al. |
| 2022/0082739 A1 | 3/2022 | Franke et al. |
| 2022/0091323 A1 | 3/2022 | Yaroshchuk et al. |
| 2022/0204790 A1 | 6/2022 | Zhang et al. |
| 2022/0206232 A1 | 6/2022 | Zhang et al. |

FOREIGN PATENT DOCUMENTS

| | | |
|---|---|---|
| CN | 101103297 A | 1/2008 |
| CN | 100492099 C | 5/2009 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 112088332 A | 12/2020 |
| DE | 19751190 A1 | 5/1999 |
| DE | 102012108424 A1 | 3/2014 |
| EP | 0795775 A2 | 9/1997 |
| EP | 1413972 A1 | 4/2004 |
| EP | 1526709 A2 | 4/2005 |
| EP | 1748305 A1 | 1/2007 |
| EP | 1952189 A2 | 8/2008 |
| EP | 1413972 B1 | 10/2008 |
| EP | 2110701 A1 | 10/2009 |
| EP | 2244114 A1 | 10/2010 |
| EP | 2326983 A1 | 6/2011 |
| EP | 1828832 B1 | 5/2013 |
| EP | 2733517 A1 | 5/2014 |
| EP | 1573369 B1 | 7/2014 |
| EP | 2929378 A1 | 10/2015 |
| EP | 2748670 B1 | 11/2015 |
| EP | 2995986 A1 | 3/2016 |
| EP | 3765897 A1 | 1/2021 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | H09218407 A | 8/1997 |
| JP | 11109320 A | 4/1999 |
| JP | 11142806 A | 5/1999 |
| JP | 2953444 B2 | 9/1999 |
| JP | 2000056259 A | 2/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2003066428 A | 3/2003 |
| JP | 2003270419 A | 9/2003 |
| JP | 2008112187 A | 5/2008 |
| JP | 2009036955 A | 2/2009 |
| JP | 2009516862 A | 4/2009 |
| JP | 2009211091 A | 9/2009 |
| JP | 4367775 B2 | 11/2009 |
| JP | 2010525394 A | 7/2010 |
| JP | 2012137616 A | 7/2012 |
| JP | 5303928 B2 | 10/2013 |
| JP | 2015099238 A | 5/2015 |
| JP | 2021515917 A | 6/2021 |
| KR | 20100092059 A | 8/2010 |
| KR | 20140140063 A | 12/2014 |
| KR | 20140142337 A | 12/2014 |
| KR | 10-2020-0133265 A | 11/2020 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 2000016136 A1 | 3/2000 |
| WO | 2000023830 | 4/2000 |
| WO | 2000023847 | 4/2000 |
| WO | 2001050200 A2 | 7/2001 |
| WO | 2001090822 A1 | 11/2001 |

(56) References Cited

FOREIGN PATENT DOCUMENTS

| | | |
|---|---|---|
| WO | 2002082168 A1 | 10/2002 |
| WO | 2003081320 A1 | 10/2003 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007062098 A2 | 5/2007 |
| WO | 2007085682 A1 | 8/2007 |
| WO | 2007062098 A3 | 11/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2009013597 A2 | 1/2009 |
| WO | 2009077802 A1 | 6/2009 |
| WO | 2009077803 A1 | 6/2009 |
| WO | 2009101238 A1 | 8/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013034879 A1 | 3/2013 |
| WO | 2013049012 A1 | 4/2013 |
| WO | 2013102759 A2 | 7/2013 |
| WO | 2013167864 A1 | 11/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016046514 A1 | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016118107 A1 | 7/2016 |
| WO | 2016122679 A1 | 8/2016 |
| WO | 2016181108 A1 | 11/2016 |
| WO | 2017060665 A1 | 4/2017 |
| WO | 2017162999 A1 | 9/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018102834 A3 | 6/2018 |
| WO | 2018096359 A3 | 7/2018 |
| WO | 2017162999 A8 | 8/2018 |
| WO | 2018150163 A1 | 8/2018 |
| WO | 2019077307 A1 | 4/2019 |
| WO | 2019122806 A1 | 6/2019 |
| WO | 2019171038 A1 | 9/2019 |
| WO | 2019178614 A1 | 9/2019 |
| WO | 2020212682 A1 | 10/2020 |
| WO | 2021032982 A1 | 2/2021 |
| WO | 2021032983 A1 | 2/2021 |
| WO | 2021044121 A1 | 3/2021 |

OTHER PUBLICATIONS

International Preliminary Report on Patentability for International Application PCT/GB2011/000349, dated Sep. 18, 2012, dated Sep. 27, 2012, 10 pgs.
International Preliminary Report on Patentability for International Application PCT/GB2012/000331, dated Oct. 8, 2013, dated Oct. 17, 2013, 8 pgs.
International Preliminary Report on Patentability for International Application PCT/GB2012/000677, dated Feb. 25, 2014, dated Mar. 6, 2014, 5 pgs.
International Preliminary Report on Patentability for International Application PCT/GB2013/000005, dated Jul. 8, 2014, dated Jul. 17, 2014, 12 pgs.
International Preliminary Report on Patentability for International Application PCT/GB2014/000295, dated Feb. 2, 2016, dated Feb. 11, 2016, 4 pgs.
International Preliminary Report on Patentability for International Application PCT/GB2015/000225, dated Feb. 14, 2017, dated Feb. 23, 2017, 8 pgs.
International Preliminary Report on Patentability for International Application PCT/GB2015/000274, dated Mar. 28, 2017, dated Apr. 6, 2017, 8 pgs.
International Preliminary Report on Patentability for International Application PCT/GB2016/000014, dated Jul. 25, 2017, dated Aug. 3, 2017, 7 pgs.
International Preliminary Report on Patentability for International Application PCT/US2014/011736, dated Jul. 21, 2015, dated Jul. 30, 2015, 9 pgs.
International Preliminary Report on Patentability for International Application PCT/US2016/017091, dated Aug. 15, 2017, dated Aug. 24, 2017, 5 pgs.
International Preliminary Report on Patentability for International Application PCT/US2019/022822, Report dated Sep. 22, 2020, dated Oct. 1, 2020, 7 Pgs.

(56) References Cited

OTHER PUBLICATIONS

International Search Report and Written Opinion for International Application No. PCT/US2014/011736, completed Apr. 18, 2014, dated May 8, 2014, 10 pgs.
International Search Report and Written Opinion for International Application No. PCT/US2019/022822, Search completed May 15, 2019, dated May 29, 2019, 11 Pgs.
International Search Report and Written Opinion for International Application PCT/GB2009/051676, completed May 10, 2010, dated May 18, 2010, 7 pgs.
International Search Report and Written Opinion for International Application PCT/US2016/017091, completed by the European Patent Office on Apr. 20, 2016, 7 pgs.
International Search Report for International Application No. PCT/GB2014/000295, completed Nov. 18, 2014, dated Jan. 5, 2015, 4 pgs.
International Search Report for International Application PCT/GB2017/000040, dated Jul. 18, 2017, completed Jul. 10, 2017, 3 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, dated Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office on Jun. 27, 2016, 4 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2014/000295, search completed Nov. 18, 2014, dated Jan. 5, 2015, 3 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2017/000040, search completed Jul. 10, 2017, dated Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.

"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.

(56) References Cited

OTHER PUBLICATIONS

Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs., doi:10.1117/12.808855.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amundson et al., "Morphology and electro-optic properties of polymer-dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103, first published Dec. 22, 2008.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/02678290310001605910.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631, doi:10.1039/B922303G.
Bleha et al., "Binocular Holographic Waveguide Visor Display", SID Symposium Digest of Technical Papers, Holoeye Systems Inc., Jun. 2014, San Diego, CA, 4 pgs.
Bleha et al., "D-ILA Technology for High Resolution Projection Displays", Sep. 10, 2003, Proceedings, vol. 5080, 11 pgs., doi:10.1117/12.497532.
Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738, DOI: 10.1080/00222348.2013.808926.
Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, DOI: 10.1189/JSID17.12.1043.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R 1.135.
Bunning et al., "Holographic Polymer-Dispersed Liquid Crystals (H-PDLCs)1", Annual Review of Material Science, 2000, vol. 30, pp. 83-115.
Bunning et al., "Morphology of Anisotropic Polymer Dispersed Liquid Crystals and the Effect of Monomer Functionality", Journal of Polymer Science Part B: Polymer Physics, Jul. 30, 1997, vol. 35, pp. 2825-2833.
Busbee et al., "$SiO_2$ Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.
Butler et al., "Diffractive Properties of Highly Birefringent Volume Gratings: Investigation", Journal of Optical Society of America, Feb. 2002, vol. 19, No. 2, pp. 183-189.
Cai et al., "Recent advances in antireflective surfaces based on nanostructure arrays", Materials Horizons, 2015, vol. 2, pp. 37-53, DOI: 10.1038/c4mh00140k.
Cameron, "Optical Waveguide Technology & Its Application In Head Mounted Displays", Proc. of SPIE, May 22, 2012, vol. 8383, pp. 83830E-1-83830E-11, doi: 10.1117/12.923660.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51, Doi: 10.1109/JDT.2005.864156.
Carclo Optics, "Guide to choosing secondary optics", Carclo Optics, Dec. 15, 2014, www.carclo-optics.com, 48 pgs.
Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.
Cheng et al., "Design of an ultra-thin near-eye display with geometrical waveguide and freeform optics", Optics Express, Aug. 2014, 16 pgs., DOI: 10.1364/OE.22.020705.
Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of $CO_2$ Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.

(56) References Cited

OTHER PUBLICATIONS

Colegrove et al., "P-59: Technology of Stacking HPDLC for Higher Reflectance", SID 00 Digest, May 2000, pp. 770-773.
Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, No. 2, pp. 289-294.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoInhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution lithography", Phys.Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.

Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, pp. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, pp. 1585-1588, 2003.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, pp. 1-25, 1997.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
Herman et al., "Production and Uses of Diffractionless Beams", J. Opt. Soc. Am. A., Jun. 1991, vol. 8, No. 6, pp. 932-942.

(56) References Cited

OTHER PUBLICATIONS

Hisano, "Alignment layer-free molecular ordering induced by masked photopolymerization with nonpolarized light", Appl. Phys. Express 9, Jun. 6, 2016, pp. 072601-1-072601-4.

Hoepfner et al., "LED Front Projection Goes Mainstream", Luminus Devices, Inc., Projection Summit, 2008, 18 pgs.

Holmes et al., "Controlling the Anisotropy of Holographic Polymer-Dispersed Liquid-Crystal Gratings", Physical Review E, Jun. 11, 2002, vol. 65, 066603-1-066603-4.

Hoyle et al., "Advances in the Polymerization of Thiol-Ene Formulations", Heraeus Noblelight Fusion UV Inc., 2003 Conference, 6 pgs.

Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.

Huang et al., "Diffraction properties of substrate guided-wave holograms", Optical Engineering, Oct. 1995, vol. 34, No. 10, pp. 2891-2899.

Huang et al., "Theory and characteristics of holographic polymer dispersed liquid crystal transmission grating with scaffolding morphology", Applied Optics, Jun. 20, 2012, vol. 51, No. 18, pp. 4013-4020.

Iannacchione et al., "Deuterium NMR and morphology study of copolymer-dispersed liquid-crystal Bragg gratings", Europhysics Letters, 1996, vol. 36, No. 6, pp. 425-430.

Jeng et al., "Aligning liquid crystal molecules", SPIE, 2012, 10.1117/2.1201203.004148, 2 pgs.

Jo et al., "Control of Liquid Crystal Pretilt Angle using Polymerization of Reactive Mesogen", IMID 2009 Digest, P1-25, 2009, pp. 604-606.

Juhl, "Interference Lithography for Optical Devices and Coatings", Dissertation, University of Illinois at Urbana-Champaign, 2010.

Juhl et al., "Holographically Directed Assembly of Polymer Nanocomposites", ACS Nano, Oct. 7, 2010, vol. 4, No. 10, pp. 5953-5961.

Jurbergs et al., "New recording materials for the holographic industry", Proc. of SPIE, 2009 vol. 7233, pp. 72330K-1-72330L-10, doi: 10.1117/12.809579.

Kahn et al., "Private Line Report on Large Area Display", Kahn International, Jan. 7, 2003, vol. 8, No. 10, 9 pgs.

Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.

Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.

Karp et al., "Planar micro-optic solar concentrator", Optics Express, Jan. 18, 2010, vol. 18, No. 2, pp. 1122-1133.

Kato et al., "Alignment-Controlled Holographic Polymer Dispersed Liquid Crystal (HPDLC) for Reflective Display Devices", SPIE, 1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 DIGEST, 2004, ISSN/0004-0966X/04/3502, pp. 943-945.

Keuper et al., "P-126: Ultra-Compact LED based Image Projector for Portable Applications", SID 03 DIGEST, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Fabrication of Reflective Holographic PDLC for Blue", Molecular Crystals and Liquid Crystals Science, 2001, vol. 368, pp. 3845-3853.

Kim et al., "Optimization of Holographic PDLC for Green", Mol. Cryst. Liq. Cryst., vol. 368, pp. 3855-3864, 2001.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, pp. 2909-2945, Nov. 1969.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

Lin et al., "Ionic Liquids in Photopolymerizable Holographic Materials", in book: Holograms—Recording Materials and Applications, Nov. 9, 2011, 21 pgs.

Liu et al., "Holographic Polymer Dispersed Liquid Crystals Materials, Formation and Applications", Advances in OptoElectronics, Nov. 30, 2008, vol. 2008, Article ID 684349, 52 pgs.

Lorek, "Experts Say Mass Adoption of augmented and Virtual Reality is Many Years Away", Siliconhills, Sep. 9, 2017, 4 pgs.

Lowenthal et al., "Speckle Removal by a Slowly Moving Diffuser Associated with a Motionless Diffuser", Journal of the Optical Society of America, Jul. 1971, vol. 61, No. 7, pp. 847-851.

Lu et al., "Polarization switch using thick holographic polymer-dispersed liquid crystal grating", Journal of Applied Physics, Feb. 1, 2004, vol. 95, No. 3, pp. 810-815.

Lu et al., "The Mechanism of electric-field-induced segregation of additives in a liquid-crystal host", Phys Rev E Stat Nonlin Soft Matter Phys., Nov. 27, 2012, 14 pgs.

Ma et al., "Holographic Reversed-Mode Polymer-Stabilized Liquid Crystal Grating", Chinese Phys. Lett., 2005, vol. 22, No. 1, pp. 103-106.

Mach et al., "Switchable Bragg diffraction from liquid crystal in colloid-templated structures", Europhysics Letters, Jun. 1, 2002, vol. 58, No. 5, pp. 679-685.

Magarinos et al., "Wide Angle Color Holographic infinity optics display", Air Force Systems Command, Brooks Air Force Base, Texas, AFHRL-TR-80-53, Mar. 1981, 100 pgs.

Marino et al., "Dynamical Behaviour of Policryps Gratings", Electronic-Liquid Crystal Communications, Feb. 5, 2004, 10 pgs.

(56) References Cited

OTHER PUBLICATIONS

Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of Volume Holograms in Polymer Dispersed Liquid Crystals", Journal of Nonlinear Optical Physics and Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.

(56) References Cited

OTHER PUBLICATIONS

Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed Tiquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.

Van Gerwen et al., "Nanoscaled interdigitated electrode arrays for biochemical sensors", Sensors and Actuators, Mar. 3, 1998, vol. B 49, pp. 73-80.
Vecchi, "Studi Esr Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
Weng et al., "Polarization volume grating with high efficiency and large diffraction angle", Optics Express, 2016, vol. 24, pp. 17746-17759.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wight et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.

(56) References Cited

OTHER PUBLICATIONS

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zlębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

Extended European Search Report for European Application No. 19766755.3, Search completed Dec. 14, 2021, dated Jan. 4, 2022, 11 pgs.

\* cited by examiner

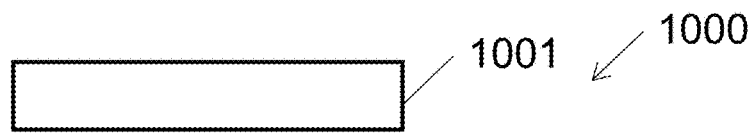
FIG.10A
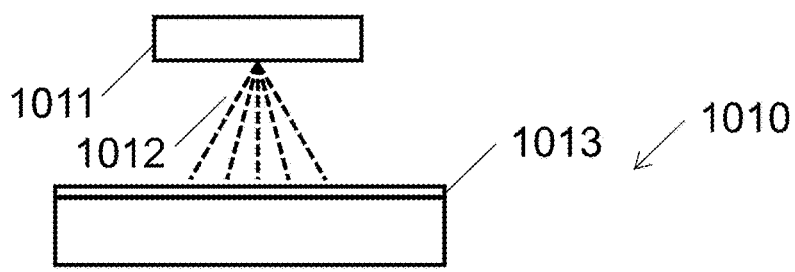
FIG.10B
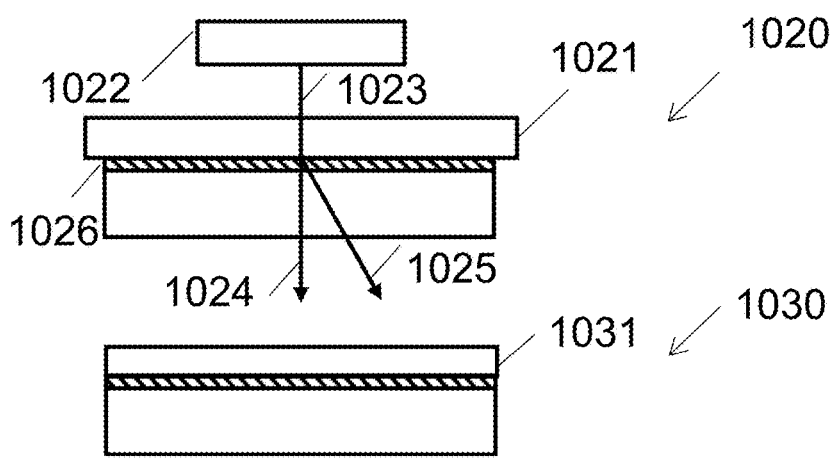
FIG.10C
FIG.10D
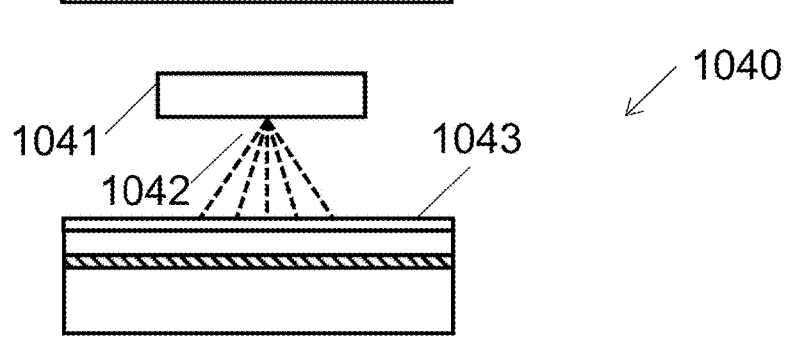
FIG.10E
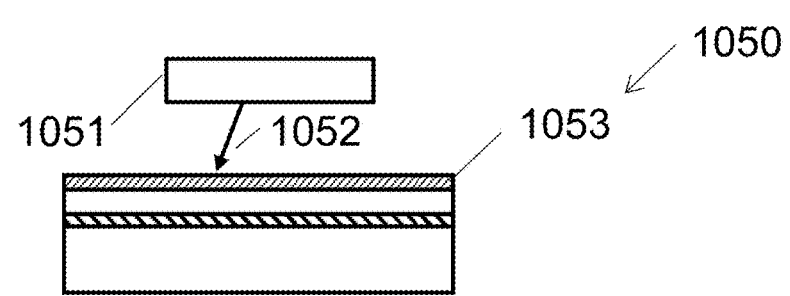
FIG.10F

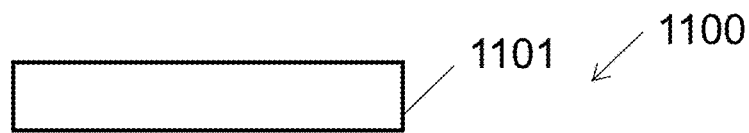
FIG.11A
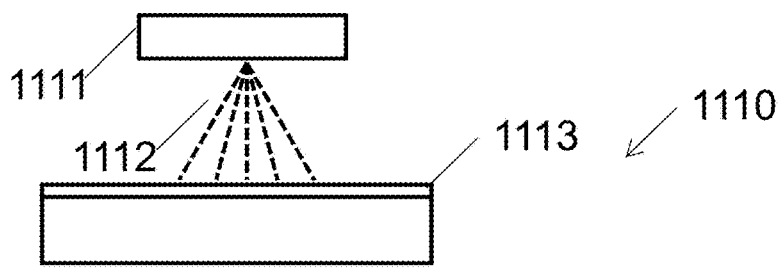
FIG.11B
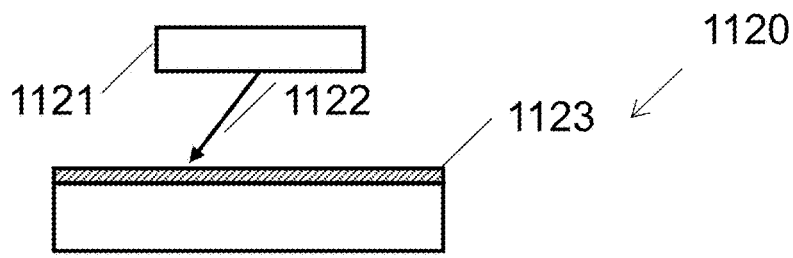
FIG.11C
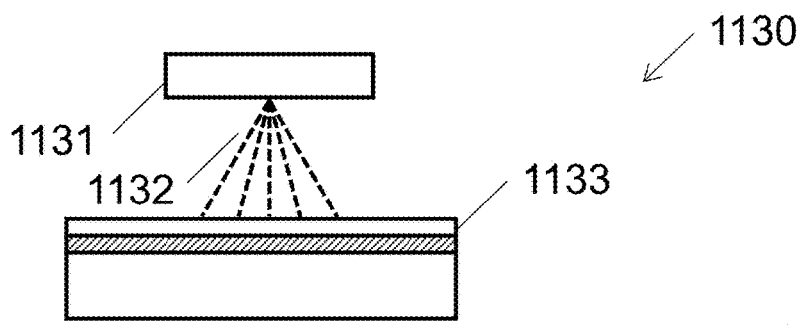
FIG.11D
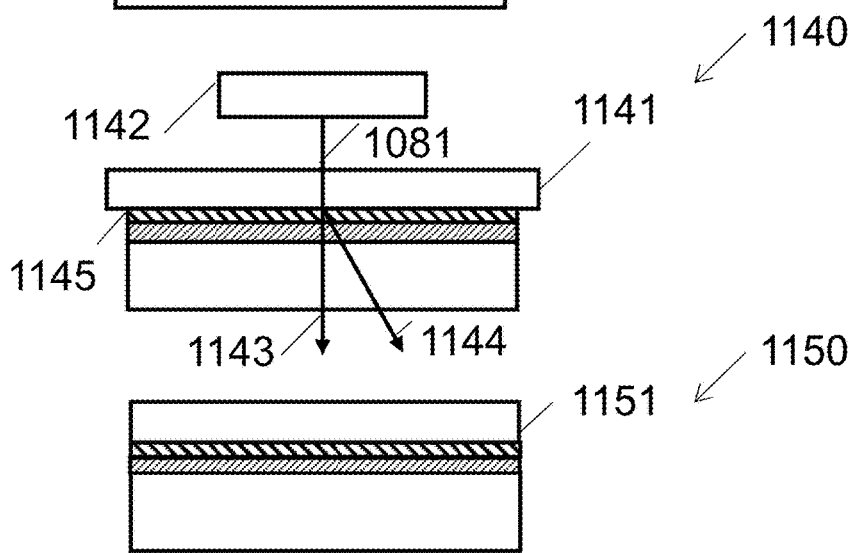
FIG.11E
FIG.11F

HOLOGRAPHIC WAVEGUIDES INCORPORATING BIREFRINGENCE CONTROL AND METHODS FOR THEIR FABRICATION

CROSS-REFERENCE TO RELATED APPLICATIONS

The current application is a continuation of U.S. patent application Ser. No. 16/906,872 entitled "Holographic Waveguides Incorporating Birefringence Control and Methods for Their Fabrication," filed Jun. 19, 2020, which is a continuation of U.S. patent application Ser. No. 16/357,233 entitled "Holographic Waveguides Incorporating Birefringence Control and Methods for Their Fabrication," filed Mar. 18, 2019, which claims the benefit of and priority under 35 U.S.C. § 119(e) to U.S. Provisional Patent Application No. 62/643,977 entitled "Holographic Waveguides Incorporating Birefringence Control and Methods for Their Fabrication," filed Mar. 16, 2018. The disclosures which are hereby incorporated by reference in their entireties for all purposes.

FIELD OF THE INVENTION

The present disclosure relates to optical waveguides and more particularly to waveguide displays using birefringent gratings.

BACKGROUND OF THE INVENTION

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photo-polymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for augmented reality ("AR") and virtual reality ("VR"), compact heads-up displays ("HUDs") for aviation and road transport, and sensors for biometric and laser radar ("LIDAR") applications.

SUMMARY OF THE INVENTION

Following below are more detailed descriptions of various concepts related to, and embodiments of, an inventive optical display and methods for displaying information. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

One embodiment includes a waveguide including at least one waveguide substrate, at least one birefringent grating; at least one birefringence control layer, a light source for outputting light, an input coupler for directing the light into total internal reflection paths within the waveguide, and an output coupler for extracting light from the waveguide, wherein the interaction of the light with the birefringence control layer and the birefringent grating provides a predefined characteristic of light extracted from the waveguide.

In another embodiment, the interaction of light with the birefringence control layer provides at least one of: an angular or spectral bandwidth variation, a polarization rotation, a birefringence variation, an angular or spectral dependence of at least one of beam transmission or polarization rotation, and a light transmission variation in at least one direction in the plane of the waveguide substrate.

In a further embodiment, the predefined characteristic varies across the waveguide.

In still another embodiment, the predefined characteristic results from the cumulative effect of the interaction of the light with the birefringence control layer and the birefringent grating along at least one direction of light propagation within the waveguide.

In a still further embodiment, the predefined characteristic includes at least one of: uniform illumination and uniform polarization over the angular range of the light.

In yet another embodiment, the birefringence control layer provides compensation for polarization rotation introduced by the birefringent grating along at least one direction of light propagation within the waveguide.

In a yet further embodiment, the birefringence control layer is a liquid crystal and polymer material system.

In another additional embodiment, the birefringence control layer is a liquid crystal and polymer system aligned using directional ultraviolet radiation.

In a further additional embodiment, the birefringence control layer is aligned by at least one of: electromagnetic radiation, electrical or magnetic fields, mechanical forces, chemical reaction, and thermal exposure.

In another embodiment again, the birefringence control layer influences the alignment of LC directors in a birefringent grating formed in a liquid crystal and polymer system.

In a further embodiment again, the birefringence control layer has an anisotropic refractive index.

In still yet another embodiment, the birefringence control layer is formed on at least one internal or external optical surface of the waveguide.

In a still yet further embodiment, the birefringence control layer includes at least one stack of refractive index layers disposed on at least one optical surface of the waveguide, wherein at least one layer in the stack of refractive index layers has an isotropic refractive index and at least one layer in the stack of refractive index layers has an anisotropic refractive index.

In still another additional embodiment, the birefringence control layer provides a high reflection layer.

In a still further additional embodiment, the birefringence control layer provides optical power.

In still another embodiment again, the birefringence control layer provides an environmental isolation layer for the waveguide.

In a still further embodiment again, the birefringence control layer has a gradient index structure.

In yet another additional embodiment, the birefringence control layer is formed by stretching a layer of an optical material to spatially vary its refractive index in the plane of the waveguide substrate.

In a yet further additional embodiment, the light source provides collimated light in angular space.

In yet another embodiment again, at least one of the input coupler and output coupler includes a birefringent grating.

In a yet further embodiment again, the birefringent grating is recorded in a material system including at least one polymer and at least one liquid crystal.

In another additional embodiment again, the at least one birefringent grating includes at least one birefringent grating for providing at least one of the functions of: beam expansion in a first direction, beam expansion in a second direction and light extraction from the waveguide, and coupling light from the source into a total internal reflection path in the waveguide.

In a further additional embodiment again, the light source includes a laser, and the alignment of LC directors in the birefringent grating spatially vary to compensate for illumination banding.

A still yet another additional embodiment includes a method of fabricating a waveguide, the method including providing a first transparent substrate, depositing a layer of grating recording material, exposing the layer of grating recording material to form a grating layer, forming a birefringence control layer, and applying a second transparent substrate.

In a still yet further additional embodiment, the layer of grating recording material is deposited onto the substrate, the birefringence control layer is formed on the grating layer, and the second transparent substrate is applied over the birefringence control layer.

In yet another additional embodiment again, the layer of grating recording material is deposited onto the substrate, the second transparent substrate is applied over the grating layer, and the birefringence control layer is formed on second transparent substrate.

In a yet further additional embodiment again, the birefringence control layer is formed on the first transparent substrate, the layer of grating recording material is deposited onto the birefringence control layer, and the second transparent substrate is applied over the grating layer.

In still yet another embodiment, the method further includes depositing a layer of liquid crystal polymer material and aligning the liquid crystal polymer material using directional UV light, wherein the layer of grating recording material is deposited onto the substrate and the second transparent substrate is applied over the aligned liquid crystal polymer layer.

In a still yet further embodiment again, the layer of liquid crystal polymer material is deposited onto one of either the grating layer or the second transparent substrate.

In still yet another additional embodiment again, the layer of liquid crystal polymer material is deposited onto the first transparent substrate, the layer of grating recording material is deposited onto the aligned liquid crystal polymer material, and the second transparent substrate is applied over the grating layer.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 10A-10F conceptually illustrate the process steps and apparatus for fabricating a waveguide containing a birefringent grating with a birefringence control layer applied to an outer surface of the waveguide in accordance with various embodiments of the invention.

FIGS. 11A-11F conceptually illustrate the process steps and apparatus for fabricating a waveguide containing a birefringent grating and a birefringence control layer in accordance with various embodiments of the invention.

DETAILED DESCRIPTION OF THE INVENTION

Figure 1:
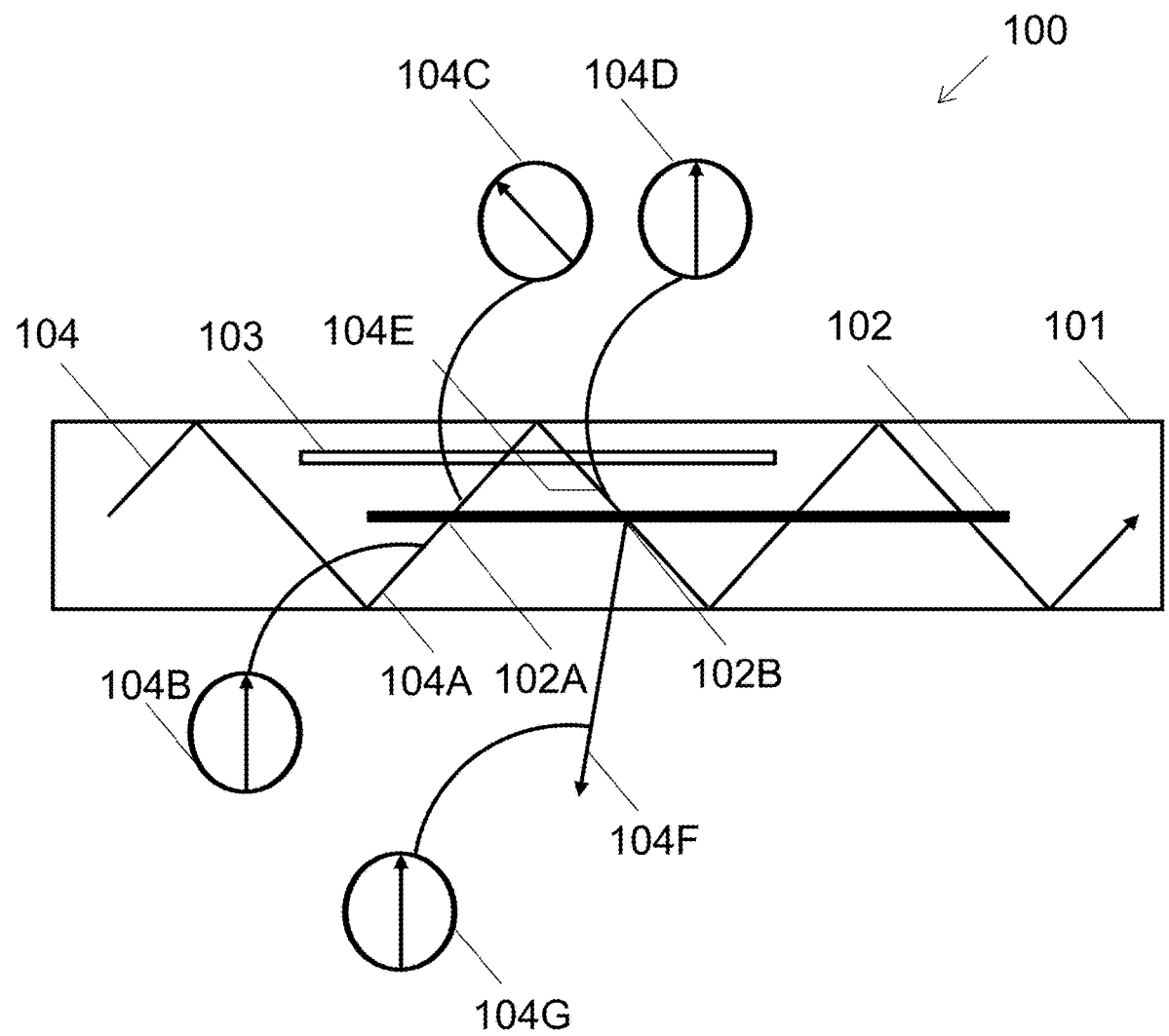
FIG. 1 conceptually illustrates a schematic cross section view of a waveguide incorporating a birefringent grating and birefringence control layer in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated, the term "on-axis" in relation to a ray or a beam direction refers to propagation parallel to an axis normal to the surfaces of the optical components described in relation to the invention. In the following description the terms light, ray, beam, and direction may be used interchangeably and in association with each other to indicate the direction of propagation of electromagnetic radiation along rectilinear trajectories. The term light and illumination may be used in relation to the visible and infrared bands of the electromagnetic spectrum. Parts of the following description will be presented using terminology commonly employed by those skilled in the art of optical design. In the following description, the term grating may be used to refer to any kind of diffractive structure used in a waveguide, including holograms and Bragg or volume holograms. The term grating may also encompass a grating that includes of a set of gratings. For example, in some embodiments the input grating and output grating each include two or more gratings multiplexed into a single layer. For illustrative purposes, it is to be understood that the drawings are not drawn to scale unless stated otherwise.

Referring generally to the drawings, systems and methods relating to waveguide applications incorporating birefringence control in accordance with various embodiments of the invention are illustrated. Birefringence is the optical property of a material having a refractive index that depends on the polarization and propagation direction of light. A birefringent grating can be referred to as a grating having such properties. In many cases, the birefringent grating is formed in a liquid crystal polymer material system such as but not limited to HPDLC mixtures. The polarization properties of such a grating can depend on average relative permittivity and relative permittivity modulation tensors.

Many embodiments in accordance with the invention are directed towards waveguides implementing birefringence control. In some embodiments, the waveguide includes a birefringent grating layer and a birefringence control layer. In further embodiments, the birefringence control layer is compact and efficient. Such structures can be utilized for various applications, including but not limited to: compensating for polarization related losses in holographic waveguides; providing three-dimensional LC director alignment in waveguides based on Bragg gratings; and spatially varying angular/spectral bandwidth for homogenizing the output from a waveguide. In some embodiments, a polarization-maintaining, wide-angle, and high-reflection waveguide cladding with polarization compensation is implemented for grating birefringence. In several embodiments, a thin polarization control layer is implemented for providing either quarter wave or half wave retardation. In a number of embodiments, a polarization-maintaining, wide-angle birefringence control layer is implemented for modifying the polarization output of a waveguide to balance the birefringence of an external optical element used with the waveguide.

In many embodiments, the waveguide includes at least one input grating and at least one output grating. In further embodiments, the waveguide can include additional gratings for various purposes, such as but not limited to fold gratings for beam expansion. The input grating and output grating may each include multiplexed gratings. In some embodiments, the input grating and output grating may each include two overlapping gratings layers that are in contact or vertically separated by one or more thin optical substrate. In some embodiments, the grating layers are sandwiched between glass or plastic substrates. In some embodiments two or more such gratings layers may form a stack within which total internal reflection occurs at the outer substrate and air interfaces. In some embodiments, the waveguide may include just one grating layer. In some embodiments, electrodes may be applied to faces of the substrates to switch gratings between diffracting and clear states. The stack may further include additional layers such as beam splitting coatings and environmental protection layers. The input and output gratings shown in the drawings may be provided by any of the above described grating configurations. Advantageously, the input and output gratings can be designed to have common surface grating pitch. In cases where the waveguide contains grating(s) in addition to the input and output gratings, the gratings can be designed to have grating pitches such that the vector sum of the grating vectors is substantially zero. The input grating can combine gratings orientated such that each grating diffracts a polarization of the incident unpolarized light into a waveguide path. The output gratings can be configured in a similar fashion such that the light from the waveguide paths is combined and coupled out of the waveguide as unpolarized light. Each grating is characterized by at least one grating vector (or K-vector) in 3D space, which in the case of a Bragg grating is defined as the vector normal to the Bragg fringes. The grating vector can determine the optical efficiency for a given range of input and diffracted angles. In some embodiments, the waveguide includes at least one surface relief grating. Waveguide gratings structures, materials systems, and birefringence control are discussed below in further detail.

Switchable Bragg Gratings

Optical structures recorded in waveguides can include many different types of optical elements, such as but not limited to diffraction gratings. In many embodiments, the grating implemented is a Bragg grating (also referred to as a volume grating). Bragg gratings can have high efficiency with little light being diffracted into higher orders. The relative amount of light in the diffracted and zero order can be varied by controlling the refractive index modulation of the grating, a property that is can be used to make lossy waveguide gratings for extracting light over a large pupil. One class of gratings used in holographic waveguide devices is the Switchable Bragg Grating ("SBG"). SBGs can be fabricated by first placing a thin film of a mixture of photopolymerizable monomers and liquid crystal material between glass plates or substrates. In many cases, the glass plates are in a parallel configuration. One or both glass plates can support electrodes, typically transparent tin oxide films, for applying an electric field across the film. The grating structure in an SBG can be recorded in the liquid material (often referred to as the syrup) through photopolymerization-induced phase separation using interferential exposure with a spatially periodic intensity modulation. Factors such as but not limited to control of the irradiation intensity, component volume fractions of the materials in the mixture, and exposure temperature can determine the resulting grating morphology and performance. As can readily be appreciated, a wide variety of materials and mixtures can be used depending on the specific requirements of a given application. In many embodiments, HPDLC material is used. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The resulting volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from indium tin oxide ("ITO"). In the OFF state with no electric field applied, the extraordinary axis of the liquid crystals generally aligns normal to the fringes. The grating thus exhibits high refractive index modulation and high diffraction efficiency for P-polarized light. When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

One of the known attributes of transmission SBGs is that the LC molecules tend to align with an average direction normal to the grating fringe planes (i.e., parallel to the grating or K-vector). The effect of the LC molecule alignment is that transmission SBGs efficiently diffract P polarized light (i.e., light with a polarization vector in the plane of incidence), but have nearly zero diffraction efficiency for S polarized light (i.e., light with the polarization vector normal to the plane of incidence). As a result, transmission SBGs typically cannot be used at near-grazing incidence as the diffraction efficiency of any grating for P polarization falls to zero when the included angle between the incident and reflected light is small. In addition, illumination light with non-matched polarization is not captured efficiently in holographic displays sensitive to one polarization only.

HPDLC Material Systems

HPDLC mixtures in accordance with various embodiments of the invention generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in HPDLC mixtures is known and dates back to the earliest investigations of HPDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. I 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element including: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate SBGs, including investigations into formulating such material systems for achieving high diffraction efficiency, fast response time, low drive voltage, and so forth. U.S. Pat. No. 5,942,157 by Sutherland, and U.S. Pat. No. 5,751,452 by Tanaka et al. both describe monomer and liquid crystal material combinations suitable for fabricating SBG devices. Examples of recipes can also be found in papers dating back to the early 1990s. Many of these materials use acrylate monomers, including:

R. L. Sutherland et al., Chem. Mater. 5, 1533 (1993), the disclosure of which is incorporated herein by reference, describes the use of acrylate polymers and surfactants. Specifically, the recipe includes a crosslinking multi-functional acrylate monomer; a chain extender N-vinyl pyrrolidinone, LC E7, photo-initiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

Overview of Birefringence

Holographic waveguides based on HPDLC offer the benefits of switching capability and high index modulation, but can suffer from the inherent birefringence resulting from the alignment of liquid crystal directors along grating vectors during the LC-polymer phase separation. While this can lead to a large degree of polarization selectivity, which can be advantageous in many applications, adverse effects such as polarization rotation can occur in gratings designed to fold and expand the waveguided beam in the plane of the waveguide (known as fold gratings). This polarization rotation can lead to efficiency losses and output light nonuniformity.

Two common approaches for modifying the alignment of LC directors include rubbing and the application of an alignment layer. Typically, by such means, LC directors in a plane parallel to the alignment layer can be realigned within the plane. In HPDLC Bragg gratings, the problem is more challenging owing to the natural alignment of LC directors along grating K-vectors, making director alignment in all but the simplest gratings a complex three-dimensional problem and rendering conventional techniques using rubbing or polyamide alignment layers impractical. Other approaches can include applying electric fields, magnetic fields, and mechanical pressure during curing. These approaches have been shown to have limited success when applied to reflection gratings. However, such techniques typically do not easily translate to transmission Bragg grating waveguides.

A major design challenge in waveguides is the coupling of image content from an external projector into the waveguide efficiently and in such a way that the waveguide image is free from chromatic dispersion and brightness non-uniformity. To overcome chromatic dispersion and to achieve the respectable collimation, the use of lasers can be implemented. However, lasers can suffer from the problem of pupil banding artifacts, which manifest themselves as output illumination non-uniformity. Banding artifacts can form when the collimated pupil is replicated (expanded) in a TIR waveguide. In basic terms, the light beams diffracted out of the waveguide each time the beam interacts with the grating can have gaps or overlaps, leading to an illumination ripple. In many cases, the degree of ripple is a function of field angle, waveguide thickness, and aperture thickness. The effect of banding can be smoothed by the dispersion typically exhibited by broadband sources such as LEDs. However, LED illumination is not entirely free from the banding problem and, moreover, tends to result in bulky input optics and an increase in the thickness of the waveguide. Debanding can be minimized using a pupil shifting technique for configuring the light coupled into the waveguide such that the input grating has an effective input aperture that is a function of the TIR angle. Techniques for performing pupil-shifting in international application No. PCT/US2018/015553 entitled "Waveguide Device with Uniform Output Illumination," the disclosure of which is hereby incorporated by reference in its entirety.

In some cases, the polarization rotation that takes place in fold gratings (described above) can compensate for illumination banding in waveguides that uses laser illumination. The mechanism for this is that the large number of grating interactions in a fold grating combined with the small polarization rotation at each interaction can average out the banding (arising from imperfect matching of TIR beams and other coherent optical effects such as but not limited to those arising from parasitic gratings left over from the recording process, stray light interactions with the grating and waveguide surfaces, etc.). The process of compensating for the birefringence can be aided by fine tuning the spatial variation of the birefringence (alignment of the LC directors) in the fold grating.

A further issue that arises in waveguide displays is that contact with moisture or surface combination can inhibit waveguide total internal reflection (TIR), leading to image gaps. In such cases, the scope for using protective outer layers can be limited by the need for low index materials that will provide TIR over the waveguide angular bandwidth. A further design challenge in waveguides is maintaining high efficiency over the angular bandwidth of the waveguide. One exemplary solution would be a polarization-maintaining, wide-angle, and high-reflection waveguide cladding. In some applications, polarization balancing within a waveguide can be accomplished using either a quarter wave retarding layer or a half wave retarder layer applied to one or both of the principal reflecting surfaces of the waveguide. However, in some cases, practical retarder films can add unacceptable thickness to the waveguide. Thin film coatings of the required prescription will normally entail an expensive and time-consuming vacuum coating step. One exemplary method of implementing a coating includes but not limited to the use of an inkjet printing or industry-standard spin-coating procedure. In many embodiments, the coating could be applied directly to a printed grating layer. Alternatively, the coating could be applied to an external optical surface of the assembled waveguide.

In some applications, waveguides are combined with conventional optics for correcting aberrations. Such aberrations may arise when waveguides are used in applications such as but not limited to a car HUD, which projects an image onto a car windscreen for reflection into the viewer's eyebox. The curvatures of the windscreen can introduce significant geometric aberration. Since many waveguides operate with collimated beams, it can be difficult to pre-compensate for the distortion within the waveguide itself. One solution includes mounting a pre-compensating optical element near the output surface of the waveguides. In many cases, the optical element is molded in plastic and can introduce severe birefringence, which should be balanced by the waveguide.

In view of the above, many embodiments of the invention are directed towards birefringence control layers designed to address one or more of the issues posed above. For example, in many embodiments, a compact and efficient birefringence control layer is implemented for compensating for polarization related losses in holographic waveguides, for providing three-dimensional LC director alignment in waveguides based on Bragg gratings, for spatially varying angular/spectral bandwidth for homogenizing the output from a waveguide, and/or for isolating a waveguide from its environment while ensuring confinement of wave-guided beams. In some embodiments, a polarization-maintaining, wide-angle, and high-reflection waveguide cladding with polarization compensation is implemented for grating birefringence. In several embodiments, a thin polarization control layer is implemented for providing either quarter wave or half wave retardation. A polarization control layer can be implemented as a thin layer directly on top of the grating layer or to one or both of the waveguide substrates using a standard spin coating or inkjet printing process. In a number of embodiments, a polarization-maintaining, wide-angle birefringence control layer is implemented for modifying the polarization output of a waveguide to balance the birefringence of an external optical element used with the waveguide. Other implementations and specific configurations are discussed below in further detail.

Waveguide Applications Incorporating Birefringence Control

Waveguides and waveguide displays implementing birefringence control techniques in accordance with various embodiments of the invention can be achieved using many different techniques. In some embodiments, the waveguide includes a birefringent grating layer and a birefringence control layer. In further embodiments, a compact and efficient birefringence control layer is implemented. A birefringence control layer can be implemented for various functions such as but not limited to: compensating for polarization related losses in holographic waveguides; providing three-dimensional LC director alignment in waveguides based on Bragg gratings; and efficient and cost-effective integration within a waveguide for spatially varying angular/spectral bandwidth for homogenizing the output from the waveguide. In any of the embodiments to be described, the birefringence control layer may be formed on any optical surface of the waveguide. For the purposes of understanding the invention, an optical surface of the waveguide may be one of the TIR surfaces, a surface of the grating layer, a surface of the waveguide substrates sandwiching the grating layer, or a surface of any other optical substrate implemented within the waveguide (for example, a beam-splitter layer for improving uniformity).

FIG. 1 conceptually illustrates a waveguide implementing a birefringence control layer in accordance with an embodiment of the invention. In the illustrative embodiment, the waveguide apparatus 100 includes an optical substrate 101 containing a birefringent grating layer 102 and a birefringence control layer 103. As shown, light 104 propagating under TIR within the waveguide interacts with both layers.

For example, the light ray 104A with an initial polarization state represented by the symbol 104B has its polarization rotated to the state 104C after propagation through the grating region around the point 102A. The birefringence control layer 103 rotates the polarization vector into the state 104D, which is the polarization state for achieving some predefined diffraction efficiency of the ray 104E when it interacts with the grating around the point 102B and is diffracted into the direction 104F with a polarization state 104G, which is similar to the state 104D. As will be shown in the following description, many different configurations of a birefringence control layer and birefringent grating can be implemented in accordance with various embodiments of the invention.

Figure 2:
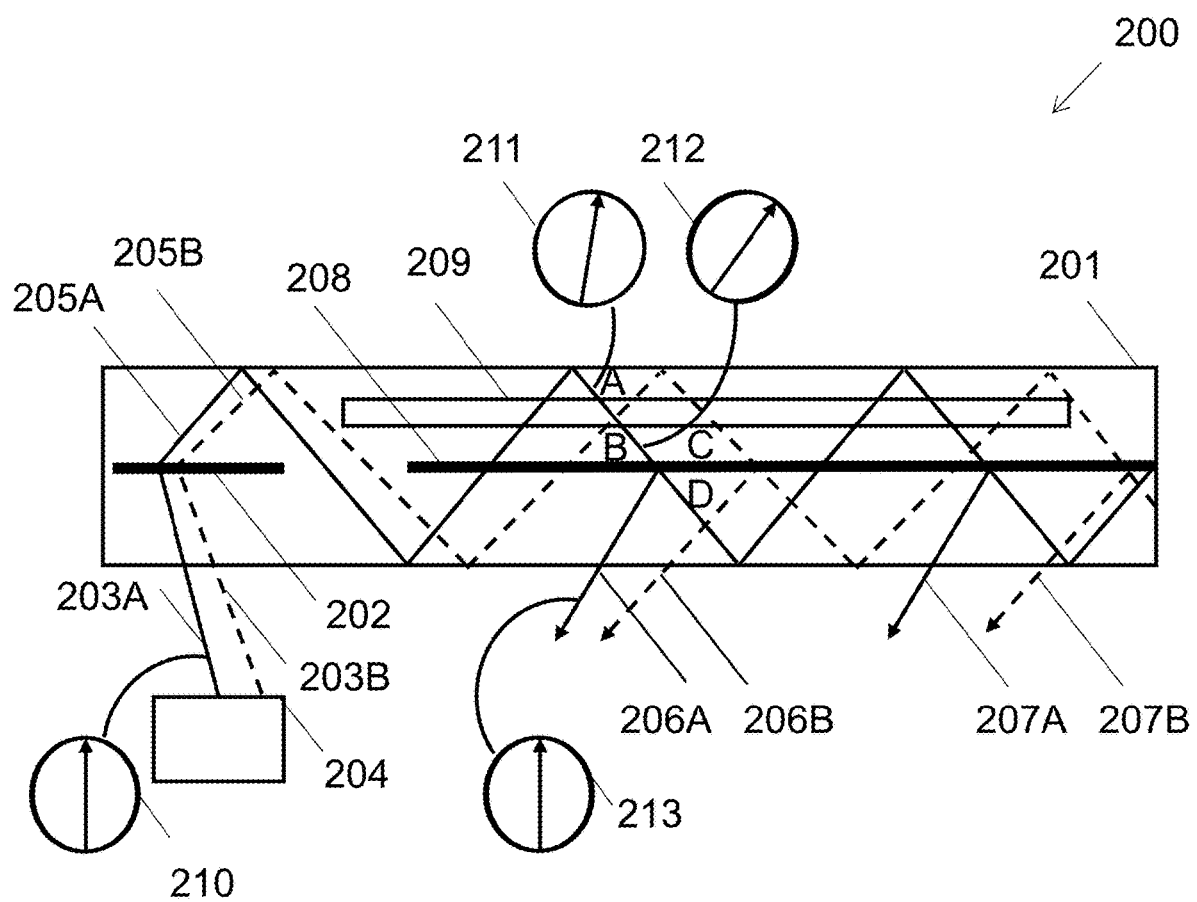
FIG. 2 conceptually illustrates a schematic cross section view of a waveguide incorporating a birefringent grating and birefringence control layer for compensating grating birefringence in accordance with some embodiments of the invention.

FIG. 2 conceptually illustrates a waveguide apparatus 200 that includes at least one optical substrate 201 and a coupler 202 for deflecting light 203A, 203B (covering a range of incident angles) from an external source 204 into TIR paths 205A, 205B in the waveguide substrate. Light in the TIR path can interact with the output grating, which can be configured to extract a portion of the light each time the TIR light satisfies the condition for diffraction by the grating. In the case of a Bragg grating, extraction can occur when the Bragg condition is met. More precisely, efficient extraction can occur when a ray incident on the grating lies within an angular bandwidth and spectral bandwidth around the Bragg condition. The bandwidths being defined according to some measure of acceptable diffraction efficiency (such as but not limited to 50% of peak DE). For example, light in the TIR ray paths 205A, 205B is diffracted by the output grating into output direction 206A, 206B, 207A, and 207B at different points along the output grating. It should be apparent from basic geometrical optics that a unique TIR angle can be defined by each light incidence angle at the input grating.

Many different types of optical elements can be used as the coupler. For example, in some embodiments, the coupler is a grating. In several embodiments, the coupler is a birefringent grating. In many embodiments, the coupler is a prism. The apparatus further includes at least one birefringent grating 208 for providing beam expansion in a first direction and light extraction from the waveguide and at least one birefringence control layer 209 with anisotropic refractive index properties. In the embodiments to be discussed, the source 204 can be an input image generator that includes a light source, a microdisplay panel, and optics for collimating the light. As can readily be appreciated, various input image generators can be used, including those that output non-collimated light. In many embodiments, the input image generator projects the image displayed on the microdisplay panel such that each display pixel is converted into a unique angular direction within the substrate waveguide. The collimation optics may include lens and mirrors, which can be diffractive lenses and mirrors. In some embodiments, the source may be configured to provide illumination that is not modulated with image information. In several embodiments, the light source can be a laser or LED and can include one or more lenses for modifying the illumination beam angular characteristics. In a number of embodiments, the image source can be a micro-display or an image scanner.

The interaction of the light with the birefringence control layer 209 and the birefringent grating 208 integrated along the total internal reflection path for any direction of the light can provide a predefined characteristic of the light extracted from the waveguide. In some embodiments, the predefined characteristic includes at least one of a uniform polarization or a uniform illumination over the angular range of the light.

FIG. 2 also illustrates how the birefringence control layer 209 and grating 208 provide uniform polarization. In many embodiments, the input state will correspond to P polarization, a state which may be used for gratings recorded in HPDLC. For the purposes of explaining the invention, an initial polarization state represented by 210 is assumed. The interaction of the light with the birefringence control layer near a grating interaction region along the TIR path 205A is represented by the polarization states 211, 212, which show the rotation of the polarization vector before and after propagation through the thickness AB of the birefringence control layer 209. This polarization rotation can be designed to balance the polarization rotation through the thickness CD of the adjacent grating region the ray encounters along the TIR path 205A. Thus, the polarization of the light extracted by the grating can be aligned parallel to the input polarization vector as indicated by the polarization state 213. In some embodiments, the output polarization state may differ from the input polarization state. In a number of embodiments, such as the one shown in FIG. 2, there is at least partial overlap of the birefringent grating and the birefringence control layer. In several embodiments, the two are separated by a portion of the waveguide path.

Figure 3:
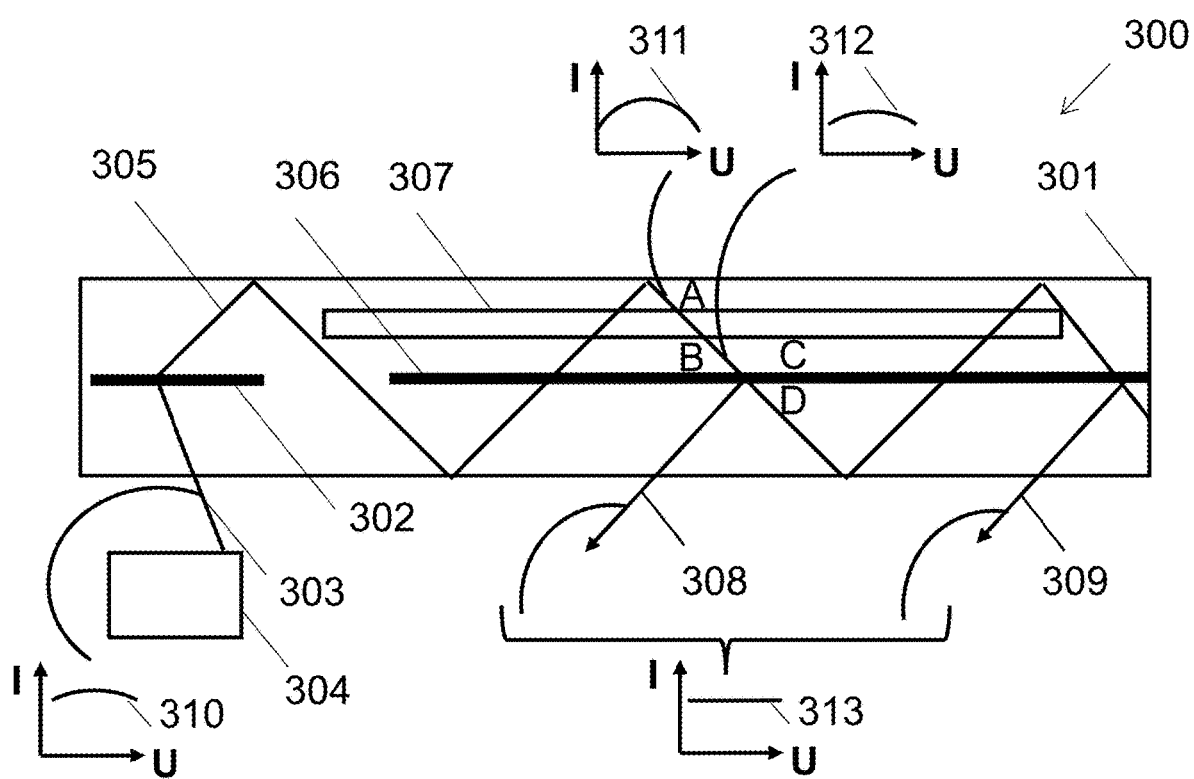
FIG. 3 conceptually illustrates a schematic cross section view of a waveguide incorporating a birefringent grating and birefringence control layer for providing uniform output illumination from the waveguide in accordance with an embodiment of the invention.

FIG. 3 conceptually illustrates a waveguide apparatus 300 in which the birefringence control layer and grating provide uniform output illumination in accordance with an embodiment of the invention. In the illustrative embodiment, the waveguide apparatus 300 includes at least one optical substrate 301 and a coupler 302 for deflecting light 303 from an external source 304 into TIR path 305 in the waveguide substrate. The apparatus 300 further includes at least one birefringent grating 306 for providing beam expansion in a first direction and light extraction from the waveguide and at least one birefringence control layer 307 with anisotropic index properties. As shown, light in the TIR ray paths 305 can be diffracted by the output grating into output direction 308, 309. For the purposes of explaining the invention, an initial beam illumination (I) versus angle (U) profile represented by 310 is assumed. The interaction of the light with the birefringence control layer 307 near a grating interaction region along the TIR path 305 is characterized by the illumination profiles before (311) and after (312) propagation through the thickness AB of the birefringence control layer. In some applications, such as but not limited to display applications, the waveguide apparatus 300 can be designed to have uniform illumination versus angle across the exit pupil of the waveguide. This may be achieved by matching the birefringence versus angle characteristics of the birefringence control layer to the angular bandwidth of the grating (along nearby grating paths CD in proximity to the path AB) such that the light extracted by the grating (indicated by 308, 309) integrated across the waveguide exit pupil provides uniform illumination versus angle distribution 313. In some embodiments, the characteristics of the grating and birefringence control layer vary over the aperture of the waveguide.

Implementing Birefringence Control Layers

Various materials and fabrication processes can be used to provide a birefringence control layer. In many embodiments, the birefringent control layer has anisotropic index properties that can be controlled during fabrication to provide a spatial distribution of birefringence such that the interaction of the light with the birefringence control layer and the birefringent grating integrated along the total internal reflection path for any direction of the light provides a predefined characteristic of the light extracted from the waveguide. In some embodiments, the layer may be implemented as a thin stack that includes more than one layer.

Alignment of HPDLC gratings can present significant challenges depending on the grating configuration. In the simplest case of a plane grating, polarization control can be confined to a single plane orthogonal to the grating plane. Rolled K-vector gratings can require the alignment to vary across the grating plane. Fold gratings, particularly ones with slanted Bragg fringes, can have much more complicated birefringence, requiring 3D alignment and, in some cases, more highly spatially resolved alignment.

The following examples of birefringence control layers for use with the invention are illustrative only. In each case, it is assumed that the layer is processed such that the properties vary across the surface of the layer. It is also assumed that the birefringence control layer is configured within the waveguide or on an optical surface of the waveguide containing the grating. In some embodiments, the birefringence control layer is in contact with the grating layer. In several cases, the birefringence control layer spits into separate sections and are disposed on different surfaces of the waveguide. In a number of embodiments, a birefringence layer may include multiple layers.

In some embodiments, the invention provides a thin polarization control layer that can provide either quarter wave or half wave retardation. The polarization control layer can be implemented as a thin layer directly on top of the grating layer or to one or both of the waveguide substrates using a standard spin coating or ink jet printing process.

In one group of embodiments, the birefringence control layer is formed using materials using liquid crystal and polymer networks that can be aligned in 3D using directional UV light. In some embodiments, the birefringence control layer is formed at least in part from a Liquid Crystal Polymer (LCP) Network. LCPs, which have also been referred to in the literature as reactive mesogens, are polymerizable liquid crystals containing liquid crystalline monomers that include, for example, reactive acrylate end groups, which polymerize with one another in the presence of photo-initiators and directional UV light to form a rigid network. The mutual polymerization of the ends of the liquid crystal molecules can freeze their orientation into a three-dimensional pattern. The process typically includes coating a material system containing liquid crystal polymer onto a substrate and selectively aligning the LC directors using directionally/spatially controllable UV source prior to annealing. In some embodiments, the birefringence control layer is formed at least in part from a Photo-Alignment Layer, also referred to in the literature as a linearly polymerized photopolymer (LPP). An LPP can be configured to align LC directors parallel or perpendicular to incident linearly polarized UV light. LPP can be formed in very thin layers (typically 50 nm) minimizing the risks of scatter or other spurious optical effect. In some embodiments, the birefringence control layer is formed from LCP, LPP, and at least one dopant. Birefringence control layers based on LCPs and LPPs can be used align LC directors in the complex three-dimensional geometries characteristic of fold gratings and rolled K-vector gratings formed in thin film (2-4 microns). In some embodiments, a birefringence control layer based on LCPs or LPPs further includes dichroic dyes, chiral dopants to achieve narrow or broadband cholesteric filters, twisted retarders, or negative c-plate retarders. In many embodiments, birefringence control layers based on LCPs or LPPs provide quarter or half-wave retardation layers.

Figure 4:
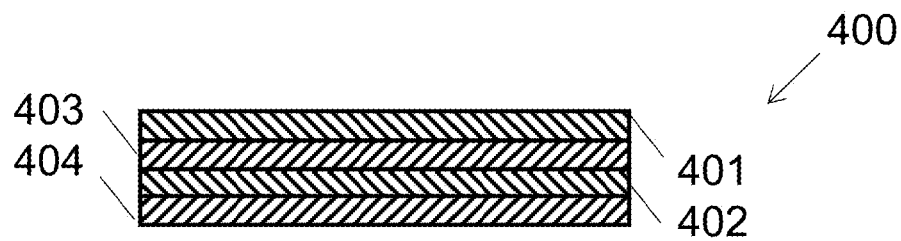
FIG. 4 conceptually illustrates a schematic cross section view of a birefringence control layer formed by a multilayer structure combining isotropic and anisotropic index layers in accordance with an embodiment of the invention.
Figure 5:
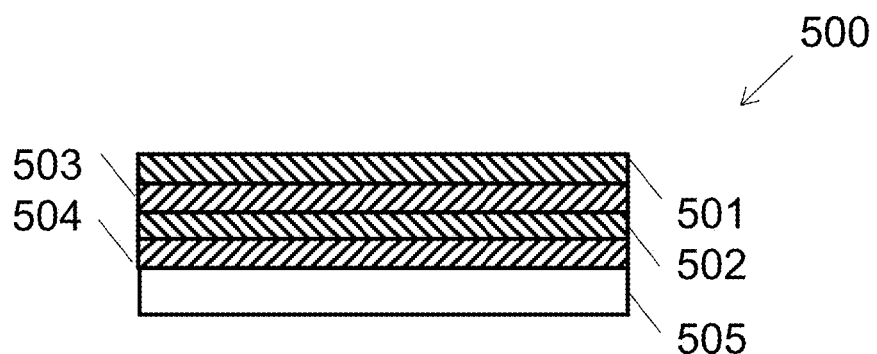
FIG. 5 conceptually illustrates a schematic cross section view of a birefringence control layer formed by a multilayer structure combining isotropic and anisotropic index layers integrated with a birefringent grating layer in accordance with an embodiment of the invention.

In some embodiments, the birefringence control layer is formed by a multilayer structure combining isotropic and anisotropic index layers (as shown in FIG. 4). In FIG. 4, the multilayer structure 400 includes isotropic layers 401, 402 and anisotropic index layers 403, 404. In some embodiments, a multiplayer stack may include a high number of layers, such as but not limited to several tens or several hundreds of layers. FIG. 5 conceptually illustrates a multilayer structure 500 that includes isotropic layers 501, 502 and anisotropic index layers 503, 504 combined with a birefringent grating layer 505. When birefringence is on the order of the change of the in-plane refractive index between adjacent material layers of the stack, it is possible to achieved improved control of the reflectivity of P-polarized light. Normally in isotropic materials Brewster's law dictates that for any interface, there is an angle of incidence (Brewster's angle) for which the P-polarization reflectivity vanishes. However, the reflectivity can increase dramatically at other angles. The limitations imposed by the Brewster angle can be overcome by applying the basic principles discussed in Weber et al., "Giant Birefringent Optics in Multilayer Polymer Mirrors," published in Science, Vol. 287, 31 Mar. 2000, pages 2451-2456. Because the optical characteristic of systems of isotropic/anisotropic index layers are based on the fundamental physics of interfacial reflection and phase thickness and not on a particular multilayer interference stack design, new design freedoms are possible. Designs for wide-angle, broadband applications are simplified if the Brewster angle restriction is eliminated, particularly for birefringence control layers immersed in a high-index medium such as a waveguide substrate. A further advantage in relation to waveguide displays is that color fidelity can be maintained for all incidence angles and polarizations.

A birefringent grating will typically have polarization rotation properties that are functions of angle wavelength. The birefringence control layer can be used to modify the angular, spectral, or polarization characteristics of the waveguide. In some embodiments, the interaction of light with the birefringence control layer can provide an effective angular bandwidth variation along the waveguide. In many embodiments, the interaction of light with the birefringence control layer can provide an effective spectral bandwidth variation along the waveguide. In several embodiments, the interaction of light with the birefringence control layer can provide a polarization rotation along the waveguide. In a number of embodiments, the grating birefringence can be made to vary across the waveguide by spatially varying the composition of the liquid crystal polymer mixture during grating fabrication. In some embodiments, the birefringence control layer can provide a birefringence variation in at least one direction in the plane of the waveguide substrate. The birefringence control layer can also provide a means for optimizing optical transmission (for different polarizations) within the waveguide. In many embodiments, the birefringence control layer can provide a transmission variation in at least one direction in the plane of the waveguide substrate. In several embodiments, the birefringence control layer can provide an angular dependence of at least one of beam transmission or polarization rotation in at least one direction in the plane of the waveguide substrate. In a number of embodiments, the birefringence control layer can provide a spectral dependence of at least one of beam transmission or polarization rotation in at least one direction in the plane of the waveguide substrate.

Figure 6:
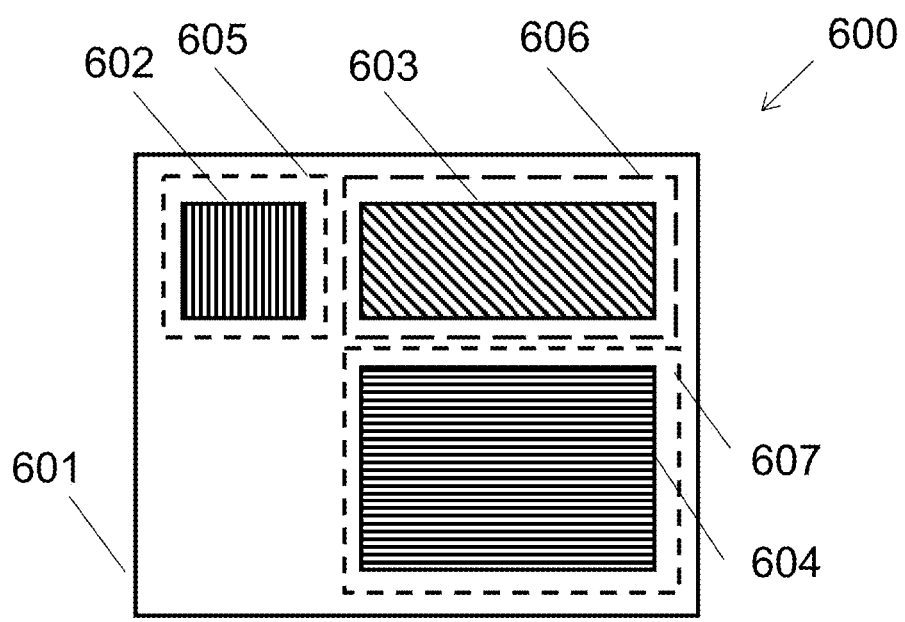
FIG. 6 conceptually illustrates a plan view of a dual expansion waveguide with birefringent control layers in accordance with an embodiment of the invention.

In many embodiments, birefringent gratings may provide input couplers, fold gratings, and output gratings in a wide range of waveguide architectures. FIG. 6 conceptually illustrates a plan view of a dual expansion waveguide with birefringent control layers in accordance with an embodiment of the invention. In the illustrative embodiment, the waveguide 600 includes an optical substrate 601 that contains an input grating 602, a fold grating 603, and an output grating 604 that are overlaid by polarization control layers 605, 606, 607, respectively.

Figure 7:
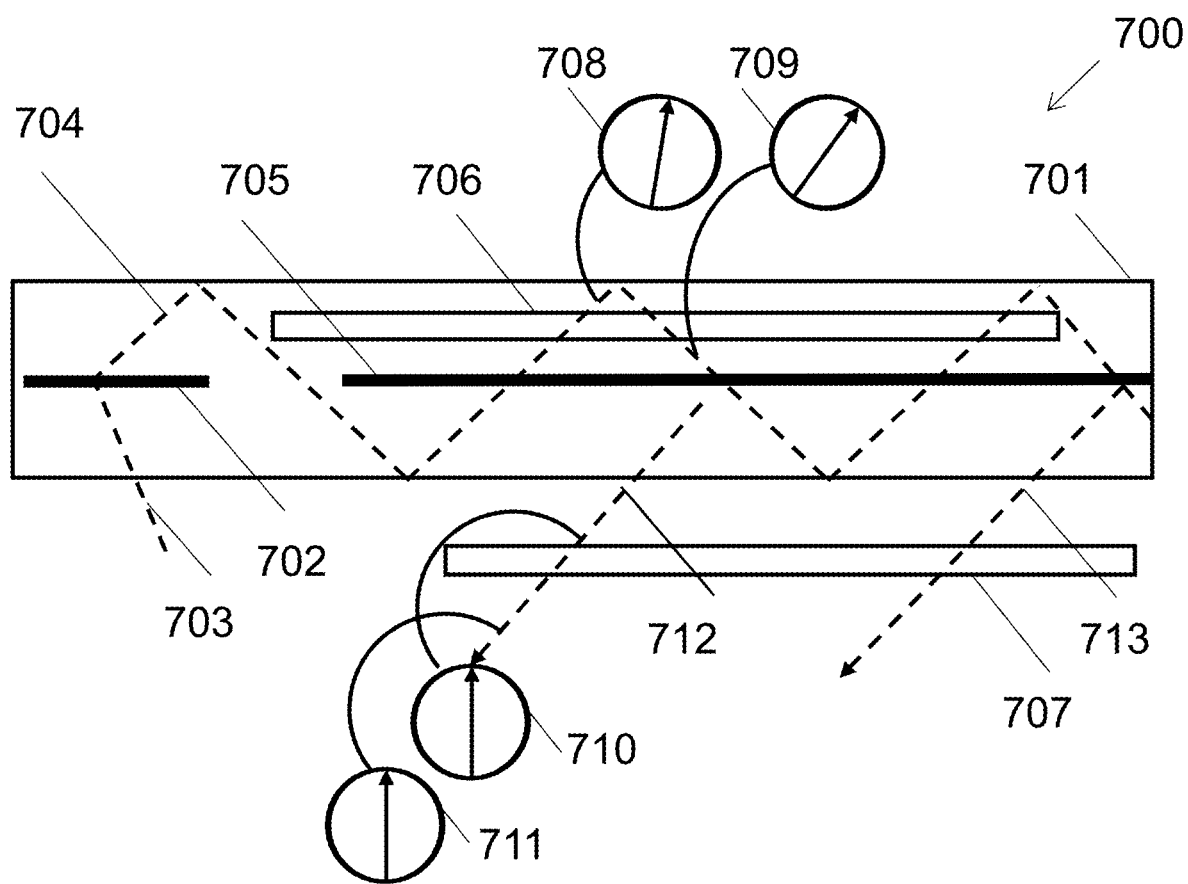
FIG. 7 conceptually illustrates a schematic cross section view of a waveguide incorporating a birefringent grating and birefringence control layer for correcting birefringence introduced by an optical element in the output light path from the waveguide in accordance with an embodiment of the invention.

In some embodiments, the invention provides a polarization-maintaining, wide angle birefringence control layer for modifying the polarization output of a waveguide to balance the birefringence of an external optical element used with the waveguide. FIG. 7 conceptually illustrates an embodiment of the invention directed at automobile HUDs, which reflect collimated imagery off the windscreen into an eyebox. Any windscreen curvature will typically result in aberrations and other geometrical distortion, which cannot be corrected in certain waveguide implementations with the requirement for the beam to remain substantially collimated. One solution to this problem is to mount a correction element, which may be a conventional refractive element or a diffractive element, near the output surface of the waveguide. In such implementations, the birefringence correction component can avoid disturbing ray paths from the waveguide and can be achromatic. The compensator technology used can provide spatially-varying configuration, low haze, and high transmission. In the illustrative embodiment of FIG. 7, the waveguide 700 includes an optical substrate 701 containing a grating coupler 702 for deflecting light 703 from an external source of image modulated light (not shown) into the TIR path 704 in the waveguide, a birefringent grating 705 for providing beam expansion in a first direction and extracting light from the waveguide, and a birefringence control layer 706. The apparatus 700 further includes an optical element 707 disposed in proximity to the waveguide for correcting geometrical distortions and other aberrations introduced by reflection at the windscreen. In some embodiments, the optical element 707 is a refractive lens. In other embodiments, the optical element 707 can be a diffractive lens. For wide field of view HUDs providing a generous eye box, the corrector will typically have a large footprint with a horizontal dimension (along the dashboard) as large as 400 mm. However, if the corrector is molded in plastic, it will tend to suffer from birefringence. Hence, in the embodiment of FIG. 7, the birefringence control element 706 can be designed to compensate for both the grating polarization and polarization rotation introduced by the optical element 707. Referring again to FIG. 7, an initial polarization state corresponding to P polarization is assumed. The polarization state after propagation through the birefringence grating, birefringence control layer, and the correction elements is represented by the symbols 708-711. The interaction of the light with the birefringence control layer near to a grating interaction region along the TIR path is represented by the polarization states. In the embodiment of FIG. 7, the polarization of the light 712, 713 extracted by the grating is aligned parallel to the input polarization vector. In some embodiments, the birefringence control layer 706 may be configured to rotate the output light polarization vector through ninety degrees.

Figure 8:
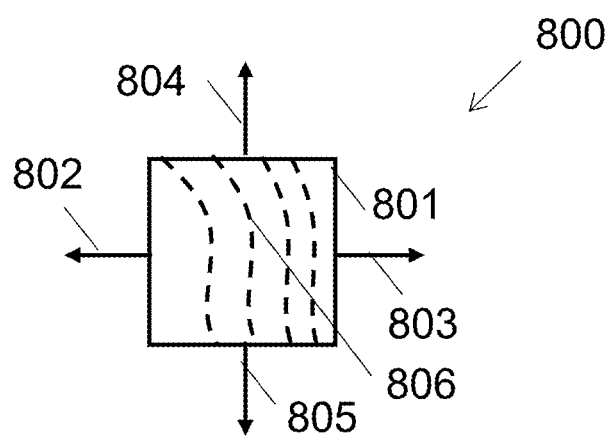
FIG. 8 conceptually illustrates a schematic plan view of an apparatus for aligning a birefringence control layer by applying forces to the edges of the layer in accordance with an embodiment of the invention.

In some embodiments, the birefringence control layer can be provided by various techniques using mechanical, thermal, or electro-magnetic processing of substrates. For example, in some embodiments, the birefringence control layer is formed by applying spatially varying mechanical stress across the surface of an optical substrate. FIG. 8 conceptually illustrates an apparatus 800 for aligning a birefringence control layer 801 in which forces are applied in the directions indicated by 802-805, resulting in the iso-birefringence contours 806. In many embodiments, the forces illustrated do not necessarily all need to be applied to the layer. In some embodiments, the birefringence control layer 801 is formed by inducing thermal gradients into an optical substrate. In a number of embodiments, the birefringence control layer 801 is provided by a HPDLC grating in which LC directors are aligned using electric or magnetic fields during curing. In several embodiments, two or more of the above techniques may be combined.

Fabrication of Waveguides Implementing Birefringence Control Layers

The present invention also provides methods and apparatus for fabricating a waveguide containing a birefringent grating and a birefringence control layer. The construction and arrangement of the apparatus and methods as shown in the various exemplary embodiments are illustrative only. Although only a few embodiments have been described in detail in this disclosure, many modifications are possible (for example, additional steps for improving the efficiency of the process and quality of the finished waveguide, minimizing process variances, monitoring the process and others.) Any process step referring to the formation of a layer should be understood to cover multiple such layers. For example, where a process step of recording a grating layer is described, this step can extend to recording a stack containing two or more grating layers. Accordingly, all such modifications are intended to be included within the scope of the present disclosure. The order or sequence of any process or method steps may be varied or re-sequenced according to alternative embodiments. Other substitutions, modifications, changes, and omissions may be made in the design of the process apparatus, operating conditions and arrangement of the exemplary embodiments without departing from the scope of the present disclosure. For the purposes of explaining the invention, the description of the processes will refer to birefringence control layers based on liquid crystal polymer material systems as described above. However, it should be clear from the description that the processes may be based on any of the implementations of a birefringence control layer described herein.

Figure 9A:
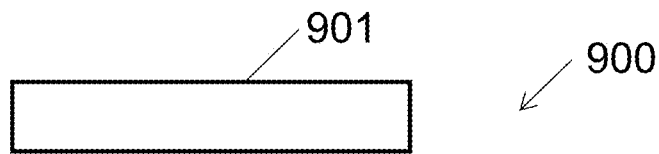
FIGS. 9A-9F conceptually illustrate the process steps and apparatus for fabricating a waveguide containing a birefringent grating and a birefringence control layer in accordance with various embodiments of the invention.
Figure 9B:
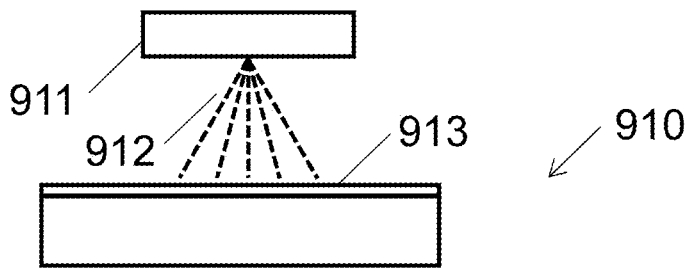

FIGS. 9A-9F conceptually illustrate the process steps and apparatus for fabricating a waveguide containing a birefringent grating and a birefringence control layer in accordance with various embodiments of the invention. FIG. 9A shows the first step 900 of providing a first transparent substrate 901. FIG. 9B illustrates an apparatus 910 for applying holographic recording material to the substrate 901. In the illustrative embodiment, the apparatus 910 includes a coating apparatus 911 that provides a spray pattern 912 that forms a layer 913 of grating recording material onto the substrate 901. In some embodiments, the spray pattern may include a narrow jet or blade swept or stepped across the surface to be coated. In several embodiments, the spray pattern may include a divergent jet for covering large areas of a surface simultaneously. In a number of embodiments, the coating apparatus may be used in conjunction with one or more masks for providing selective coating of regions of the surface. In many embodiments, the coating apparatus is based on industry-standard standard spin-coating or ink-jet printing processes.

Figure 9C:
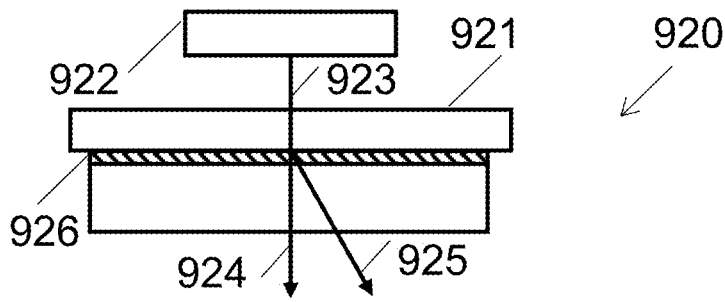
Figure 9D:
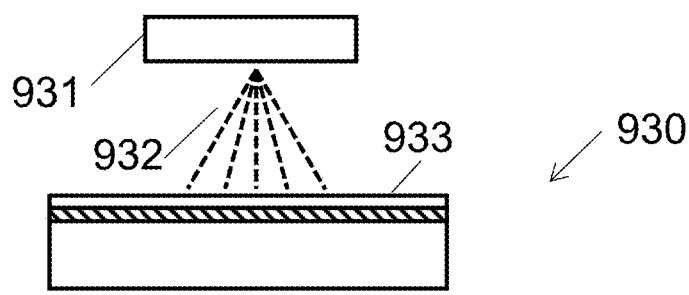
Figure 9E:
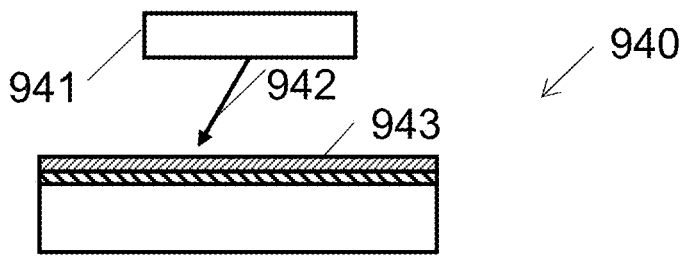
Figure 9F:
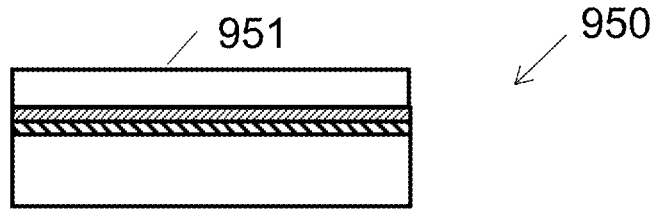

FIG. 9C conceptually illustrates an apparatus 920 for exposing a layer of grating recording material to form a grating layer in accordance with an embodiment of the invention. In the illustrative embodiment, the apparatus 920 contains a master grating 921 for contact copying the grating in the recording material and a laser 922. As shown, the master 921 diffracts incident light 923 to provide zero order 924 and diffracted light 925, which interferes within the grating material layer to form a grating layer 926. The apparatus may have further features, such as but not limited to light stops and masks for overcoming stray light from higher diffraction orders or other sources. In some embodiments, several gratings may be recorded into a single layer using the principles of multiplexed holograms. FIG. 9D conceptually illustrates an apparatus 930 for coating a layer of liquid crystal polymer material onto the grating layer in accordance with an embodiment of the invention. In the illustrative embodiment, the apparatus 930 contains a coating apparatus 931 configured to deliver a spray pattern 932 forming a layer of material 933. The coating apparatus 931 may have similar features to the coating apparatus used to apply the grating recording material. FIG. 9E conceptually illustrates an apparatus 940 for providing an aligned liquid crystal polymer layer of material in accordance with an embodiment of the invention. In the illustrative embodiment, the apparatus 940 contains a UV source (which can include collimation, beams steering, and beam shaping optics, depending on the specific requirements of a given application) 941 providing directional UV light 942 for forming an aligned LC polymer layer 943. FIG. 9F conceptually illustrates the completed waveguide 950 after the step of applying a second substrate 951 over the aligned liquid crystal polymer layer 943.

In some embodiments, exposure of the grating recording material may use conventional cross beam recording procedures instead of the mastering process described above. In many embodiments, further processing of the grating layer may include annealing, thermal processing, and/or other processes for stabilizing the optical properties of grating layer. In some embodiments, electrodes coatings may be applied to the substrates. In many embodiments, a protective transparent layer may be applied over the grating layer after exposure. In a number of embodiments, the liquid crystal polymer material is based on the LCP, LPP material systems discussed above. In several embodiments, the alignment of the liquid crystal polymer can result in an alignment of the liquid crystal directors parallel to the UV beam direction. In other embodiments, the alignment is at ninety degrees to the UV beam direction. In some embodiments, the second transparent substrate may be replaced by a protective layer applied using a coating apparatus.

FIGS. 10A-10F conceptually illustrate the process steps and apparatus for fabricating a waveguide containing a birefringent grating with a birefringence control layer applied to an outer surface of the waveguide in accordance with various embodiments of the invention. FIG. 10A conceptually illustrates the first step 1000 of providing a first transparent substrate 1001 in accordance with an embodiment of the invention. FIG. 10B conceptually illustrates an apparatus 1010 for applying holographic recording material to the substrate in accordance with an embodiment of the invention. In the illustrative embodiment, the apparatus 1010 includes a coating apparatus 1011 providing a spray pattern 1012 that forms the layer 1013 of grating recording material onto the substrate 1001. FIG. 10C conceptually illustrates an apparatus 1020 for exposing a layer of grating recording material to form a grating layer in accordance with an embodiment of the invention. In the illustrative embodiment, the apparatus 1020 includes a master grating 1021 for contact copying the grating in the recording material and a laser 1022. As shown, the master 1021 converts light 1023 from the laser 1022 into zero order 1024 and diffracted light 1025, which interfere within the grating material layer 1013 to form a grating layer 1026. FIG. 10D conceptually illustrates the partially completed waveguide 1030 after the step of applying a second substrate 1031 over the exposed grating layer in accordance with an embodiment of the invention. FIG. 10E conceptually illustrates an apparatus 1040 for coating a layer of liquid crystal polymer material onto the second substrate in accordance with an embodiment of the invention. In the illustrative embodiment, the apparatus 1040 includes a spray coater 1041 for delivering a spray pattern 1042 to form a layer of material 1043. FIG. 10F conceptually illustrates an apparatus 1050 for aligning the liquid crystal polymer material in accordance with an embodiment of the invention. In the illustrative embodiment, the apparatus 1050 includes a UV source 1051 providing the directional UV light 1052 for forming an aligned liquid crystal polymer layer 1053, which can be configured to realign the LC directors of the grating layer 1026.

FIGS. 11A-11F conceptually illustrate the process steps and apparatus for fabricating a waveguide containing a birefringent grating and a birefringence control layer in accordance with various embodiments of the invention. Unlike the above described embodiments, the step of forming the birefringence control layer can be carried out before the recording of the grating layer, which is formed above the birefringence control layer. FIG. 11A conceptually illustrates the first step 1100 of providing a first transparent substrate 1101. FIG. 11B conceptually illustrates an apparatus 1110 for coating a layer of liquid crystal polymer material onto the first substrate in accordance with an embodiment of the invention. In the illustrative embodiment, the apparatus 1110 includes a coating apparatus 1111 configured to deliver a spray pattern 1112 to form a layer of material 1113. FIG. 11C conceptually illustrates an apparatus 1120 for aligning the liquid crystal polymer material in accordance with an embodiment of the invention. In the illustrative embodiment, the apparatus 1120 includes a UV source 1121 providing the directional UV light 1122 for forming an aligned liquid crystal polymer layer 1123. FIG. 11D conceptually illustrates an apparatus 1130 for applying holographic recording material to the substrate in accordance with an embodiment of the invention. In the illustrative embodiment, the apparatus 1130 includes a coating apparatus 1131 for providing a spray pattern 1132 to form a layer of grating recording material 1133 on top of the liquid crystal polymer layer 1123. FIG. 11E conceptually illustrates an apparatus 1140 for exposing a layer of grating recording material to form a grating layer in accordance with an embodiment of the invention. In the illustrative embodiment, the apparatus 1140 includes a master grating 1141 for contact copying the grating in the recording material and a laser 1142. As shown, the master 1141 converts light 1142 from the laser into zero order 1143 and diffracted light 1144, which interfere in the grating material layer 1133 to form a grating layer 1145, which is aligned by the liquid crystal polymer material layer 1123. FIG. 11F conceptually illustrates the completed waveguide 1150 after the step of applying a second substrate 1151 over the exposed grating layer in accordance with an embodiment of the invention.

Figure 12:
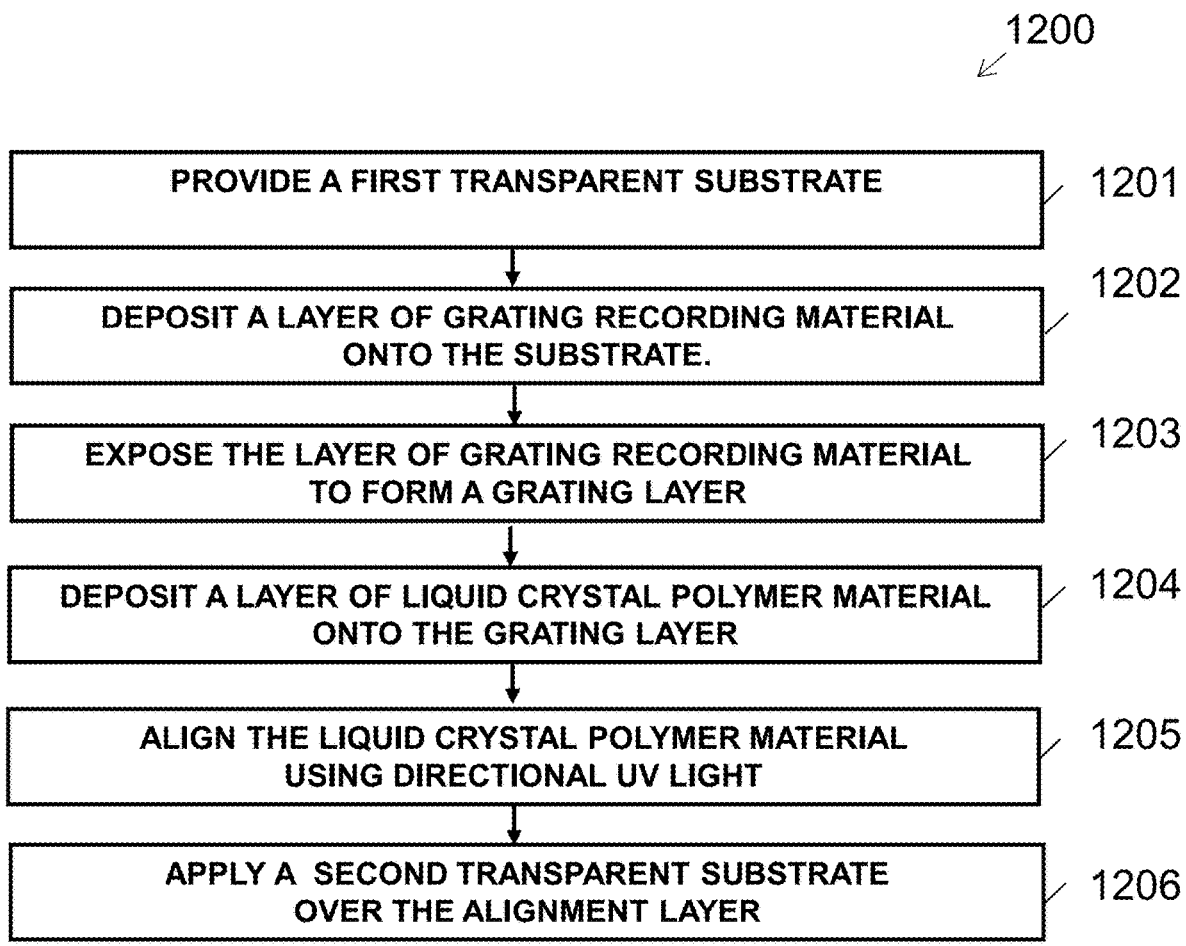
FIG. 12 conceptually illustrates a flow chart showing a method of fabricating a waveguide containing a birefringent grating and a birefringence control layer in accordance with an embodiment of the invention.

FIG. 12 conceptually illustrates a flow chart illustrating a method of fabricating a waveguide containing a birefringent grating and a birefringence control layer in accordance with an embodiment of the invention. Referring to FIG. 12, the method 1200 includes providing (1201) a first transparent substrate. A layer of grating recording material can be deposited (1202) onto the substrate. The layer of grating recording material can be exposed (1203) to form a grating layer. A layer of liquid crystal polymer material can be deposited (1204) onto the grating layer. The liquid crystal polymer material can be aligned (1205) using directional UV light. A second transparent substrate can be applied (1206) over the alignment layer.

Figure 13:
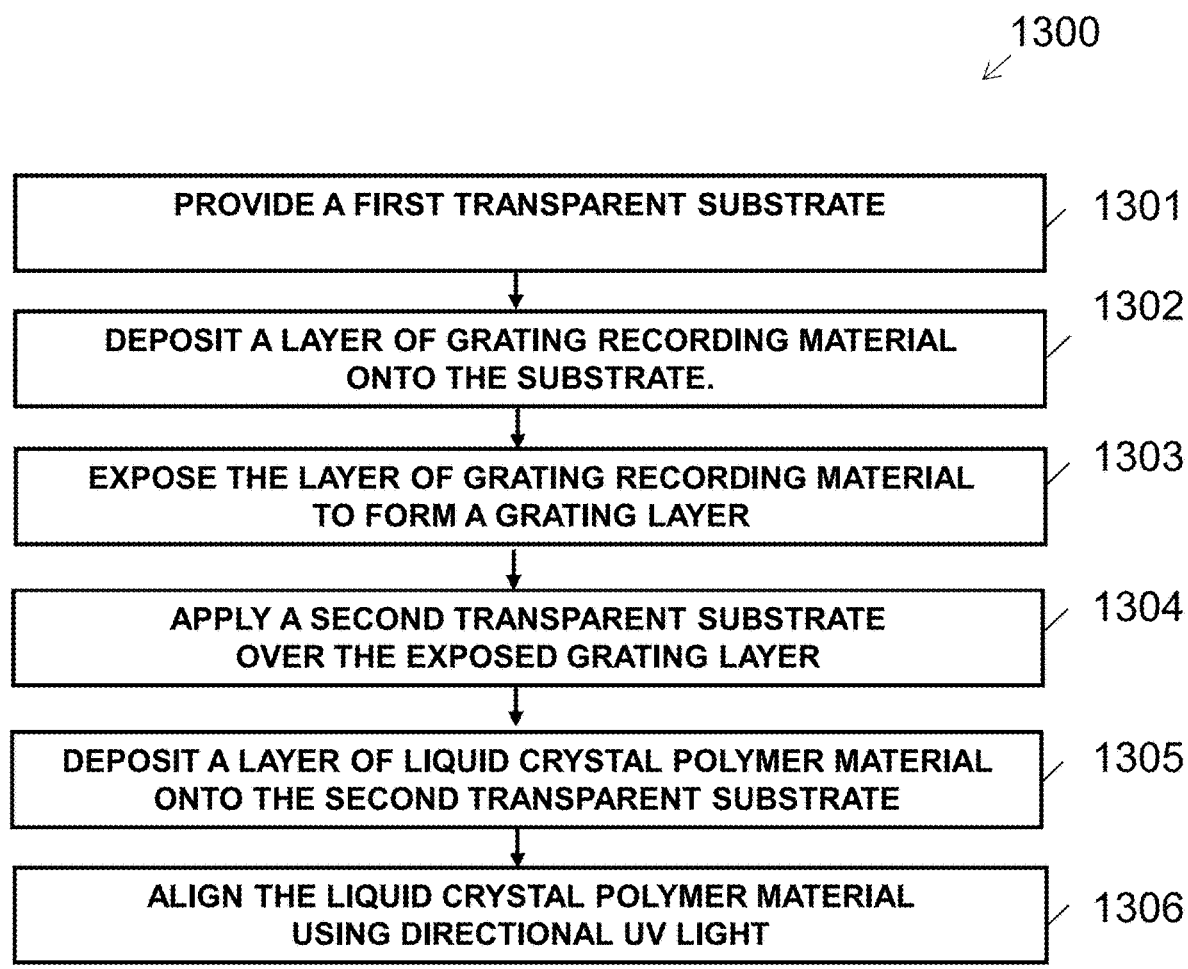
FIG. 13 conceptually illustrates a flow chart showing a method of fabricating a waveguide containing a birefringent grating and a birefringence control layer applied to an outer surface of the waveguide in accordance with an embodiment of the invention.

FIG. 13 conceptually illustrates a flow chart illustrating a method of fabricating a waveguide containing a birefringent grating and a birefringence control layer applied to an outer surface of the waveguide in accordance with an embodiment of the invention. Referring to FIG. 13, the method 1300 includes providing (1301) a first transparent substrate. A layer of grating recording material can be deposited (1302) onto the substrate. The layer of grating recording material can be exposed (1303) to form a grating layer. A second transparent substrate can be applied (1304) over the exposed grating layer. A layer of liquid crystal polymer material can be deposited (1305) onto the second transparent substrate. The liquid crystal polymer material can be aligned (1306) using directional UV light.

Figure 14:
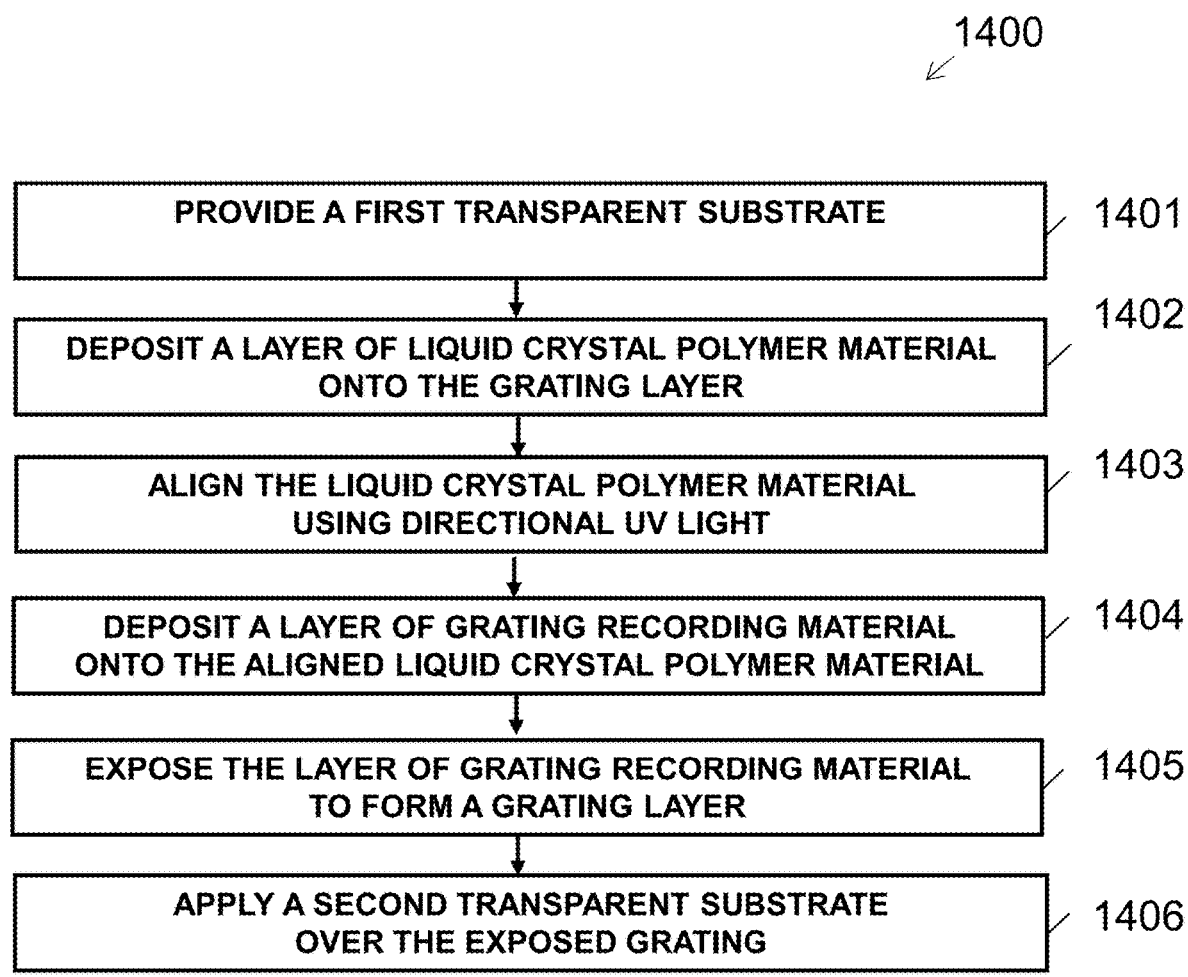
FIG. 14 conceptually illustrates a flow chart showing a method of fabricating a waveguide containing a birefringent grating and a birefringence control layer where forming the birefringence control layer is carried out before the recording of the grating layer in accordance with an embodiment of the invention.

FIG. 14 conceptually illustrates a flow chart illustrating a method of fabricating a waveguide containing a birefringent grating and a birefringence control layer where forming the birefringence control layer is carried out before the recording of the grating layer in accordance with an embodiment of the invention. Referring to FIG. 14, the method 1400 includes providing (1401) a first transparent substrate. A layer of liquid crystal polymer material can be deposited (1402) onto the substrate. The liquid crystal polymer material can be aligned (1403) using directional UV light. A layer of grating recording material can be deposited (1404) onto the aligned liquid crystal polymer material. The layer of grating recording material can be exposed (1405) to form a grating layer. A second transparent substrate can be applied (1406) over the grating layer.

Although FIGS. 12-14 illustrate specific processes for fabricating waveguides containing a birefringent grating and a birefringence control layer, many other fabrication processes and apparatus can be implemented to form such waveguides in accordance with various embodiments of the invention. For example, the order or sequence of any process or method steps may be varied or re-sequenced according to alternative embodiments. Other substitutions, modifications, changes, and omissions may be made in the design of the process apparatus, operating conditions and arrangement of the exemplary embodiments without departing from the scope of the present disclosure.

Additional Embodiments and Applications

Figure 15:
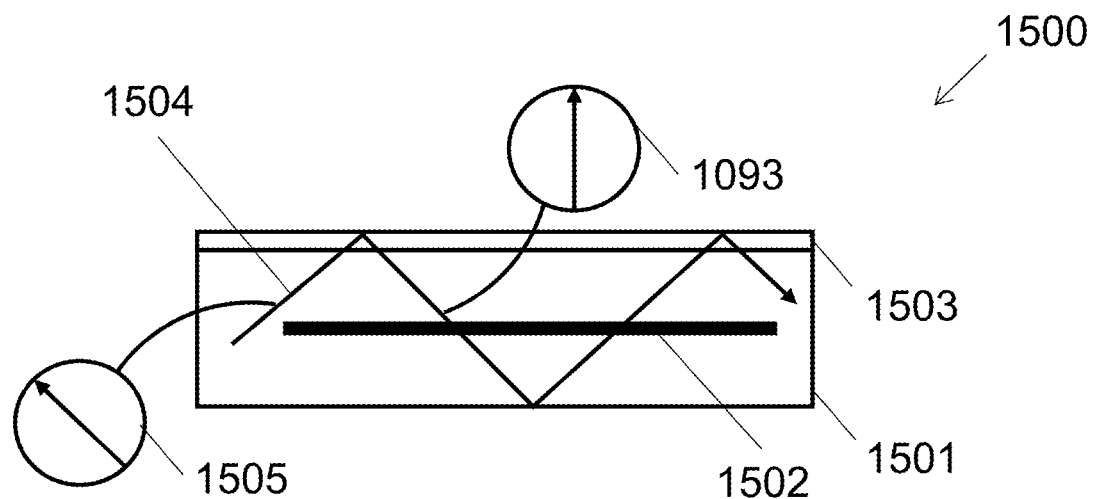
FIG. 15 conceptually illustrates a schematic side view of a waveguide with a birefringence control layer applied at the waveguide to air interface in accordance with an embodiment of the invention.

In some embodiments, a polarization-maintaining, wide angle, high reflection waveguide cladding with polarization compensation for grating birefringence can be implemented. FIG. 15 shows one such embodiment. In the illustrative embodiment, the waveguide 1500 includes a waveguiding substrate 1501 containing a birefringent grating 1502 and a birefringence control layer 1503 overlaying the waveguiding substrate 1501. As shown, guided light 1504 interacting with the birefringence control layer 1503 at its interface with the waveguiding substrate 1501 has its polarization rotated from the state indicated by symbol 1505 (resulting from the previous interaction with the grating) to the state indicated by 1506 (which has a desired orientation for the next interaction with the grating, for example, having an orientation for providing a predefined diffraction efficiency at some pre-defined point along the grating).

Figure 16:
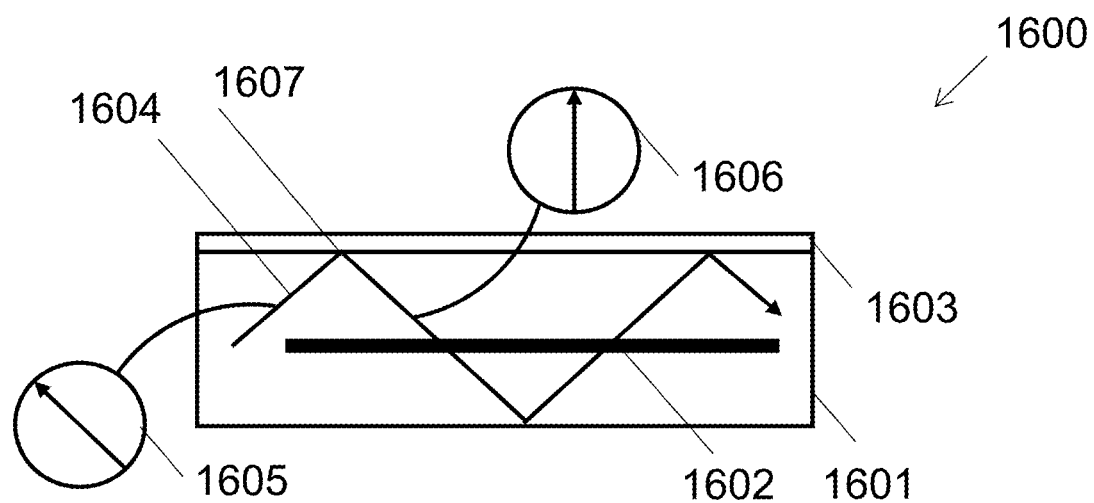
FIG. 16 conceptually illustrates a schematic side view of a waveguide with a birefringence control layer that isolates the waveguide from its environment applied to the waveguide to air interface in accordance with an embodiment of the invention.

In many embodiments, a compact and efficient birefringence control layer for isolating a waveguide from its environment while ensuring efficient confinement of waveguided beams can be implemented. FIG. 16 illustrates one such embodiment. In the illustrative embodiment, the environmentally isolated waveguide 1600 includes a waveguiding substrate 1601 containing a birefringent grating 1602 and a birefringence control layer 1603 overlaying the waveguiding substrate 1601. As shown, guided light 1604 interacting with the birefringence control layer 1603 at its interface with the waveguiding substrate 1601 has its polarization rotated from the state indicated by the symbol 1605 to the state indicated by 1606. Environmental isolation of the waveguide can be provided by designing the birefringence control layer 1603 such that total internal reflection occurs at the interface 1607 between the birefringence control layer 1603 and the waveguiding substrate 1601. In some embodiments, environmental isolation is provided by designing the birefringence control layer to have gradient index characteristics such that only a small portion of the guided light is reflected at the air interface of the birefringence control layer. In several embodiments, the birefringence control layer may incorporate a separate GRIN layer. In a number of embodiments, a GRIN layer may be based on embodiments disclosed in U.S. Provisional Patent Application No. 62/123,282 entitled NEAR EYE DISPLAY USING GRADIENT INDEX OPTICS and U.S. Provisional Patent Application No. 62/124,550 entitled WAVEGUIDE DISPLAY USING GRADIENT INDEX OPTICS.

Figure 17:
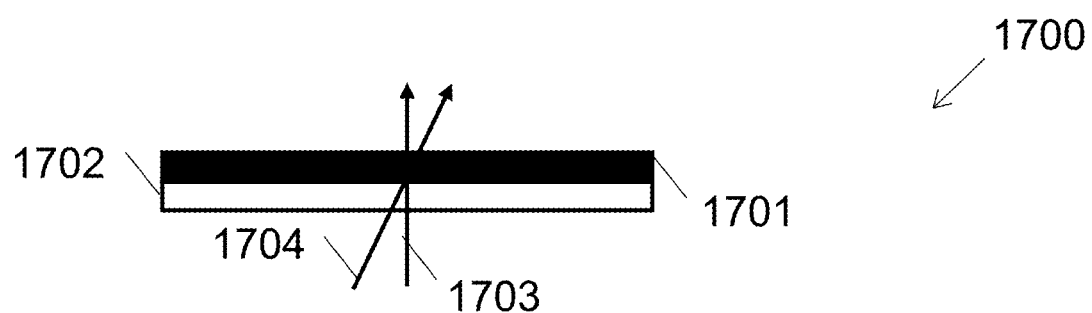
FIG. 17 conceptually illustrates a schematic side view of an apparatus for fabricating a structure containing a birefringent grating layer overlaying a birefringence control layer where the grating recording beams propagate through the birefringence control layer in accordance with an embodiment of the invention.

FIG. 17 conceptually illustrates an apparatus 1700, which may be used in conjunction with some of the methods described above, for fabricating a structure containing a birefringent grating layer 1701 overlaying a birefringence control layer 1702 in accordance with an embodiment of the invention. In FIG. 17, the substrate supporting the birefringence control layer is not shown. The construction beams, indicated by rays 1703, 1704, may be provided by a master grating or a crossed beam holographic recording setup. As shown, the construction beams propagate through the birefringence control layer 1702. In many embodiments, the construction beams are in the visible band. In some embodiments, the construction beams are in the UV band.

Figure 18:
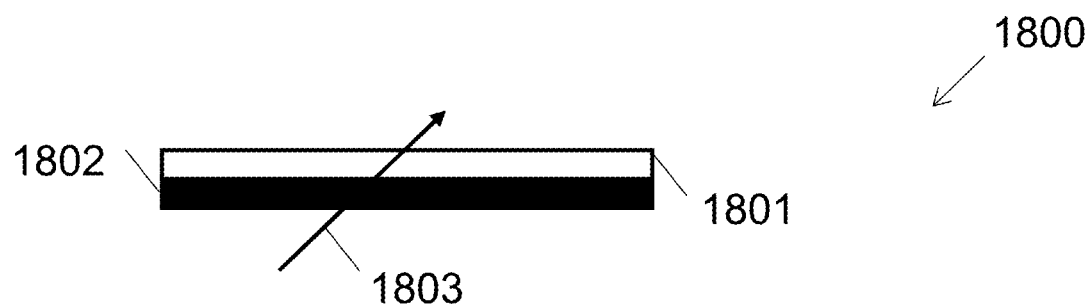
FIG. 18 conceptually illustrates a schematic side view of an apparatus for fabricating a structure containing a birefringence control layer overlaying a birefringent grating layer where the birefringence control layer is aligned by UV radiation propagating through the grating in accordance with an embodiment of the invention.

FIG. 18 conceptually illustrates an apparatus 1800, which may be used in conjunction with some of the methods described above, for fabricating a structure containing a birefringence control layer 1801 overlaying a birefringent grating layer 1802 in accordance with an embodiment of the invention. In FIG. 18, the substrate supporting the grating layer is not shown. The direction of a recording beam is indicated by 1803. In many embodiments the birefringence control layer is a liquid crystal polymer material system which uses a directional UV beam for alignment. In some embodiments, in which the grating is a recorded in a polymer and liquid crystal material system, an exposed grating may be erased during the process of aligning the birefringence control layer by applying an external stimulus such as heat, electric or magnetic fields or light to effective to create an isotropic phase of the liquid crystal.

Figure 19:
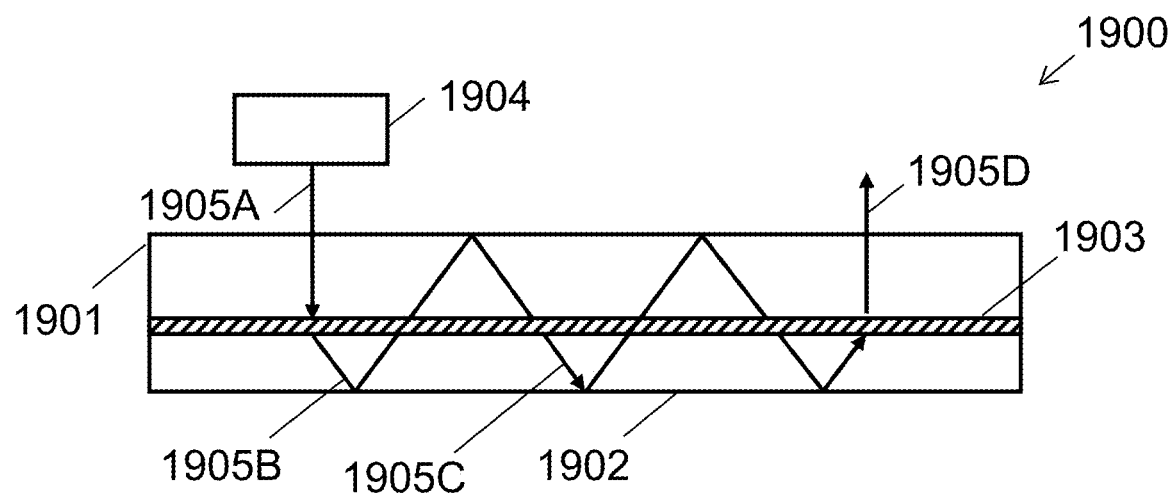
FIG. 19 conceptually illustrates a cross section of waveguide containing substrates sandwiching a grating layer.

FIG. 19 conceptually illustrates a cross section of waveguide 1900 containing substrates 1901, 1902 sandwiching a grating layer 1903. As shown, a source 1904 emits collimated light 1905A, which is coupled by the grating layer into the total internal reflection (TIR) path indicated by rays 1905B, 1905C and extracted by the grating layer 1903 into the output ray path 1905D. In the illustrative embodiments, the source 1904 can be a variety of light sources, including but not limited to a laser or a LED.

Figure 20:
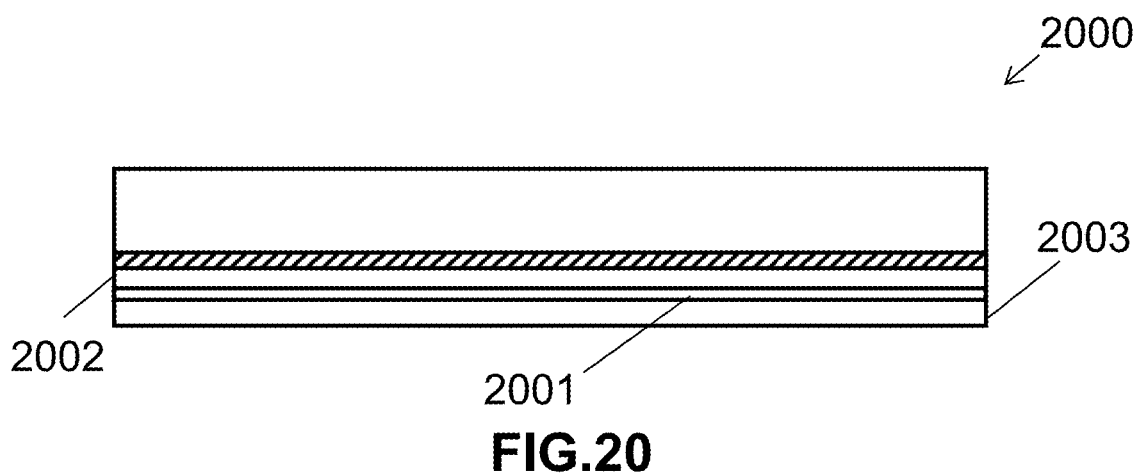
FIG. 20 conceptually illustrates a waveguide with a quarter wave polarization layer inserted in accordance with an embodiment of the invention.

FIG. 20 conceptually illustrates a waveguide similar to the one of FIG. 19 with a quarter wave polarization layer inserted by replacing the substrate 1902 by a quarter wave film 2001 sandwiched by substrates 2002, 2003 in accordance with an embodiment of the invention. A quarter wave polarization layer can be beneficial to the holographic waveguide design in two ways. Firstly, it can reduce reinteraction (outcoupling) of a rolled K-vector (RKV) input grating to increase the overall coupling efficiency of the input grating. Secondly, it can continuously mix up the polarization of the light going into the fold and output gratings to provide better extraction. The quarter wave layer can be located on a waveguide surface along the optical from the input grating. Typically, a waveguide surface can include one of the TIR surface of the wave or some intermediate surface formed inside the waveguide. The optical characteristics of the quarter wave layer can be optimized for "waveguide angles"—i.e., angles in glass beyond the TIR angle. In some embodiments, the center field is designed at approximately 55 deg. in glass (corresponding to a refractive index of approximately 1.51 at wavelength 532 nm). In many embodiments, optimization for red, green, and blue can be used for optimum performance of red, green, and blue transmitting waveguides. As will be shown in the embodiments to be described, there are several different ways of incorporating the quarter wave film within a waveguide. In the following embodiment, we refer generally to a quarter wave polarization layer provided by a liquid crystal polymer (LCP) material. However, it should be understood that other materials be used in applications of the invention.

Figure 21:
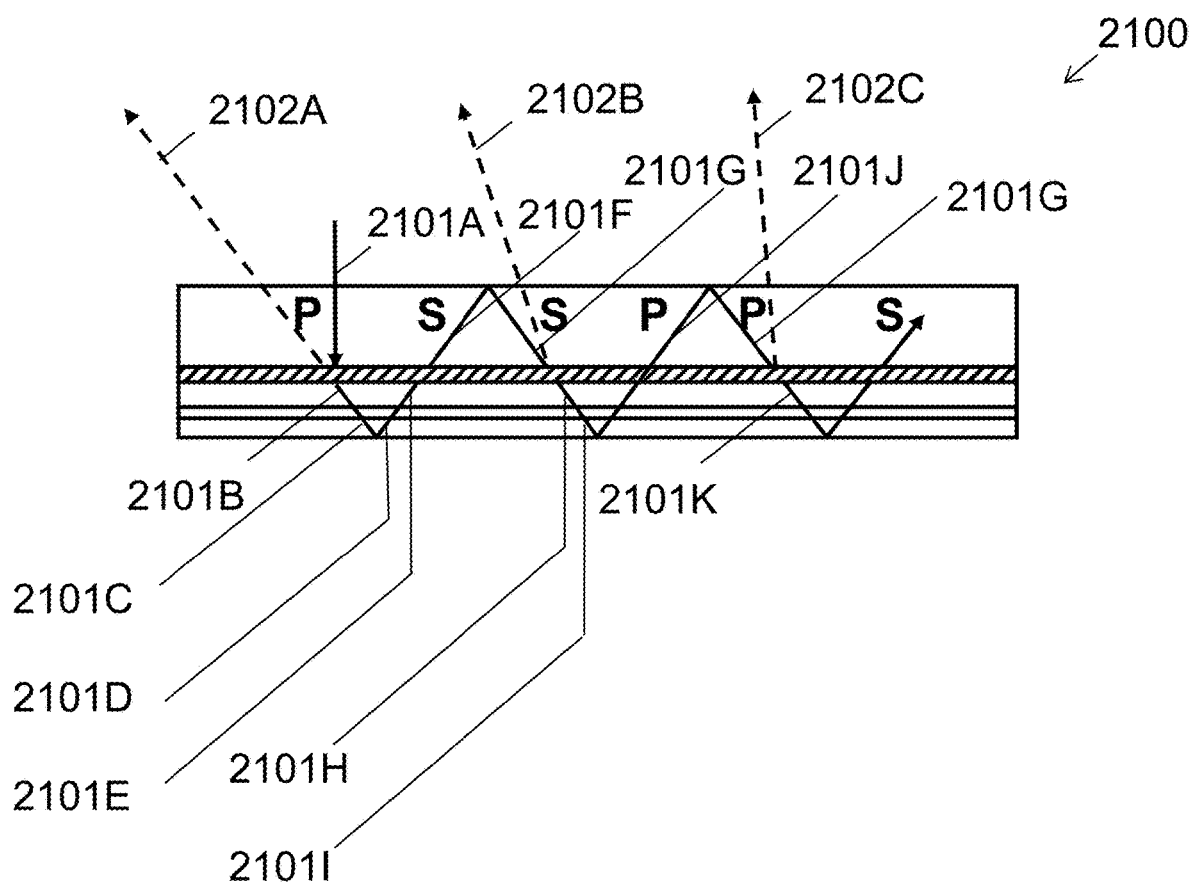
FIG. 21 conceptually illustrates a schematic cross section view showing a portion of a waveguide illustrating the use of a quarter wave polarization layer with a RKV grating in accordance with an embodiment of the invention.

FIG. 21 conceptually illustrates a schematic cross section view 2100 showing a portion of a waveguide illustrating how the use of a quarter wave polarization layer with a RKV grating can overcome the problem of unwanted extraction of light along the propagation path in the input grating portion of the waveguide in accordance with an embodiment of the invention. One ray path is illustrated in which input light including the P-polarized light 2101A is coupled by the grating layer into a TIR path indicated by the rays 2101B-2101L in the waveguide. The waveguide grating has rolled K-vectors of which examples occurring at three points along the length of the waveguide are illustrated schematically by the vectors 2102A-2102C. In the illustrative embodiment, the light 2101A diffractively coupled into TIR by the input grating is P-polarized with respect to the grating. In many embodiments, the TIR angle can be nominally 55 degrees in glass. On transmission through the quarter wave layer, the polarization of the light changes from P to circularly polarized (2101C). After TIR at the lower surface of the waveguide the polarization changes to circularly polarized light (2101D) of an opposing sense such that after traversing the quarter wave layer on its upward path becomes S-polarized (2101E) with respect to the grating. The S-polarized light passes through the gating without deviation (2101F) or substantial loss since it is both off-Bragg and "off polarization" (since the grating has zero or low diffraction efficiency for S). This light then undergoes TIR (2101G) a second time retaining its S-polarization. Hence the light 2101G is now on-Bragg but is still off polarization with respect to the P-polarization sensitive grating. The light therefore passes through the grating without diffraction (2101H). At this location the RKV (2102B) has rolled slightly from the one (2102A) near the light entry point on the UP grating. If the light was "on polarization," the 'roll' effect of RKV would be small, and so the light would be strongly out-coupled. The S-polarization light passing through the grating goes through another full cycle, (2101H-2101M) in a similar fashion to the cycle illustrated by rays 2101B-2101G, and then returns to a P-polarized state for the next (2101M) on-Bragg interaction at the grating region with K-vector 2102C. At this point, the light has performed two complete TIR bounce cycles down the waveguide, increasing the angular separation of the incidence angle at the grating and K-vector, which strongly reduces the on-Bragg interaction.

To clarify the embodiment of FIG. 21 further, a 55-degree TIR angle light in a 1 mm thick waveguide is considered, with a 20 mm projector relief (distance of the projector from the input grating), and a nominal 4.3 mm diameter projector exit pupil: The first interaction with the grating takes place approximately 2.85 mm down the waveguide. This equates to an 8.1-degree angle at 20 mm projector relief. For comparison the FWHM angular bandwidth of a typical 1.6 um grating is about 12 degrees in air (prescription dependent) i.e. the angle subtended by the pupil is not much larger than the semi-width of the lens. This leads to strong outcoupling if polarization is not changed to S-polarized as described above. In effect, the use of the quarter wave layer doubles the TIR length to approximately 5.7 mm. This offset equates to about 15.9 deg, which is larger than the angular bandwidth of most waveguide gratings, thereby reducing outcoupling reinteraction losses from the waveguide.

Figure 22:
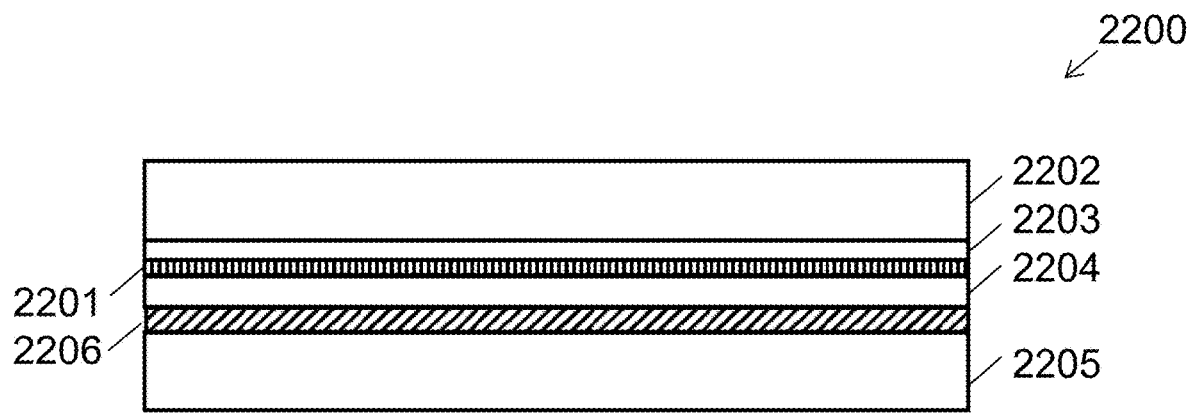
FIG. 22 conceptually illustrates a polarization layer architecture containing an LCP quarter wave cell and a reactive monomer liquid crystal mixture (RMLCM) cell separated by index matching oil layer in accordance with an embodiment of the invention.

FIG. 22 conceptually illustrates a polarization layer architecture 2200 containing an LCP quarter wave cell and a reactive monomer liquid crystal mixture (RMLCM) cell separated by index matching oil layer (2201) in accordance with an embodiment of the invention. The LCP cell includes a substrate 2202 and the LCP film 2203. The RMLCM cell includes substrates 2204, 2205 sandwiching the RMLCM layer 2206. This configuration has the advantage that the index matching oil bond can provide a non-permanent bond, which allows for installation and removal of polarization cell for testing purposes. Adhesive can also be applied at the edges (tacked) for a semi-permanent bond. In some embodiments the oil layer can be provided using a cell filled with oil.

Figure 23:
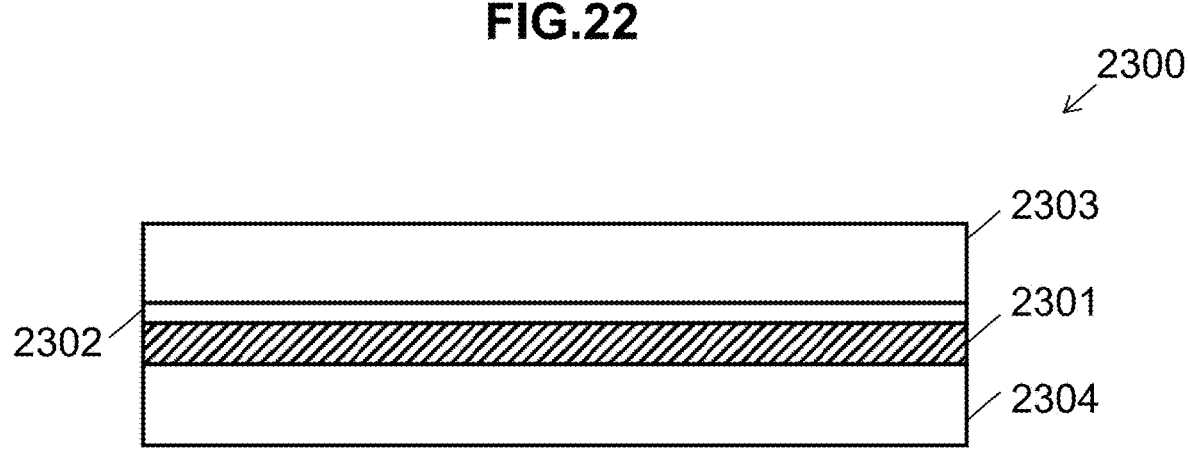
FIG. 23 conceptually illustrates an example of a polarization architecture based on a grating cell with the RMLCM grating material layer in direct contact with a bare LCP film in accordance with an embodiment of the invention.

FIG. 23 conceptually illustrates an example of a polarization architecture 2300 based on a grating cell with the RMLCM grating material layer 2301 in direct contact with a bare LCP film 2302 in accordance with an embodiment of the invention. The two films are sandwiched by the substrates 2303, 2304. This is a simple and cost-effective solution for implementing an LCP layer. Maintaining thickness control of the RMLCM layer using spacer beads can be difficult if the beads are embedded directly onto LCP layer. The embodiment of FIG. 23 can required careful matching of the material properties of the RMLCM and LCP to avoid detrimental interactions between the RMLCM and the LCP layers. In many embodiments, holographic exposure of the RMLCM layer can be applied directly into the RMLCM and does not need to be through the LCP layer. If exposure construction through the LCP layer is unavoidable, precompensation of polarization rotation of the LCP layer can be made in some embodiments.

Figure 24:
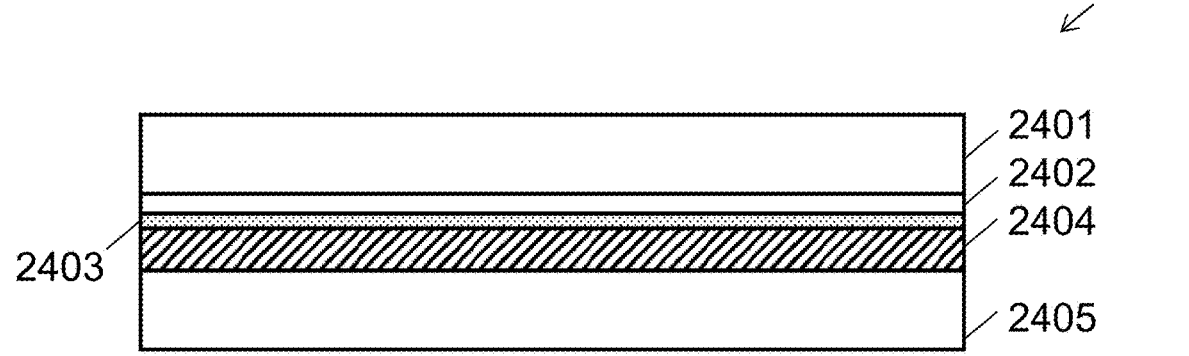
FIG. 24 conceptually illustrates a cross section view schematically showing an example of polarization layer architecture in which a bare LCP layer is bonded to a bare RMLCM layer in accordance with an embodiment of the invention.

FIG. 24 conceptually illustrates a cross section view schematically showing an example of polarization layer architecture 2400 in which a bare LCP layer is bonded to a bare RMLCM layer in accordance with an embodiment of the invention. The apparatus includes an upper substrate 2401, a bare LCP film 2402, adhesive layer 2403, an exposed RMLCM layer 2404, and a lower substrate 2405. In many embodiments, the adhesive layer can be Norland NOA65 adhesive or a similar adhesive.

Figure 25:
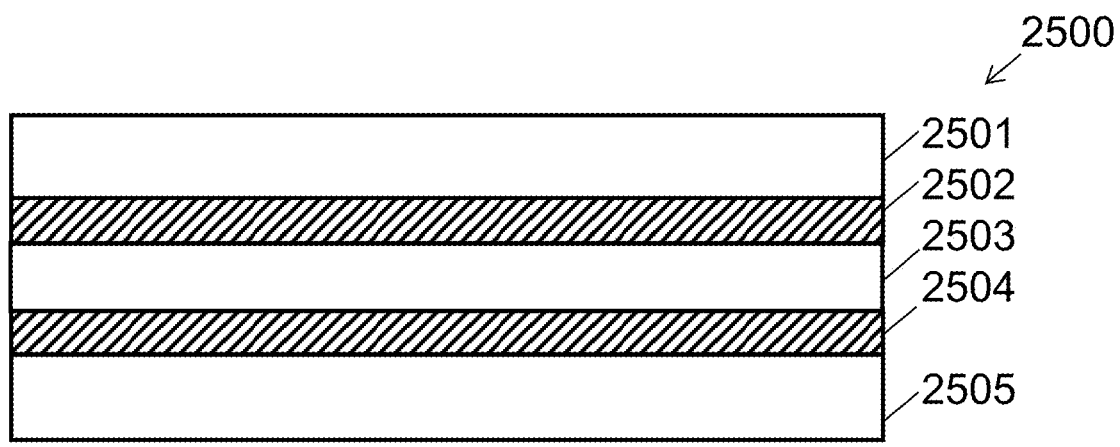
FIG. 25 conceptually illustrates a cross section view schematically showing an example of a polarization layer architecture using a RMLCM layer as a polarization layer in accordance with an embodiment of the invention.

FIG. 25 conceptually illustrates a cross section view schematically showing an example of a polarization layer architecture 2500 using a RMLCM layer as a polarization layer in accordance with an embodiment of the invention. The apparatus includes an upper substrate 2501, an upper RMLCM layer 2502, a transparent spacer 2503, a lower RMLCM layer 2504, and a lower substrate 2505. One of the RMLCM layers can be used not only as the grating material, but also as a polarization rotation layer, using the inherent birefringent properties of RMLCM materials. The 'polarization rotation grating' should have a period and/or k-vector direction such that its diffraction is minimal. In some embodiments the RMLCM layer can be configure as a subwavelength grating. In some embodiments, the RMCM layer can be provided sandwiched between two release layers such that after curing the layer can be removed and re-applied elsewhere.

Figure 26:
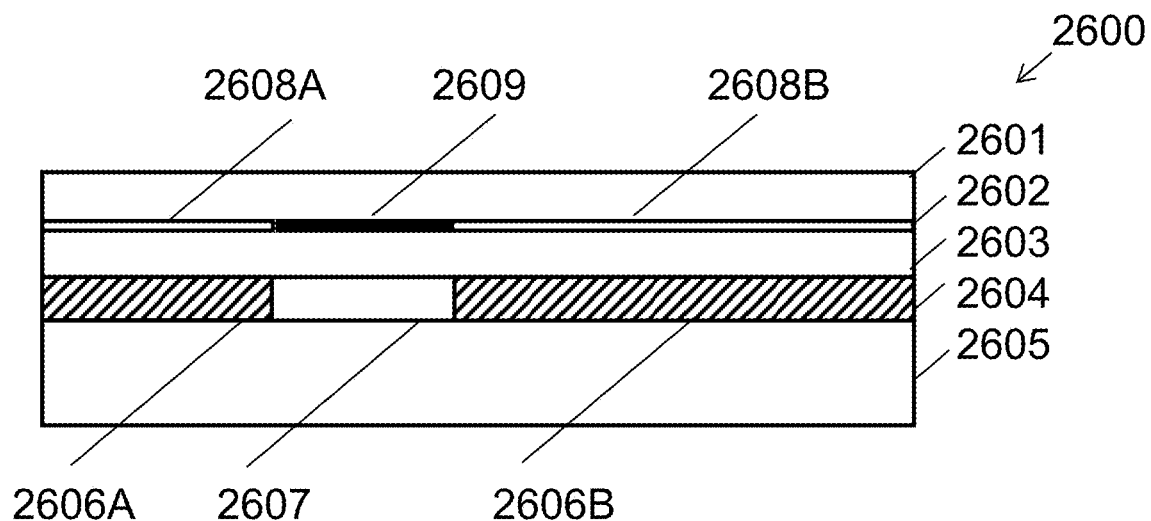
FIG. 26 conceptually illustrates an example of a polarization layer architecture that includes a feature for compensating for polarization rotation introduced by birefringent gratings in accordance with an embodiment of the invention.

FIG. 26 conceptually illustrates an example of a polarization layer architecture 2600 that includes a feature for compensating for polarization rotation introduced by birefringent gratings in accordance with an embodiment of the invention. The apparatus includes an upper substrate 2601, a polarization control layer 2602, a transparent substrate 2603, a grating layer 2604, and a lower substrate 2605. The grating layer contains a first grating 2606A and a second grating 2606B separated by a clear region 2607. In some embodiments, the clear region can a polymer with refractive index similar to that of the substrates. In many embodiments other low refractive index materials may be used to provide the clear region. The polarization control layer includes quarter wave retarding regions 2608A, 2608B and a polarization compensation region, which balances the polarization rotation introduced by the birefringent grating 2606A (in the case where the guide light propagates from grating 2606A to grating 2606B).

Figure 27:
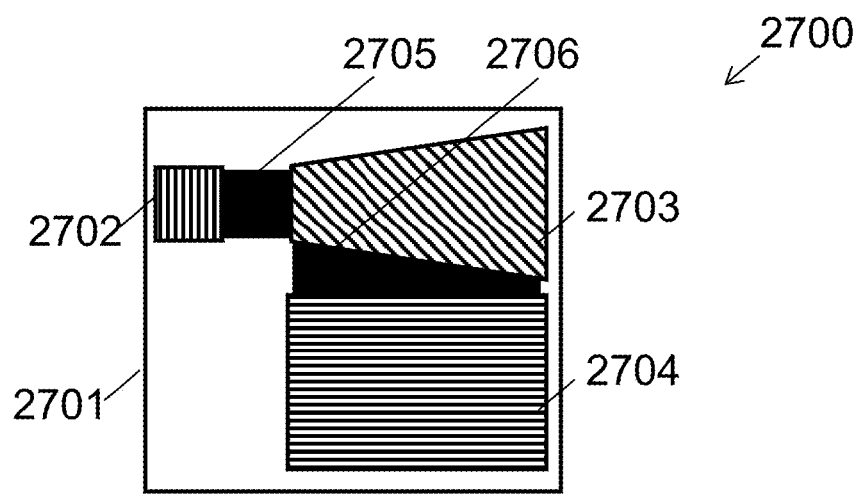
FIG. 27 conceptually illustrates a plan view schematically showing a waveguide display incorporating the features of the embodiment of FIG. 26 in accordance with an embodiment of the invention.

FIG. 27 conceptually illustrates a plan view schematically showing a waveguide display 2700 incorporating the features of the embodiment of FIG. 26 in accordance with an embodiment of the invention. The waveguide display 2700 includes a waveguide substrate 2701, an input grating 2702, a fold grating 2703, and an output grating 2704. Polarization control regions 2705, 2706 apply compensation for grating depolarization according to the principle of the embodiment of FIG. 26.

Figure 28:
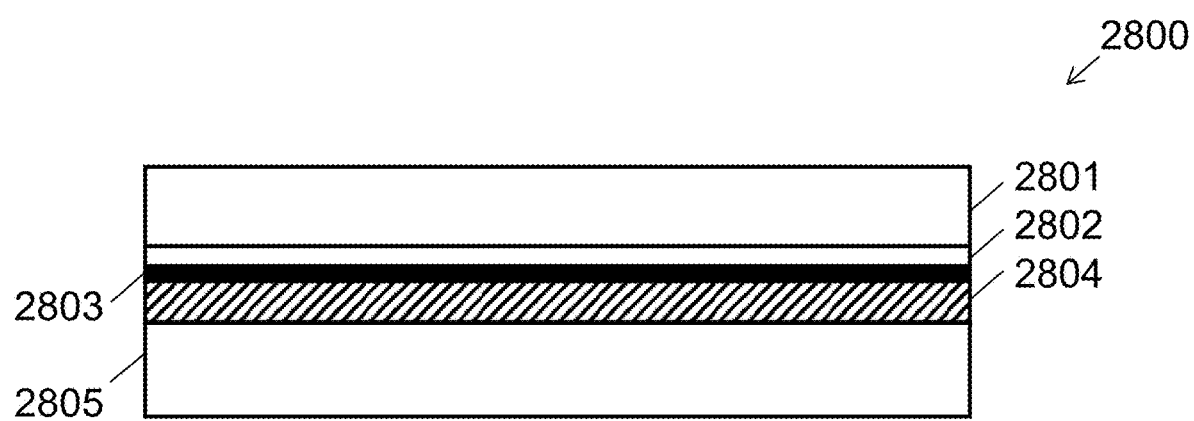
FIGS. 28 and 29 conceptually illustrate cross section views schematically showing examples of polarization layer architectures containing an upper substrate, an LCP layer with hard encapsulation layer, a RMLCM layer, and a lower substrate in accordance with various embodiments of the invention.

FIG. 28 conceptually illustrates a cross section view schematically showing an example of a polarization layer architecture 2800 containing an upper substrate 2801, an LCP layer 2802 with hard encapsulation layer 2803, a RMLCM layer 2804, and a lower substrate 2805 in accordance with an embodiment of the invention. In many embodiments, the hard encapsulation layer or film can be designed to protect the delicate LCP film from mechanical contact, such that standard cleaning procedures will not destroy the film. Advantageously, the hard encapsulation layer can employ a material resistant to spacer beads being pushed into it through the lamination process, as well as being chemically resistant to index matching oil and adhesives.

Figure 29:
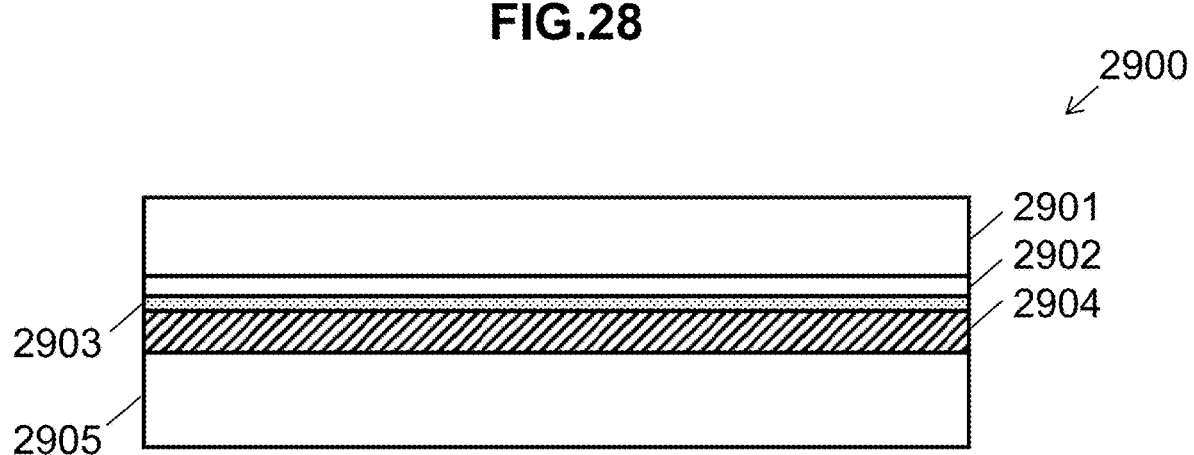

FIG. 29 conceptually illustrates a cross section view schematically showing an example of a polarization layer architecture 2900 containing an upper substrate 2901, an LCP layer 2902 with soft encapsulation layer 2903, a RMLCM layer 2904, and a lower substrate 2905 in accordance with an embodiment of the invention. The polarization alignment film can be encapsulated with a soft encapsulation layer or film designed to protect the delicate LCP film from mechanical contact, such that standard cleaning procedures such as drag wiping with iso-propyl alcohol, for example, will not destroy the film. In some embodiments, the soft encapsulation can provide some resistance to spacer beads during the lamination process.

Figure 30:
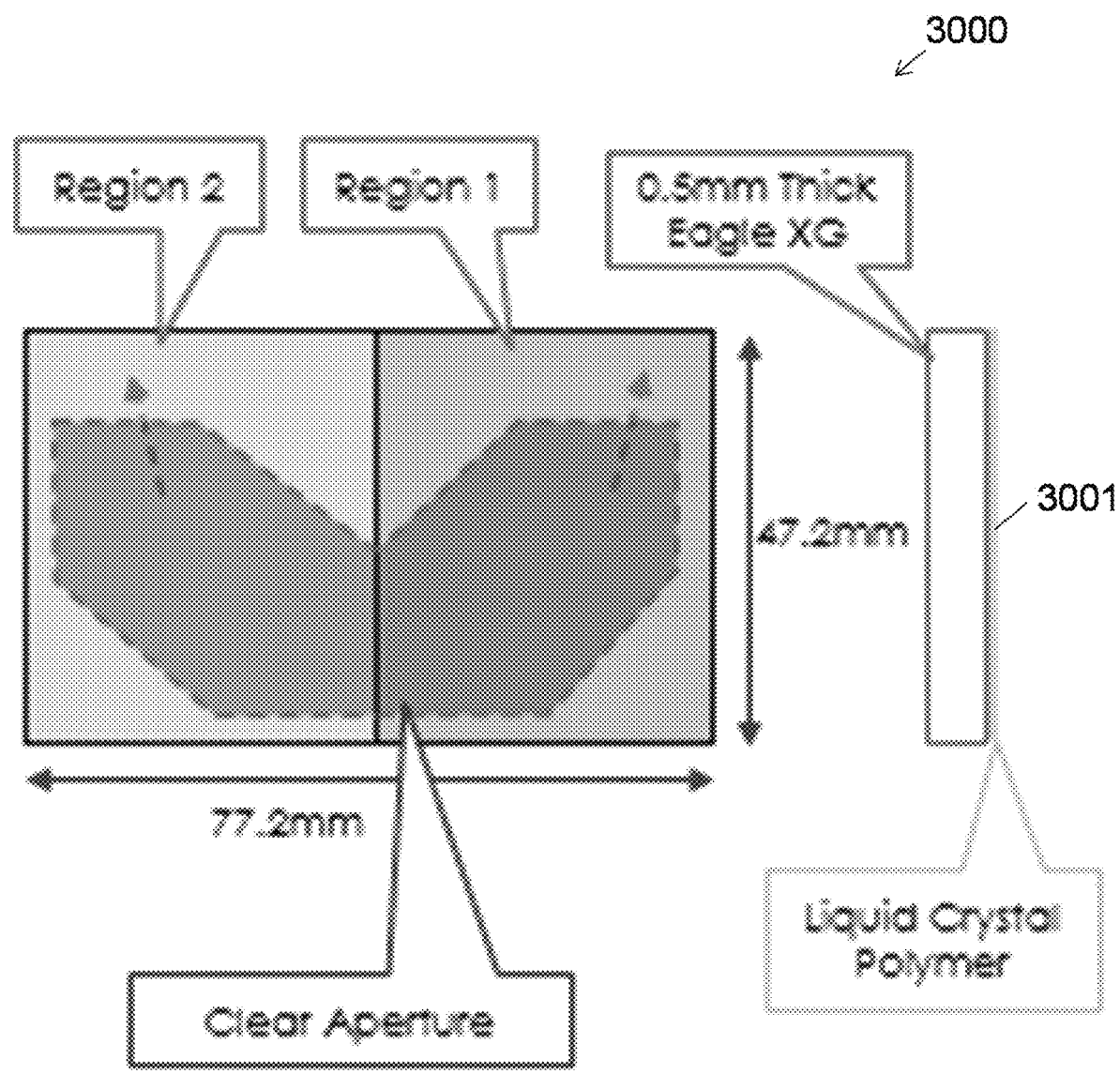
FIG. 30 conceptually illustrates a plan view schematically showing a first example of a two-region polymer film in accordance with an embodiment of the invention.

FIG. 30 conceptually illustrates a plan view schematically showing a first example 3000 of a two-region polymer film in accordance with an embodiment of the invention. This example using a non-encapsulated LCP film 3001 supported by a 0.5 mm thickness Eagle XG substrate of dimensions 77.2 mm×47.2 mm. Region 1 is characterized by a fast axis 75° from horizontal and by quarter-wave retardance at 55° in-glass angle, 45° ellipticity ±5°, for wavelength 524 nm. Region 2 is characterized by a fast axis 105° from horizontal and a quarter-wave retardance at 55° in-glass angle, 45° ellipticity ±5°, for wavelength 524 nm. Typically, region 1 and region 2 extend to the halfway point horizontally, ±2 mm.

Figure 31:
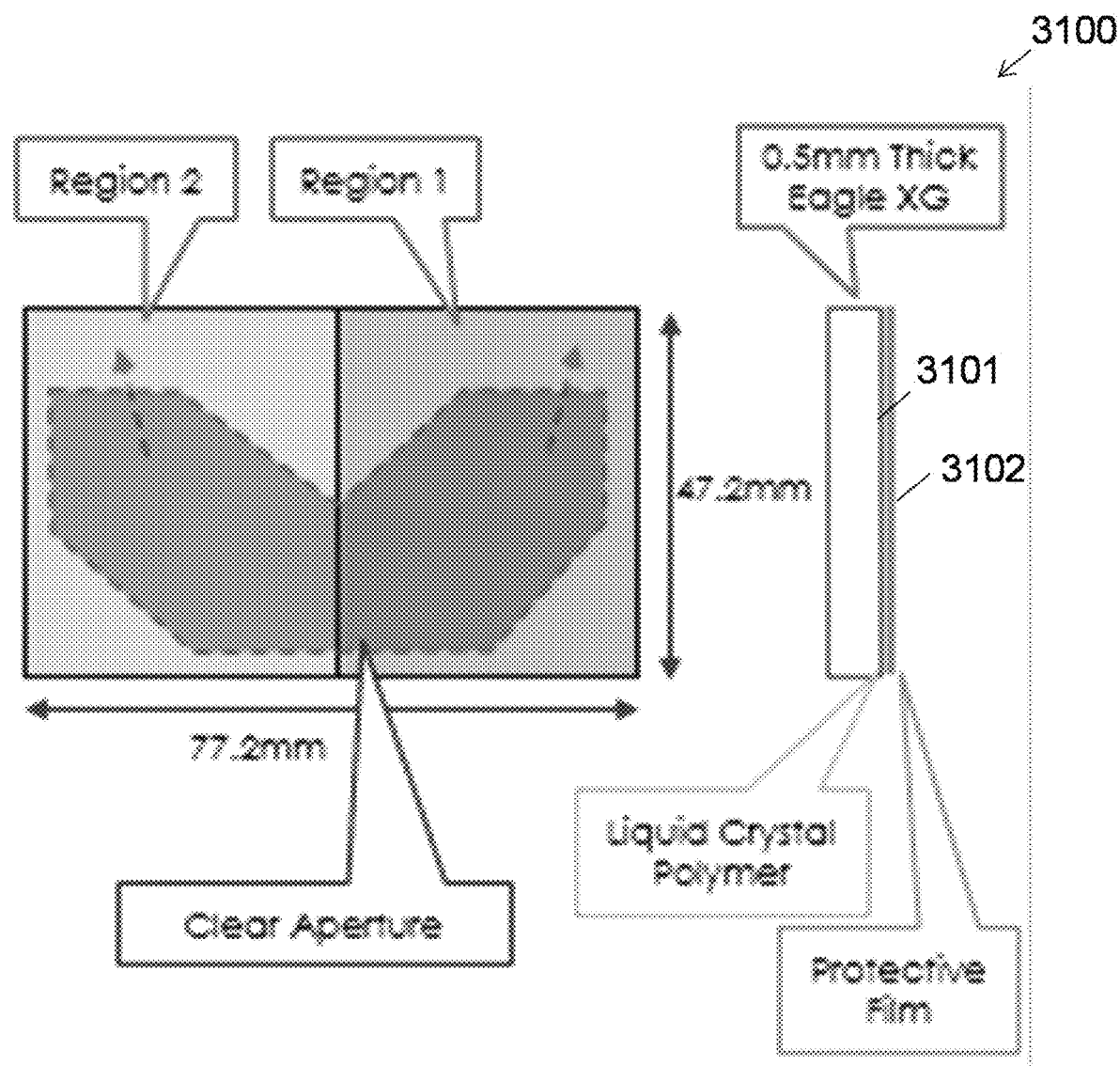
FIG. 31 conceptually illustrates a plan view schematically showing a second example of a two-region polymer film in accordance with an embodiment of the invention.

FIG. 31 conceptually illustrates a plan view schematically showing a second example 3100 of a two-region polymer film in accordance with an embodiment of the invention. This example uses encapsulation of the LCP layer 3101 by a protective film 3102, said layers supported by a 0.5 mm thickness Eagle XG substrate of dimensions 77.2 mm×47.2 mm. Region 1 is characterized by a fast axis 75° from horizontal and by quarter-wave retardance at 55° in-glass angle, 45° ellipticity ±5°, for wavelength 524 nm. Region 2 is characterized by a fast axis 105° from horizontal and by quarter-wave retardance at 55° in-glass angle, 45° ellipticity ±5°, for wavelength 524 nm. Typically, Region 1 and region 2 extend to the halfway point horizontally, ±2 mm. The encapsulation layer can seal the polarization layer such that performance is unaffected when covered by layer of oil such as Cargille Series A with refractive index 1.516. The encapsulation layer can seal the polarization layer such that performance is unaffected when covered by an additional layer of liquid crystal-based photopolymer.

Figure 32:
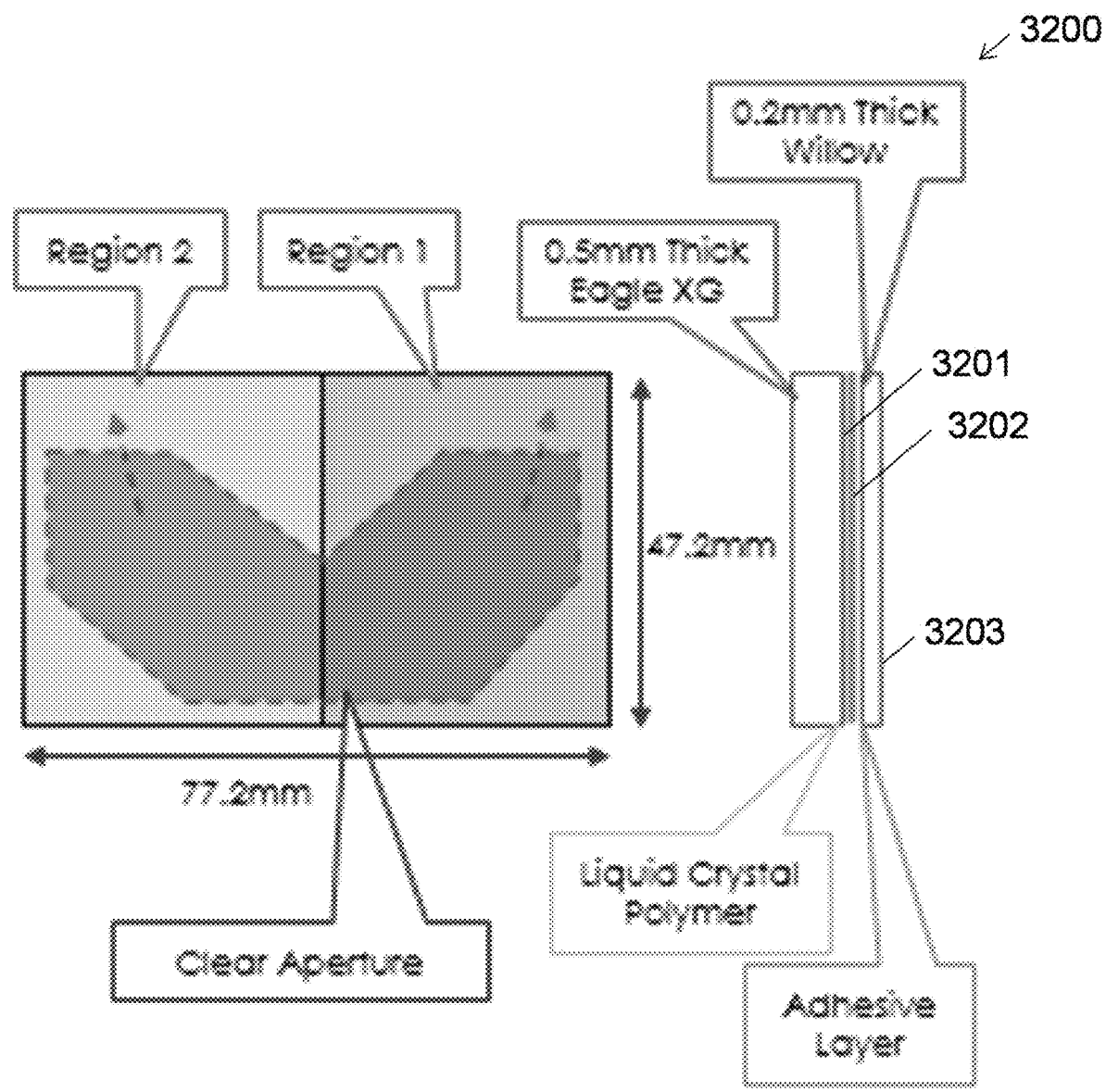
FIG. 32 conceptually illustrates a plan view schematically showing a third example of a two-region polymer film in accordance with an embodiment of the invention.

FIG. 32 conceptually illustrates a plan view schematically showing a third example 3200 of a two-region polymer film in accordance with an embodiment of the invention. This example uses glass encapsulation of the LCP. A 0.5 mm thickness Eagle XG substrate of dimensions 77.2 mm×47.2 mm supports a LCP layer 3201, an adhesive layer 3202, and 0.2 mm thickness Willow glass cover 3203. Region 1 is characterized by a fast axis 75° from horizontal and by quarter-wave retardance at 55° in-glass angle, 45° ellipticity ±5°, for wavelength 524 nm. Region 2 is characterized by a fast axis 105° from horizontal and by a quarter-wave retardance at 55° in-glass angle, 45° ellipticity ±5°, for wavelength 524 nm. Advantageously, the glass for encapsulations of the LCP is 0.5 mm EagleXG or 0.2 mm Willow glass. Typically, Region 1 and region 2 extend to the halfway point horizontally, ±2 mm.

Figure 33:
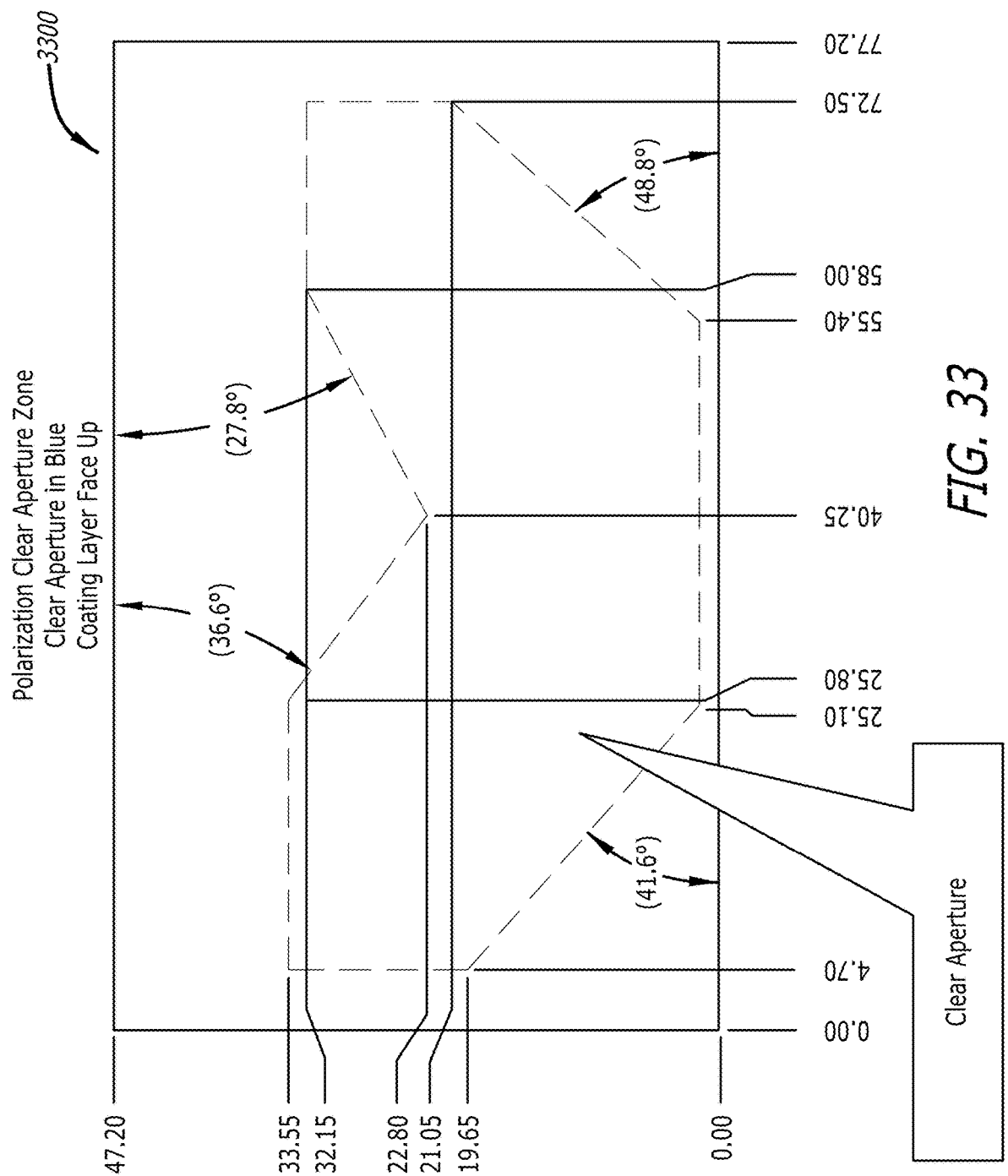
FIG. 33 conceptually illustrates a drawing showing a clear aperture layout in accordance with an embodiment of the invention.

FIG. 33 conceptually illustrates a drawing showing the clear aperture layout 3300 for the embodiments illustrated in FIGS. 30-32 in accordance with an embodiment of the invention. The clear aperture is highlighted in the dashed line. All dimensions are in mm.

Figure 34:
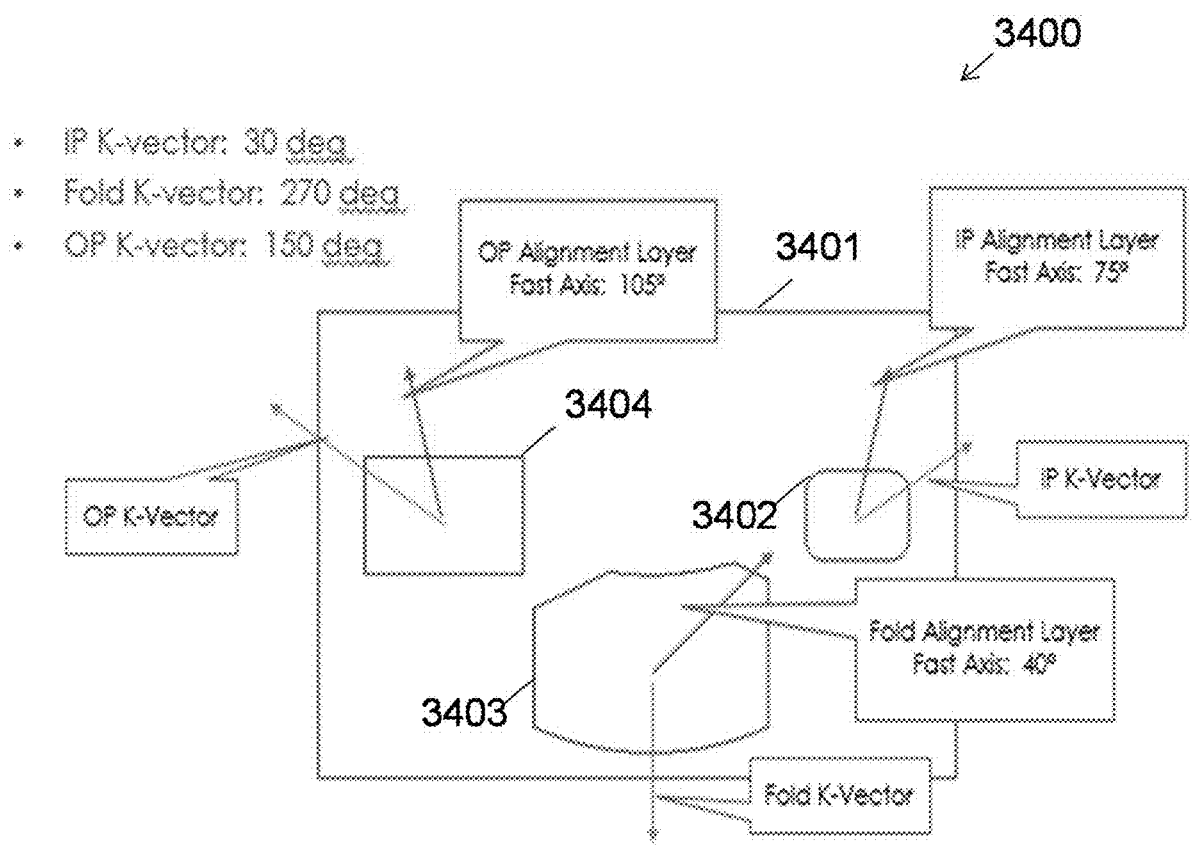
FIG. 34 conceptually illustrates a plan view schematically showing a waveguide containing input, fold, and output gratings including the K-vectors and alignment layer fast axis directions for each grating in accordance with an embodiment of the invention.

FIG. 34 conceptually illustrates a plan view 3400 schematically showing the waveguide 3401 containing input 3402, fold 3403, and output 3404 gratings based on the embodiments of FIGS.30-33, including the K-vectors and alignment layer fast axis directions for each grating in accordance with an embodiment of the invention. As shown in FIG. 34, the K-vector and fast axis directions are for the input grating K-vector: 30 degrees; for the fold grating K-vector: 270 degrees; and for the output grating K-vector: 150 degrees.

The above description covers only some of the possible embodiments in which an LCP layer (or equivalent retarding layer) can be combined with an RMLCM layer in a waveguide structure. In many of the above described embodiments, the substrates can be fabricated from 0.5 mm thickness Corning Eagle XG glass. In some embodiments, thinner or thicker substrates can be used. In several embodiments, the substrates can be fabricated from plastic. In a number of embodiments, the substrates and optical layers encapsulated by the said substrates can be curved. Any of the embodiments can incorporated additional layers for protection from chemical contamination or damage incurred during processing and handling. In some embodiments, additional substrate layers may be provided to achieve a required waveguide thickness. In some embodiments, additional layers may be provided to perform at least one of the functions of illumination homogenization spectral filtering, angle selective filtering, stray light control, and debanding. In many embodiments, the bare LCP layer can be bonded directly to a bare exposed RMLCM layer. In several embodiments, an intermediate substrate can be disposed between the LCP layer and the RMLCM layer. In a number of embodiments, the LCP layer can be combined with an unexposed layer of RMLCM material. In many embodiments, layers of LCP, with or without encapsulation, can have haze characteristics <0.25%, and preferably 0.1% or less. It should be noted that the quoted haze characteristics are based on bulk material scatter and are independent of surface scatter losses, which are largely lost upon immersion. The LCP and encapsulation layers can survive 100 C exposure (>80 C for thermal UM exposures). In many embodiments, the LCP encapsulation layer can be drag wipe resistant to permit layer cleaning. In the embodiments described above, there can be constant retardance and no bubbles or voids within the film clear aperture. The LCP and adhesive layers can match the optical flatness criteria met by the waveguide substrates.

A color waveguide according to the principles of the invention would typically include a stack of monochrome waveguides. The design may use red, green, and blue waveguide layers or, alternatively, red and blue/green layers. In some embodiments, the gratings are all passive, that is non-switching. In some embodiments, at least one of the gratings is switching. In some embodiments, the input gratings in each layer are switchable to avoid color crosstalk between the waveguide layers. In some embodiments color crosstalk is avoided by disposing dichroic filters between the input grating regions of the red and blue and the blue and green waveguides. In some embodiments, the thickness of the birefringence control layer is optimized for the wavelengths of light propagating within the waveguide to provide the uniform birefringence compensation across the spectral bandwidth of the waveguide display. Wavelengths and spectral bandwidths bands for red, green, blue wavelengths typically used in waveguide displays are red: 626 nm±9 nm, green: 522 nm±18 nm and blue: 452 nm±11 nm. In some embodiments, the thickness of the birefringence control layer is optimized for trichromatic light.

In many embodiments, the birefringence control layer is provided by a subwavelength grating recorded in HPDLC. Such gratings are known to exhibit the phenomenon of form birefringence and can be configured to provide a range of polarization functions including quarter wave and half wave retardation. In some embodiments, the birefringence control layer is provided by a liquid crystal medium in which the LC directors are aligned by illuminating an azo-dye doped alignment layer with polarized or unpolarized light. In a number of embodiments, a birefringence control layer is patterned to provide LC director orientation patterns with submicron resolution steps. In same embodiments, the birefringence control layer is processed to provide continuous variation of the LC director orientations. In several embodiments, a birefringence control layer provided by combining one or more of the techniques described above is combined with a rubbing process or a polyimide alignment layer. In some embodiments, the birefringence control layer provides optical power. In a number of embodiments, the birefringence control layer provides a gradient index structure. In several embodiments, the birefringence control layer is provided by a stack containing at least one HPDLC grating and at least one alignment layer. In many embodiments, the birefringent grating may have rolled k-vectors. The K-vector is a vector aligned normal to the grating planes (or fringes) which determines the optical efficiency for a given range of input and diffracted angles. Rolling the K-vectors allows the angular bandwidth of the grating to be expanded without the need to increase the waveguide thickness. In many embodiments, the birefringent grating is a fold grating for providing exit pupil expansion. The fold grating may be based on any of the embodiments disclosed in PCT Application No.: PCT/GB2016000181 entitled WAVEGUIDE DISPLAY and embodiments discussed in the other references give above.

In some embodiments, the apparatus is used in a waveguide design to overcome the problem of laser banding. A waveguide according to the principles of the invention can provide a pupil shifting means for configuring the light coupled into the waveguide such that the input grating has an effective input aperture which is a function of the TIR angle. Several embodiments of the pupil shifting means will be described. The effect of the pupil shifting means is that successive light extractions from the waveguide by the output grating integrate to provide a substantially flat illumination profile for any light incidence angle at the input grating. The pupil shifting means can be implemented using the birefringence control layers to vary at least one of amplitude, polarization, phase, and wavefront displacement in 3D space as a function of incidence light angle. In each case, the effect is to provide an effective aperture that gives uniform extraction across the output grating for any light incidence angle at the input grating. In some embodiments, the pupil shifting means is provided at least in part by designing the optics of the input image generator to have a numerical aperture (NA) variation ranging from high NA on one side of the microdisplay panel varying smoothly to a low NA at the other side according to various embodiments, such as those similar to ones disclosed in PCT Application No.: PCT/GB2016000181 entitled WAVEGUIDE DISPLAY, the disclosure of which is hereby incorporated in its entirety. Typically, the microdisplay is a reflective device.

In some embodiments, the grating layer may be broken up into separate layers. The number of layers may then be laminated together into a single waveguide substrate. In many embodiments, the grating layer contains several pieces, including the input coupler, the fold grating, and the output grating (or portions thereof) that are laminated together to form a single substrate waveguide. The pieces may be separated by optical glue or other transparent material of refractive index matching that of the pieces. In several embodiments, the grating layer may be formed via a cell making process by creating cells of the desired grating thickness and vacuum filling each cell with SBG material for each of the input coupler, the fold grating and the output grating. In one embodiment, the cell is formed by positioning multiple plates of glass with gaps between the plates of glass that define the desired grating thickness for the input coupler, the fold grating and the output grating. In one embodiment, one cell may be made with multiple apertures such that the separate apertures are filled with different pockets of SBG material. Any intervening spaces may then be separated by a separating material (e.g., glue, oil, etc.) to define separate areas. In one embodiment, the SBG material may be spin-coated onto a substrate and then covered by a second substrate after curing of the material. By using a fold grating, the waveguide display advantageously requires fewer layers than previous systems and methods of displaying information according to some embodiments. In addition, by using a fold grating, light can travel by total internal reflection within the waveguide in a single rectangular prism defined by the waveguide outer surfaces while achieving dual pupil expansion. In another embodiment, the input coupler, the gratings can be created by interfering two waves of light at an angle within the substrate to create a holographic wave front, thereby creating light and dark fringes that are set in the waveguide substrate at a desired angle. In some embodiments, the grating in a given layer is recorded in stepwise fashion by scanning or stepping the recording laser beams across the grating area. In some embodiments, the gratings are recorded using mastering and contact copying process currently used in the holographic printing industry.

In many embodiments, the gratings are Bragg gratings recorded in holographic polymer dispersed liquid crystal (HPDLC) as already discussed, although SBGs may also be recorded in other materials. In one embodiment, SBGs are recorded in a uniform modulation material, such as POLICRYPS or POLIPHEM having a matrix of solid liquid crystals dispersed in a liquid polymer. The SBGs can be switching or non-switching in nature. In its non-switching form a SBG has the advantage over conventional holographic photopolymer materials of being capable of providing high refractive index modulation due to its liquid crystal component. Exemplary uniform modulation liquid crystal-polymer material systems are disclosed in United State Patent Application Publication No.: US2007/0019152 by Caputo et al and PCT Application No.: PCT/EP2005/006950 by Stumpe et al., both of which are incorporated herein by reference in their entireties. Uniform modulation gratings are characterized by high refractive index modulation (and hence high diffraction efficiency) and low scatter. In some embodiments at least one of the gratings is a surface relief grating. In some embodiments at least one of the gratings is a thin (or Raman-Nath) hologram, In some embodiments, the gratings are recorded in a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. The grating may be recorded in any of the above material systems but used in a passive (non-switching) mode. The fabrication process can be identical to that used for switched but with the electrode coating stage being omitted. LC polymer material systems may be used for their high index modulation. In some embodiments, the gratings are recorded in HPDLC but are not switched.

In many embodiments, a waveguide display according to the principles of the invention may be integrated within a window, for example, a windscreen-integrated HUD for road vehicle applications. In some embodiments, a window-integrated display may be based on the embodiments and teachings disclosed in U.S. Provisional Patent Application No. 62/125,064 entitled OPTICAL WAVEGUIDE DISPLAYS FOR INTEGRATION IN WINDOWS and U.S. patent application Ser. No. 15/543,016 entitled ENVIRONMENTALLY ISOLATED WAVEGUIDE DISPLAY. In some embodiments, a waveguide display according to the principles of the invention may incorporate a light pipe for providing beam expansion in one direction based on the embodiments disclosed in U.S. patent application Ser. No. 15/558,409 entitled WAVEGUIDE DEVICE INCORPORATING A LIGHT PIPE. In some embodiments, the input image generator may be based on a laser scanner as disclosed in U.S. Pat. No. 9,075,184 entitled COMPACT EDGE ILLUMINATED DIFFRACTIVE DISPLAY. The embodiments of the invention may be used in wide range of displays including HMDs for AR and VR, helmet mounted displays, projection displays, heads up displays (HUDs), Heads Down Displays, (HDDs), autostereoscopic displays and other 3D displays. Some of the embodiments and teachings of this disclosure may be applied in waveguide sensors such as, for example, eye trackers, fingerprint scanners and LIDAR systems and in illuminators and backlights.

It should be emphasized that the drawings are exemplary and that the dimensions have been exaggerated. For example, thicknesses of the SBG layers have been greatly exaggerated. Optical devices based on any of the above-described embodiments may be implemented using plastic substrates using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. In some embodiments, the dual expansion waveguide display may be curved.

Although the description has provided specific embodiments of the invention, additional information concerning the technology may be found in the following patent applications, which are incorporated by reference herein in their entireties: U.S. Pat. No. 9,075,184 entitled COMPACT EDGE ILLUMINATED DIFFRACTIVE DISPLAY, U.S. Pat. No. 8,233,204 entitled OPTICAL DISPLAYS, PCT Application No.: US2006/043938, entitled METHOD AND APPARATUS FOR PROVIDING A TRANSPARENT DISPLAY, PCT Application No.: GB2012/000677 entitled WEARABLE DATA DISPLAY, U.S. patent application Ser. No. 13/317,468 entitled COMPACT EDGE ILLUMINATED EYEGLASS DISPLAY, U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY, U.S. patent application Ser. No. 14/620,969 entitled WAVEGUIDE GRATING DEVICE, U.S. patent application Ser. No. 15/553,120 entitled ELECTRICALLY FOCUS TUNABLE LENS, U.S. patent application Ser. No. 15/558,409 entitled WAVEGUIDE DEVICE INCORPORATING A LIGHT PIPE, U.S. patent application Ser. No. 15/512,500 entitled METHOD AND APPARATUS FOR GENERATING INPUT IMAGES FOR HOLOGRAPHIC WAVEGUIDE DISPLAYS, U.S. Provisional Patent Application No. 62/123,282 entitled NEAR EYE DISPLAY USING GRADIENT INDEX OPTICS, U.S. Provisional Patent Application No. 62/124,550 entitled WAVEGUIDE DISPLAY USING GRADIENT INDEX OPTICS, U.S. Provisional Patent Application No. 62/125,064 entitled OPTICAL WAVEGUIDE DISPLAYS FOR INTEGRATION IN WINDOWS, U.S. patent application Ser. No. 15/543,016 entitled ENVIRONMENTALLY ISOLATED WAVEGUIDE DISPLAY, U.S. Provisional Patent Application No. 62/125,089 entitled HOLOGRAPHIC WAVEGUIDE LIGHT FIELD DISPLAYS, U.S. Pat. No. 8,224,133 entitled LASER ILLUMINATION DEVICE, U.S. Pat. No. 8,565,560 entitled LASER ILLUMINATION DEVICE, U.S. Pat. No. 6,115,152 entitled HOLOGRAPHIC ILLUMINATION SYSTEM, PCT Application No.: PCT/GB2013/000005 entitled CONTACT IMAGE SENSOR USING SWITCHABLE BRAGG GRATINGS, PCT Application No.: PCT/GB2012/000680, entitled IMPROVEMENTS TO HOLOGRAPHIC POLYMER DISPERSED LIQUID CRYSTAL MATERIALS AND DEVICES, PCT Application No.: PCT/GB2014/000197 entitled HOLOGRAPHIC WAVEGUIDE EYE TRACKER, PCT/GB2013/000210 entitled APPARATUS FOR EYE TRACKING, PCT Application No.:GB2013/000210 entitled APPARATUS FOR EYE TRACKING, PCT/GB2015/000274 entitled HOLOGRAPHIC WAVEGUIDE OPTICALTRACKER, U.S. Pat. No. 8,903,207 entitled SYSTEM AND METHOD OF EXTENDING VERTICAL FIELD OF VIEW IN HEAD UP DISPLAY USING A WAVEGUIDE COMBINER, U.S. Pat. No. 8,639,072 entitled COMPACT WEARABLE DISPLAY, U.S. Pat. No. 8,885,112 entitled COMPACT HOLOGRAPHIC EDGE ILLUMINATED EYEGLASS DISPLAY, U.S. patent application Ser. No. 16/086,578 entitled METHOD AND APPARATUS FOR PROVIDING A POLARIZATION SELECTIVE HOLOGRAPHIC WAVEGUIDE DEVICE, U.S. Provisional Patent Application No. 62/493,578 entitled WAVEGUIDE DISPLAY APPARATUS, PCT Application No.: PCT/GB2016000181 entitled WAVEGUIDE DISPLAY, U.S. Patent Application No. 62/497,781 entitled APPARATUS FOR HOMOGENIZING THE OUTPUT FROM A WAVEGUIDE DEVICE, U.S. Patent Application No. 62/499,423 entitled WAVEGUIDE DEVICE WITH UNIFORM OUTPUT ILLUMINATION.

DOCTRINE OF EQUIVALENTS

The construction and arrangement of the systems and methods as shown in the various exemplary embodiments are illustrative only. Although only a few embodiments have been described in detail in this disclosure, many modifications are possible (for example, variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A waveguide comprising:
   at least one waveguide substrate;
   at least one grating;
   at least one polarization modifying layer, wherein the at least one polarization modifying layer is a liquid crystal and polymer system aligned using directional ultraviolet radiation;
   a light source for outputting light;
   an input coupler for directing the light into total internal reflection paths within the waveguide; and
   an output coupler for extracting light from the waveguide, wherein the interaction of the light with the at least one polarization modifying layer and the at least one grating provides a predefined characteristic of light extracted from the waveguide.

2. A wavequide comprising:
   at least one wavequide substrate;
   at least one grating;
   at least one polarization modifying layer;
   a light source for outputting light;
   an input coupler for directing the light into total internal reflection paths within the wavequide; and
   an output coupler for extracting light from the waveguide, wherein the interaction of the light with the at least one polarization modifying layer and the at least one grating provides a predefined characteristic of light extracted from the wavequide,
   wherein the at least one grating includes a birefringent grating formed in a liquid crystal and polymer system, and
   wherein the at least one polarization modifying layer influences the alignment of LC directors in the birefringent grating.

3. A wavequide comprising:
   at least one waveguide substrate;
   at least one grating;
   at least one polarization modifying layer, wherein the at least one polarization modifying layer comprises at least one stack of refractive index layers disposed on at least one optical surface of the waveguide, and wherein at least one layer in the stack of refractive index layers has an isotropic refractive index and at least one layer in the stack of refractive index layers has an anisotropic refractive index;
   a light source for outputting light;
   an input coupler for directing the light into total internal reflection paths within the waveguide; and
   an output coupler for extracting light from the waveguide, wherein the interaction of the light with the at least one polarization modifying layer and the at least one grating provides a predefined characteristic of light extracted from the waveguide.

4. A waveguide comprising:
   at least one waveguide substrate;
   at least one grating;
   at least one polarization modifying layer, wherein the at least one polarization modifying layer provides optical power;
   a light source for outputting light;
   an input coupler for directing the light into total internal reflection paths within the waveguide; and
   an output coupler for extracting light from the waveguide, wherein the interaction of the light with the at least one polarization modifying layer and the at least one grating provides a predefined characteristic of light extracted from the waveguide.

5. The waveguide of claim 1, wherein the predefined characteristic comprises at least one of: uniform illumination and uniform polarization over the angular range of the light.

6. The waveguide of claim 1, wherein the at least one polarization modifying layer provides compensation for polarization rotation introduced by the at least one grating along at least one direction of light propagation within the waveguide.

7. The waveguide of claim 1, wherein the at least one polarization modifying layer is a liquid crystal and polymer material system.

8. The waveguide of claim 1, wherein the interaction of light with the at least one polarization modifying layer provides at least one of: an angular or spectral bandwidth variation; a polarization rotation; a birefringence variation; an angular or spectral dependence of at least one of beam transmission or polarization rotation; or a light transmission variation in at least one direction in the plane of the waveguide substrate.

9. The waveguide of claim 1, wherein the at least one polarization modifying layer is aligned by at least one of: electromagnetic radiation; electrical or magnetic fields; mechanical forces; chemical reaction; or thermal exposure.

10. The waveguide of claim 1, wherein the predefined characteristic varies across the waveguide.

11. The waveguide of claim 1, wherein the at least one polarization modifying layer has an anisotropic refractive index.

12. The waveguide of claim 1, wherein the at least one polarization modifying layer is formed on at least one internal or external optical surface of the waveguide.

13. The waveguide of claim 1, wherein the predefined characteristic results from the cumulative effect of the interaction of the light with the at least one polarization modifying layer and the at least one grating along at least one direction of light propagation within the waveguide.

14. The waveguide of claim 1, wherein the at least one polarization modifying layer is reflective.

15. The waveguide of claim 1, wherein the at least one grating comprises two or more gratings configured as a stack.

16. The waveguide of claim 1, wherein the at least one polarization modifying layer provides an environmental isolation layer for the waveguide.

17. The waveguide of claim 1, wherein the at least one polarization modifying layer has a gradient index structure.

18. The waveguide of claim 1, wherein the at least one polarization modifying layer is formed by stretching a layer of an optical material to spatially vary its refractive index in the plane of the waveguide substrate.

19. The waveguide of claim 1, wherein the light source provides collimated light in angular space.

20. The waveguide of claim 1, wherein at least one of the input coupler and output coupler comprises a birefringent grating.

21. The waveguide of claim 1, wherein the at least one grating is formed in a birefringent material.

22. The waveguide of claim 1, wherein the at least one grating is a surface relief grating.

23. The waveguide of claim 1, wherein the at least one grating is a fold grating.

24. The waveguide of claim 1, wherein the at least one grating comprises two or more gratings multiplexed in a layer.

* * * * *